(12) United States Patent
Shinbata

(10) Patent No.: US 7,561,750 B2
(45) Date of Patent: Jul. 14, 2009

(54) IMAGE PROCESSING APPARATUS, IMAGE PROCESSING METHOD, STORAGE MEDIUM, AND PROGRAM

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 11/733,090

(22) Filed: Apr. 9, 2007

(65) Prior Publication Data

US 2007/0189391 A1 Aug. 16, 2007

Related U.S. Application Data

(63) Continuation of application No. 11/374,214, filed on Mar. 14, 2006, which is a continuation of application No. 10/166,657, filed on Jun. 12, 2002, now Pat. No. 7,079,700, which is a continuation of application No. PCT/JP01/10388, filed on Nov. 28, 2001.

(30) Foreign Application Priority Data

| Nov. 30, 2000 | (JP) | .............................. 2000/365328 |
| Apr. 3, 2001 | (JP) | .............................. 2001/104754 |
| Apr. 6, 2001 | (JP) | .............................. 2001/108984 |

(51) Int. Cl.
   *G06K 9/40* (2006.01)
(52) U.S. Cl. .................................................. 382/254
(58) Field of Classification Search .......... 382/254–275
   See application file for complete search history.

(56) References Cited

U.S. PATENT DOCUMENTS

| 4,618,990 A | 10/1986 | Sieb, Jr. et al. ................ 382/43 |
| 4,825,297 A | 4/1989 | Fuchsberger et al. ........ 358/284 |
| 5,012,096 A | 4/1991 | Takeda et al. ............ 250/327.2 |

(Continued)

FOREIGN PATENT DOCUMENTS

DE 3629 409 A1 8/1986

(Continued)

OTHER PUBLICATIONS

A. Laine et al., "Enhancement by Multiscale Nonlinear Operators," Handbook of Medical Imaging Processing and Analysis, Oct. 2000, pp. 33-55.

(Continued)

*Primary Examiner*—Aaron W Carter
(74) *Attorney, Agent, or Firm*—Fitzpatrick, Cella, Harper & Scinto

(57) ABSTRACT

An image processing apparatus and method for obtaining a high-quality image in which the dynamic range or partial pixel value range has been changed while suppressing or avoiding collapse of the edge structure of an image or generation of overshoot. Also, in an image processing apparatus and method, a high-quality image can be obtained with desired spatial frequency components having been emphasized or suppressed while suppressing or avoiding collapse of the edge structure of an edge portion contained in an objective image. For example, tone conversion means execute tone conversion of an image, frequency transformation means decompose the image into frequency components of a plurality of frequency bands, and component conversion means convert the frequency components on the basis of values of the frequency components and the tone conversion characteristics of the tone conversion means.

3 Claims, 51 Drawing Sheets

U.S. PATENT DOCUMENTS

| | | | | |
|---|---|---|---|---|
| 5,086,488 | A | 2/1992 | Kato et al. | 382/56 |
| 5,220,624 | A | 6/1993 | Sakamoto et al. | 382/54 |
| 5,253,082 | A | 10/1993 | Hayashi et al. | 358/1.9 |
| 5,454,044 | A | 9/1995 | Nakajima | 382/132 |
| 5,467,404 | A | 11/1995 | Vuylsteke et al. | 382/274 |
| 5,644,662 | A | 7/1997 | Vuylsteke et al. | 382/302 |
| 5,708,693 | A * | 1/1998 | Aach et al. | 378/62 |
| 5,799,112 | A | 8/1998 | de Queiroz et al. | 382/254 |
| 5,930,402 | A | 7/1999 | Kim | 382/274 |
| 6,009,208 | A | 12/1999 | Mitra et al. | 382/254 |
| 6,072,913 | A | 6/2000 | Yamada | 382/275 |
| 6,252,931 | B1 | 6/2001 | Aach et al. | 378/98.2 |
| 6,434,265 | B1 | 8/2002 | Xiong et al. | 382/154 |
| 6,813,335 | B2 | 11/2004 | Shinbata | 378/62 |
| 7,050,648 | B1 | 5/2006 | Shinbata | 382/274 |
| 7,076,111 | B2 * | 7/2006 | Shinbata | 382/254 |
| 7,079,700 | B2 * | 7/2006 | Shinbata | 382/254 |
| 7,248,748 | B2 * | 7/2007 | Shinbata | 382/254 |
| 7,321,686 | B2 * | 1/2008 | Shibata et al. | 382/168 |
| 7,447,376 | B2 * | 11/2008 | Shinbata | 382/254 |
| 2002/0159623 | A1 | 10/2002 | Shinbata | 382/128 |

FOREIGN PATENT DOCUMENTS

| | | |
|---|---|---|
| EP | 0 827 333 A2 | 3/1998 |
| EP | 0 996 090 A2 | 4/2000 |
| EP | 1 005 223 A2 | 5/2000 |
| JP | 56-182957 | 10/1983 |
| JP | 9-212623 A | 8/1987 |
| JP | 63-59266 A | 3/1988 |
| JP | 3-293864 A | 12/1991 |
| JP | 4-284066 A | 10/1992 |
| JP | 4-321379 A | 11/1992 |
| JP | 6-274614 A | 9/1994 |
| JP | 6-274615 A | 9/1994 |
| JP | 2509503 B2 | 4/1996 |
| JP | 09-091423 | 4/1997 |
| JP | 2663189 B2 | 6/1997 |
| JP | 9-181940 A | 7/1997 |
| JP | 10-164469 A | 6/1998 |
| JP | 10-302052 A | 11/1998 |
| JP | 11-41602 A | 2/1999 |
| JP | 11-66280 A | 3/1999 |
| JP | 11-177819 A | 7/1999 |
| JP | 11-272861 A | 10/1999 |
| JP | 11-355575 A | 12/1999 |
| JP | 2000-306089 A | 11/2000 |
| JP | 2000-316090 A | 11/2000 |
| WO | 98/54903 | 12/1998 |

OTHER PUBLICATIONS

J. Luo et al., "A Robust Technique for Image Descreening Based on the Wavelet Transform," IEEE Transactions on Signal Processing, vol. 46, No. 4, Apr. 1998, pp. 1179-1184.

Matozaki, T., "Wavelet wo mochiita Kyobu X-sen Gazou no Kyocho," Denchi Joho Tsushin Gakkai Ronbunshi D-II, Japan (Jan. 25, 2000) vol. J83-D-II, No. 1, pp. 408-414.

Kosanetzky, J., et al. *"Energy Resolved X-Ray Diffraction CT,"* Application of Optical Instrumentation in Medicine XIV and Picture Archiving and Communication Systems (PACS IV) for Medical Applications, Roger H. Schneider, Samuel J. Dwyer III, Editors, SPIE, vol. 626, pp. 137-142 (Feb. 1986) [ISBN 0-89252-661-0].

Ohtani, M., et al., Japanese Journal of Radiological Technology, vol. 45, No. 8 (Aug. 1989), p. 1030.

Anan, et al., "Proceedings of 45th Annual Meeting", Japanese Journal of Radiological Technology, vol. 45, No. 8, Aug. 1989, p. 1030.

Stahl et al., "Noise-resistant Weak-structure Enhancement for Digital Radiography", SPIE, Institute of Imaging and Computer Vision, vol. 3661: Medical Imaging 99, pp. 1406-1417 (1999).

Canadian Office Action Dated Mar. 23, 2009, Issued in the Canadian Application 2,427,462.

* cited by examiner

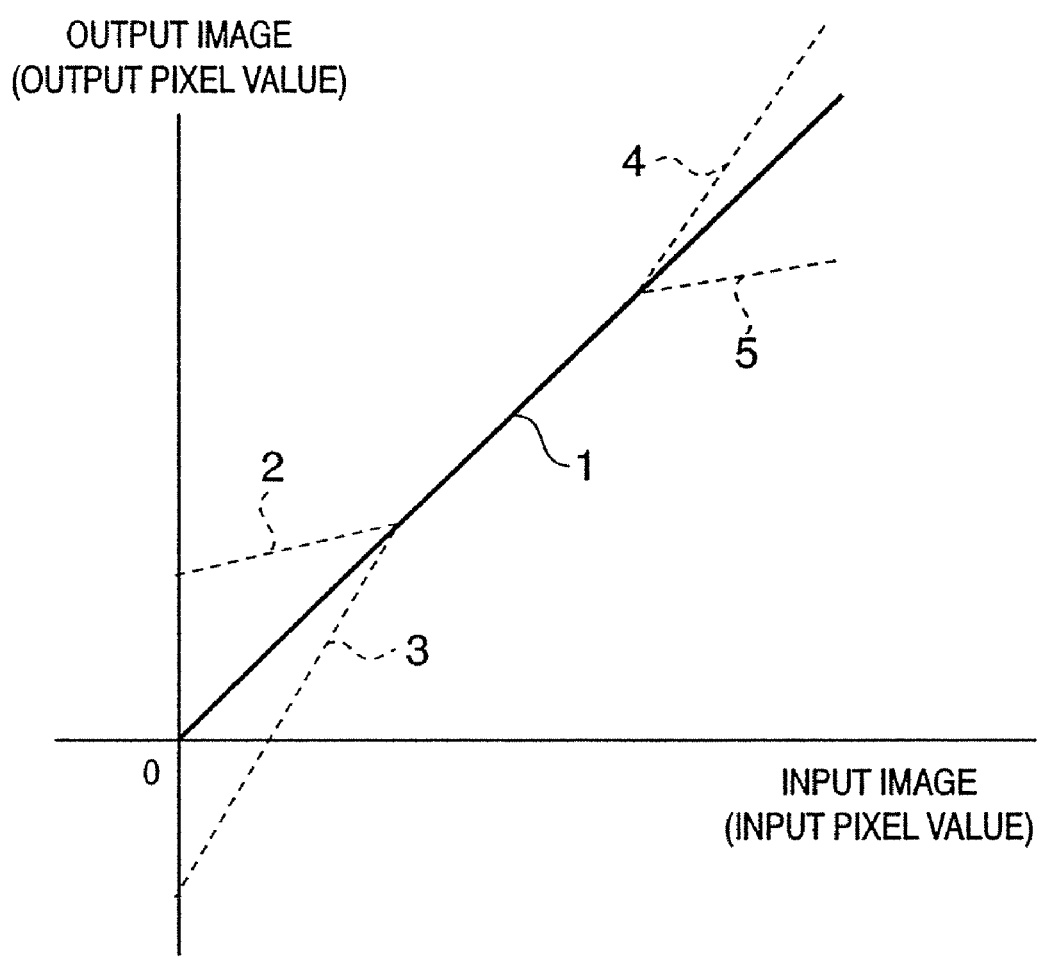
F I G. 10

FIG. 24A
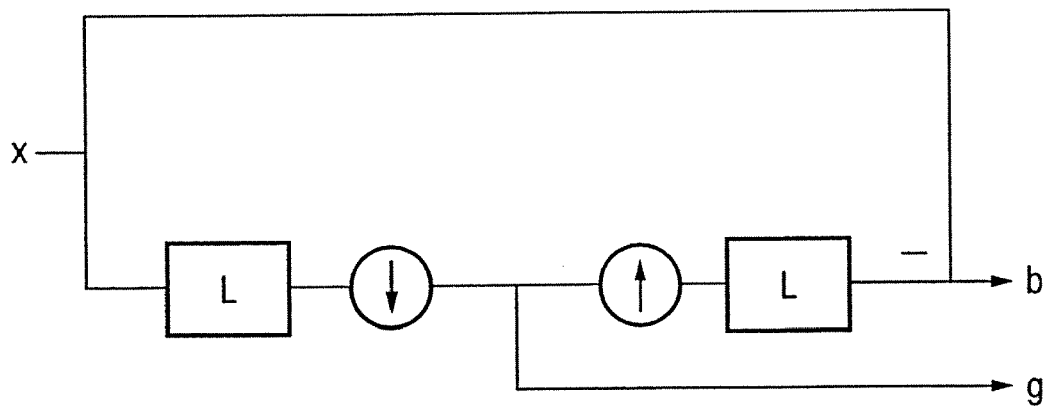
FIG. 24B
| 0.0025 | 0.0125 | 0.02 | 0.0125 | 0.0025 |
|---|---|---|---|---|
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |
FIG. 24C
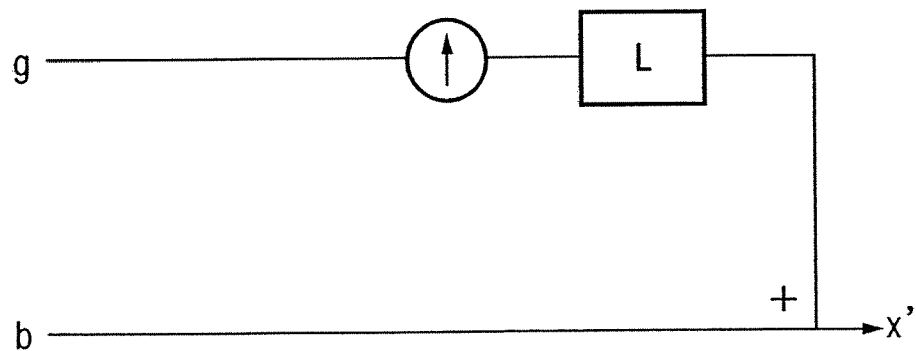

F I G. 34
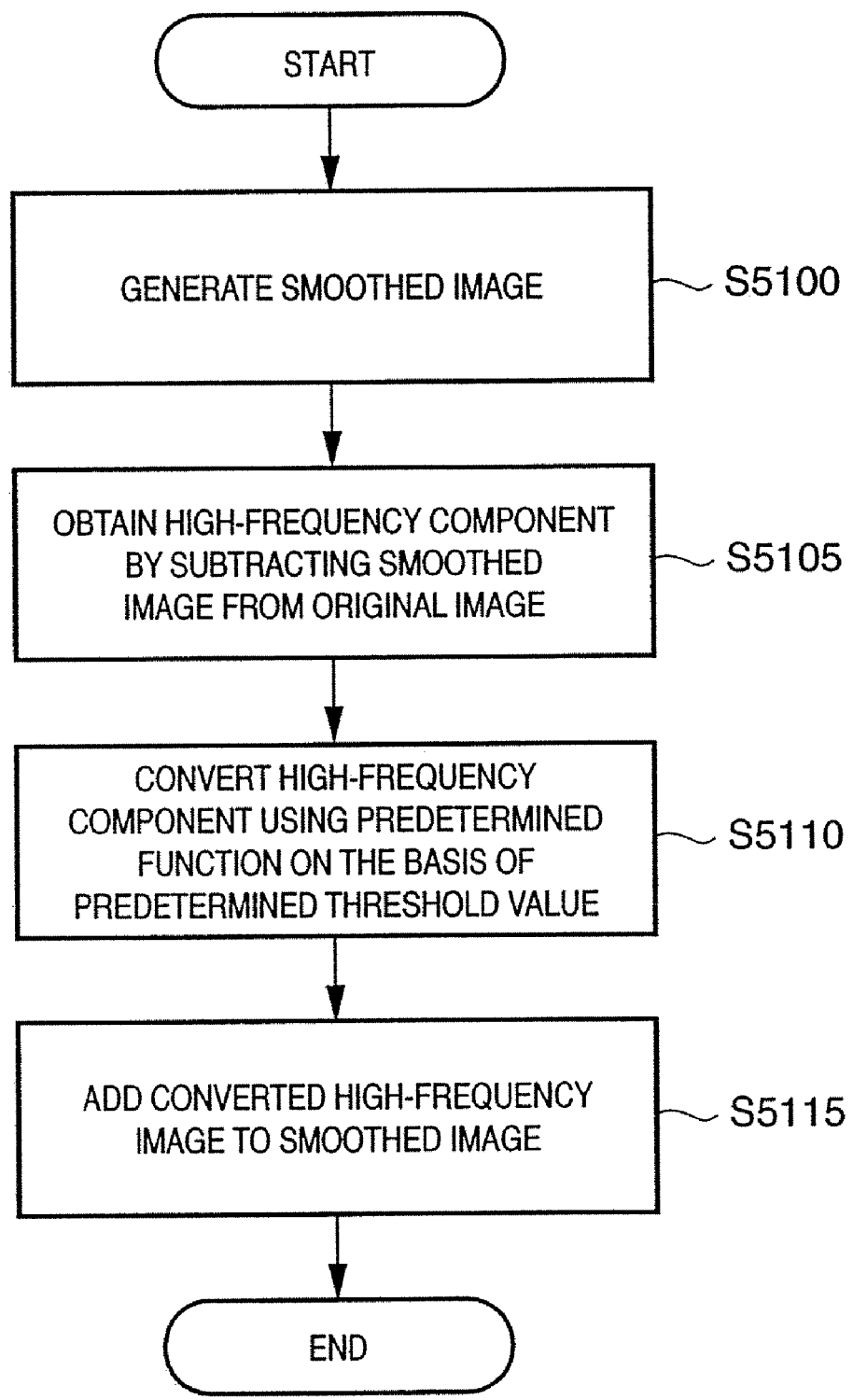

FIG. 51

| 0.0025 | 0.0125 | 0.02 | 0.0125 | 0.0025 |
|--------|--------|------|--------|--------|
| 0.0125 | 0.0625 | 0.1  | 0.0625 | 0.0125 |
| 0.02   | 0.1    | 0.16 | 0.1    | 0.02   |
| 0.0125 | 0.0625 | 0.1  | 0.0625 | 0.0125 |
| 0.0025 | 0.0125 | 0.02 | 0.0125 | 0.0025 |

IMAGE PROCESSING APPARATUS, IMAGE PROCESSING METHOD, STORAGE MEDIUM, AND PROGRAM

CROSS REFERENCE TO RELATED APPLICATIONS

This application is a continuation of U.S. application Ser. No. 11/374,214, filed on Mar. 14, 2006, which is a continuation of U.S. application Ser. No. 10/166,657, filed on Jun. 12, 2002, now U.S. Pat. No. 7,079,700 B2, which is a continuation of International Application No. PCT/JP01/10388, filed Nov. 28, 2001. The entire disclosure of the prior applications are incorporated herein by reference.

TECHNICAL FIELD

The present invention relates to an image processing apparatus and method and, more particularly, to an image processing apparatus and method for changing the dynamic range of image data, and an image processing apparatus and method for executing a frequency emphasis or suppression process such as sharpening or the like of an image that contains an edge structure or the like.

BACKGROUND ART

For example, an X-ray chest image has a very broad range of pixel values since it is made up of an image region of lungs through which X-rays are readily transmitted, and an image region of a mediastinal part through which X-rays are hardly transmitted. For this reason, it has been considered to be difficult to obtain an X-ray chest image that allows to simultaneously observe both the lungs and mediastinal part.

As a method of avoiding this problem, a method described in SPIE Vol. 626 MedicineXIV/PACSIV (1986) is known. This method is described using constants A, B, and C (for example, A=3, B=0.7) by:

$$S_D = A[S_{org} - S_{US}] + B[S_{US}] + C \quad (1)$$

where $S_D$ is the pixel value of an image after processing, $S_{org}$ is the pixel value (input pixel value) of an original image (input image), and $S_{US}$ is the pixel value of a low-frequency image of the original image.

This method can change weighting coefficients for high-frequency components (first term) and low-frequency components (second term). For example, when A=3 and B=0.7, the effect of emphasizing the high-frequency components and compressing the overall dynamic range can be obtained. Five radiologists evaluated that this method is effective for diagnosis compared to an image without any processing.

If the ratio of A is increased in equation (1), the ratio of high-frequency components increases, and a sharpening effect can be obtained. On the other hand, if the ratio of B is changed, the magnitudes of low-frequency components are changed as well as the dynamic range of the image $S_D$.

Japanese Patent No. 2509503 describes a method which is described by:

$$S_D = S_{org} + F[G(Px, Py)] \quad (2)$$

where $S_D$ is the pixel value after processing, $S_{org}$ is the original pixel value (input pixel value), Py is the average profile of a plurality of Y-profiles of an original image, and Px is the average profile of a plurality of X-profiles.

The characteristics of the function F(x) will be explained below. If "x>Dth", F(x) becomes "0". If "0≤x≤Dth", F(x) monotonously decreases to have "E" as a segment and "E/Dth" as a slope. F(x) is given by:

$$F(x) = E - (E/Dth)x, \text{ when } 0 \leq x \leq Dth \quad (3)$$
$$= 0, \text{ when } x > Dth$$

$$Py = (\Sigma Pyi)/n \quad (4)$$

$$Px = (\Sigma Pxi)/n \quad (5)$$

where (i=1 to n), and Pyi and Pxi are profiles. For example, G(Px, Py) is given by:

$$G(Px, Py) = \max(Px, Py) \quad (6)$$

In this method, of the pixel value (density value) range of the original image, the pixel value (density value) range in which the pixel values of a low-frequency image are equal to or smaller than Dth is compressed.

As a method similar to the method of Japanese Patent No. 2509503, a method described in "Anan et. al., Japanese Journal of Radiological Technology, Vol. 45, No. 8, August 1989, p. 1030", and Japanese Patent No. 2663189 is known. Using the monotone decreasing function f(x), this method is described by:

$$S_D = S_{org} + f(S_{US}) \quad (7)$$

$$S_{US} = \Sigma S_{org}/M^2 \quad (8)$$

where $S_D$ is the pixel value after processing, $S_{org}$ is the original pixel value, and $S_{US}$ is the average pixel value upon calculating a moving average using a mask size M×M pixels in the original image.

In this method, the low-frequency image generation method is different from that in the method given by equation (2). In the method given by equation (2), a low-frequency image is generated based on one-dimensional data, while in this method, a low-frequency image is generated based on two-dimensional data. In this method as well, of the pixel value (density value) range of the original image, the pixel value (density value) range in which the pixel values of a low-frequency image are equal to or smaller than Dth is compressed.

The aforementioned dynamic range compression method can be expressed using a function f1( ) of converting a low-frequency image by:

$$S_D = f1(S_{US}) + (S_{org} - S_{US}) \quad (9)$$

Note that the variable of a function may be omitted for the sake of simplicity in this specification.

In equation (9), the dynamic range is changed by changing low-frequency components using the function f1( ). The dynamic range compression method given by equation (9) will be explained below. FIGS. 1 and 2 are views for explaining the principle of that method. The uppermost view in FIG. 1 shows the profile of an edge portion of an original image, the middle view shows the profile of a smoothed image of that original image, and the lowermost view shows the profile of a high-frequency image generated by subtracting the smoothed image from the original image. In FIG. 2, the uppermost view shows the profile of an image obtained by multiplying by ½ the absolute values of the smoothed image in the middle view of FIG. 1, the middle view shows the same profile as that of the high-frequency image in FIG. 1, and the lowermost view shows the profile of an image obtained by adding the high-frequency image in the interrupt view to the image in the uppermost view obtained by converting the values of the smoothed image. A process for obtaining an image, the dynamic range of which is compressed, like the image shown in the lowermost view in FIG. 2, is called a dynamic range compression process.

As can be seen from FIG. 1, the smoothed image cannot maintain an edge structure in the edge portion, and the high-frequency components have large values at the edge portion. Note that the source original image can be recovered by adding the smoothed image and high-frequency image.

However, as shown in FIG. 2, when the high-frequency image is added to the image obtained by converting the values of the low-frequency image, the edge structure collapses, as indicated by arrows in FIG. 2. Such phenomenon is called overshoot/undershoot (to be also referred to as overshoot, overshoot, or the like hereinafter).

Note that equation (10) changes the original image by the function f1( ), and expresses normal tone conversion; it can change the dynamic range of the overall original image.

$$S_D = f1(S_{org}) \quad (10)$$

In recent years, a multiple-frequency process (to be also referred to as a multiple-frequency transformation process hereinafter) using Laplacian pyramid transformation and wavelet transformation has been developed. In such multiple-frequency process, high-frequency components such as Laplacian coefficients or wavelet coefficients (to be referred to as frequency coefficients hereinafter) obtained by decomposing an image into frequency components are converted using a nonlinear function shown in FIG. 3 or 4. In FIGS. 3 and 4, the abscissa plots the input coefficients, and the ordinate plots the output coefficients. FIGS. 3 and 4 show conversion curves when the coefficients are +, and the same conversion is made even when the coefficients are −. That is, FIGS. 3 and 4 show only the first quadrant of an odd function. In this specification, all functions used to convert frequency coefficients are odd functions, and only their first quadrants are shown. Also, "curve" and "functions" may be used as equivalent terms. FIG. 3 shows a monotone increasing concave function (upward convex). When coefficients are converted using such function form, coefficients can be increased in a small coefficient region, and the coefficients can be saturated in a large coefficient region. Therefore, when the small coefficient region expresses effective image components of, e.g., a fine structure, an image process that emphasizes the fine structure is done. In addition, since the coefficients of the large coefficient region are saturated, an effect of suppressing emphasis of an edge structure or the like can be obtained.

The curve form shown in FIG. 4 is used in a method called degeneracy of wavelet, and converts frequency coefficients less than a predetermined absolute value (threshold value) 3001 shown in FIG. 4 into 0 (zero), thus providing an effect of suppressing noise.

Furthermore, a method of changing the dynamic range of a recovered image by changing coefficients in the lowermost-frequency band in the multiple-frequency process is known.

Along with the advance of digital technologies in recent years, a radiation image such as an X-ray image or the like is converted into a digital signal, such digital image undergoes an image process, and the processed image is displayed on a display device (e.g., a CRT, liquid crystal display, or the like) or is recorded on a recording medium such as a film or the like by a recording apparatus (printer or the like). Such image process is categorized into a pre-process for correcting an image obtained from an image sensing device depending on the characteristics or the like of the image sensing device, and a quality assurance (QA) process for converting the image (original image) that has undergone the pre-process into an image with image quality suitable for diagnosis. Of these processes, the QA process includes frequency processes such as a sharpening process for emphasizing the high-frequency components of an original image, a noise reduction process for suppressing high-frequency components, and the like.

The sharpening process is based on the following process. That is, a high-frequency image as high-frequency components of an original image shown in FIG. 5C is generated by subtracting a blurred image (smoothed image) as low-frequency components of the original image shown in FIG. 5B from the original image (including an edge portion) shown in FIG. 5A. Then, as shown in FIG. 6, the high-frequency image is added to the original image to obtain an image with higher sharpness (sharpened image). FIGS. 5A, 5B, and 5C are waveform charts for explaining the sharpening process, in which FIG. 5A is a waveform chart showing the profile of the original image including an edge portion, FIG. 5B is a waveform chart showing the profile of the smoothed image obtained by smoothing the original image shown in FIG. 5A, and FIG. 5C is a waveform chart showing the profile of the high-frequency image generated by subtracting the smoothed image shown in FIG. 5B from the original image shown in FIG. 5A. FIG. 6 is a waveform chart showing the profile of the sharpened image obtained by adding the high-frequency image shown in FIG. 5C to the original image shown in FIG. 5A.

With the dynamic range compression process given by equation (1), since high- and low-frequency components are converted by uniformly multiplying by different constants, the dynamic range compression process can be achieved, but overshoot occurs.

The dynamic range compression process given by equation (2) has no disclosure about an idea that adjusts high-frequency components, and changes only low-frequency components. Hence, the dynamic range compression process can be achieved, but overshoot occurs.

With the dynamic range compression process which is given by equation (9) and adds high-frequency components to the converted smoothed image (low-frequency components), only low-frequency components are converted, and high-frequency components remain the same. Hence, overshoot occurs again.

For example, when the entire smoothed image is converted to be ½ in FIG. 2, if high-frequency components of portions corresponding to overshoot and undershoot are multiplied by ½, the edge structure is preserved in the image of the dynamic range compression process. However, when the entire smoothed image is converted to be ⅓ or is converted using a complicated curve form, overshoot or undershoot occurs if the high-frequency components of portions corresponding to overshoot and undershoot are multiplied by ½.

As a method of suppressing such overshoot and undershoot, the present applicant has filed Japanese Patent Laid-Open No. 2000-316090. This method suppresses overshoot and undershoot by suppressing high-frequency component values corresponding to overshoot and undershoot portions. However, such method of suppressing portions with large high-frequency value portions can suppress overshoot and undershoot, but cannot perfectly preserve the edge structure. Therefore, portions where high-frequency components are suppressed become unnatural.

On the other hand, the edge structure can be perfectly preserved if high- and low-frequency components are changed at the same ratio, like in FIG. 1 in which the original image can be recovered by adding the high-frequency image and smoothed image. However, such method is nothing but tone conversion given by equation (10). Since simple tone conversion can adjust the dynamic range but cannot adjust frequency components, when, for example, the dynamic range is compressed, a fine structure or the like undesirably flattens out. Also, the effect of the sharpening process or the like cannot be obtained.

Upon converting the frequency coefficients in the multiple-frequency process using the conversion curve shown in FIG. 3, overshoot can be suppressed by the same effect as in Japanese Patent Laid-Open No. 2000-316090. However, the edge structure cannot be perfectly preserved, either, as described above, and an unnatural edge portion may appear.

Also, when the coefficients of the lowest-frequency band are changed, the edge structure cannot be preserved due to the same principle as described above, and overshoot may be generated. That is, when the absolute values of coefficients of a partial frequency band which forms the edge portion are changed, the structure of the edge portion collapses somehow, thus generating unnaturalness (artifacts).

If all the frequency coefficients are changed at an identical ratio, the edge structure can be prevented from collapsing. However, such change is merely tone conversion. Hence, no effect of the frequency process is expected.

When coefficients are converted using the conversion curve shown in FIG. 4, the edge structure is preserved in an inversely converted image (e.g., an image that has undergone inverse wavelet transformation) However, since there is no idea of emphasizing coefficients, the sharpening effect cannot be obtained by the inversely converted image at all. When the slope of the curve in FIG. 4 is set other than 1, the edge structure is not preserved, and overshoot or the like occurs.

On the other hand, the conventional sharpening process cannot sharpen an image that contains an edge portion with high quality. For example, as best illustrated in FIG. 7, since high-frequency components of the edge portion have values extremely larger than those of other portions, extremely protruding regions (regions a and b indicated by circles in FIG. 7) may appear in a sharpened image obtained by adding them. Note that FIG. 7 is a waveform chart showing the profile of a sharpened image that suffers overshoot. These regions a and b are artifacts called overshoot (region b may also be called undershoot). Such image, the edge portion of which is excessively emphasized by overshoot, is unnatural. Especially, in case of a medical image such as a radiation image or the like which is used in diagnosis, generation of such artifacts is not preferable. On the other hand, in order to suppress overshoot, a high-frequency image may be decreased at a predetermined ratio, and may then be added to an original image. However, the effect of the sharpening process undesirably lowers in a region other than the edge portion.

In the above description, when high-frequency components are emphasized while preserving low-frequency components of an image, the edge structure collapses (the same applies to suppression of low-frequency components while preserving high-frequency components). Conversely, when high-frequency components are suppressed while preserving low-frequency components of an image, the edge structure collapses again (the same applies to emphasis of low-frequency components while preserving high-frequency components). In this case, in place of overshoot, sharpness of the edge portion is lost, and the edge structure collapses with the edge portion being blurred.

DISCLOSURE OF INVENTION

The present invention has been made to solve the aforementioned problems, and has as its object to provide an image processing apparatus and method, and a computer-readable medium and program, which can obtain a high-quality image, the dynamic range or partial pixel value range of which has been changed while suppressing or avoiding collapse of the edge structure of an image or generation of overshoot.

Also, the present invention has been made to solve the aforementioned problems, and has as its object to provide an image processing apparatus and method, and a computer-readable medium and program, which can obtain a high-quality image, desired spatial frequency components of which have been emphasized or suppressed, while suppressing or avoiding collapse of the edge structure of an edge portion included in an objective image.

According to the first aspect of the present invention, there is provided an image processing apparatus comprising tone conversion means for executing tone conversion of an image, and component conversion means for converting frequency components of a plurality of frequency bands of the image or an image after that image has undergone tone conversion by the tone conversion means, on the basis of values of the frequency components and tone conversion characteristics of the tone conversion means.

According to the second aspect of the present invention, there is provided an image processing apparatus comprising tone conversion means for executing tone conversion of an image, frequency transformation means for decomposing the image that has undergone tone conversion by the tone conversion means into frequency components of a plurality of frequency bands, and component conversion means for converting the frequency components of the plurality of frequency bands obtained by the frequency transformation means, on the basis of values of the frequency components and tone conversion characteristics of the tone conversion means.

According to the third aspect of the present invention, there is provided an image processing apparatus comprising first frequency transformation means for decomposing an image into first frequency components of a plurality of frequency bands, tone conversion means for executing tone conversion of the image, second frequency transformation means for decomposing the image that has undergone tone conversion by the tone conversion means into second frequency components of a plurality of frequency bands, and component conversion means for converting the second frequency components of the plurality of frequency bands by adding frequency components, which are obtained by converting the first frequency components of the plurality of frequency bands on the basis of values of the first frequency components of the plurality of frequency bands and tone conversion characteristics of the tone conversion means, to the second frequency components of the plurality of frequency bands.

According to the fourth aspect of the present invention, there is provided an image processing apparatus comprising tone conversion means for executing tone conversion of an image, frequency transformation means for decomposing the image into frequency components of a plurality of frequency bands, component conversion means for converting frequency components of a plurality of frequency bands obtained by the frequency transformation means, on the basis of values of the frequency components and tone conversion characteristics of the tone conversion means, inverse frequency transformation means for generating an image by compositing the frequency components converted by the component conversion means, and addition means for adding the image generated by the inverse frequency transformation means and the image that has undergone tone conversion by the tone conversion means.

According to the fifth aspect of the present invention, there is provided an image processing apparatus comprising frequency transformation means for decomposing an image into frequency components of a plurality of frequency bands, component conversion means for converting the frequency components of the plurality of frequency bands obtained by the frequency transformation means, on the basis of values of the frequency components and tone conversion characteristics, inverse frequency transformation means for generating an image by compositing the frequency components converted by the component conversion means, and tone conversion means for executing tone conversion of the image generated by the inverse frequency transformation means on the basis of the tone conversion characteristics.

According to the sixth aspect of the present invention, there is provided an image processing apparatus comprising tone conversion means for executing tone conversion of an image, and component conversion means for converting high-frequency components of the image or an image after that image has undergone tone conversion by the tone conversion means, on the basis of values of the high-frequency components and tone conversion characteristics of the tone conversion means.

According to the seventh aspect of the present invention, there is provided an image processing apparatus comprising tone conversion means for executing tone conversion of an image, high-frequency component calculation means for calculating high-frequency components of the image, component conversion means for converting the high-frequency components obtained by the high-frequency component calculation means, on the basis of values of the high-frequency components and tone conversion characteristics of the tone conversion means, and addition means for adding the high-frequency components converted by the component conversion means and the image that has undergone tone conversion by the tone conversion means.

According to the eighth aspect of the present invention, there is provided an image processing apparatus comprising tone conversion means for executing tone conversion of an image, high-frequency component calculation means for calculating high-frequency components of the image that has undergone tone conversion by the tone conversion means, component conversion means for converting the frequency components obtained by the high-frequency component calculation means, on the basis of values of the high-frequency components and tone conversion characteristics of the tone conversion means, and addition means for adding the high-frequency components converted by the component conversion means and the image that has undergone tone conversion by the tone conversion means.

According to the ninth aspect of the present invention, there is provided an image processing method comprising the tone conversion step of executing tone conversion of an image, and the component conversion step of converting frequency components of a plurality of frequency bands of the image or an image after that image has undergone tone conversion in the tone conversion step, on the basis of values of the frequency components and tone conversion characteristics of the tone conversion step.

According to the 10th aspect of the present invention, there is provided an image processing method comprising the tone conversion step of executing tone conversion of an image, the frequency transformation step of decomposing the image that has undergone tone conversion in the tone conversion step into frequency components of a plurality of frequency bands, and the component conversion step of converting the frequency components of the plurality of frequency bands obtained in the frequency transformation step, on the basis of values of the frequency components and tone conversion characteristics of the tone conversion means.

According to the 11th aspect of the present invention, there is provided an image processing method comprising the first frequency transformation step of decomposing an image into first frequency components of a plurality of frequency bands, the tone conversion step of executing tone conversion of the image, the second frequency transformation step of decomposing the image that has undergone tone conversion in the tone conversion step into second frequency components of a plurality of frequency bands, and the component conversion step of converting the second frequency components of the plurality of frequency bands by adding frequency components, which are obtained by converting the first frequency components of the plurality of frequency bands, on the basis of values of the first frequency components of the plurality of frequency bands and tone conversion characteristics of the tone conversion means, to the second frequency components of the plurality of frequency bands.

According to the 12th aspect of the present invention, there is provided an image processing method comprising the tone conversion step of executing tone conversion of an image, the frequency transformation step of decomposing the image into frequency components of a plurality of frequency bands, the component conversion step of converting frequency components of the plurality of frequency bands obtained in the frequency transformation step, on the basis of values of the frequency components and tone conversion characteristics of the tone conversion means, the inverse frequency transformation step of generating an image by compositing the frequency components converted in the component conversion step, and the addition step of adding the image generated in the inverse frequency transformation step and the image that has undergone tone conversion in the tone conversion step.

According to the 13th aspect of the present invention, there is provided an image processing method comprising the frequency transformation step of decomposing an image into frequency components of a plurality of frequency bands, the component conversion step of converting the frequency components of the plurality of frequency bands obtained in the frequency transformation step, on the basis of values of the frequency components and tone conversion characteristics, the inverse frequency transformation step of generating an image by compositing the frequency components converted in the component conversion step, and the tone conversion step of executing tone conversion of the image generated in the inverse frequency transformation step, on the basis of the tone conversion characteristics.

According to the 14th aspect of the present invention, there is provided an image processing method comprising the tone conversion step of executing tone conversion of an image, and the component conversion step of converting high-frequency components of the image or an image after that image has undergone tone conversion in the tone conversion step, on the basis of values of the high-frequency components and tone conversion characteristics of the tone conversion step.

According to the 15th aspect of the present invention, there is provided an image processing method comprising the tone conversion step of executing tone conversion of an image, the high-frequency component calculation step of calculating high-frequency components of the image, the component conversion step of converting the frequency components obtained in the high-frequency component calculation step, on the basis of values of the high-frequency components and tone conversion characteristics of the tone conversion means, and the addition step of adding the high-frequency components converted in the component conversion step and the image that has undergone tone conversion in the tone conversion step.

According to the 16th aspect of the present invention, there is provided an image processing method comprising the tone conversion step of executing tone conversion of an image, the high-frequency component calculation step of calculating high-frequency components of the image that has undergone tone conversion in the tone conversion step, the component conversion step of converting the frequency components obtained in the high-frequency component calculation step on the basis of values of the high-frequency components and tone conversion characteristics of the tone conversion means, and addition step of adding the high-frequency components converted in the component conversion step and the image that has undergone tone conversion in the tone conversion step.

According to the 17th aspect of the present invention, there is provided an image processing apparatus comprising a decomposition unit for generating, from an objective image, low-frequency components of the objective image, and high-frequency components of at least one frequency band, a component conversion unit for converting at least the high-frequency components of the at least one frequency band of the low-frequency components and the high-frequency components of the at least one frequency band obtained by the decomposition unit, and an image generation unit for generating a processed image using the high-frequency components of the at least one frequency band converted by the component conversion unit, and the objective image or the low-frequency components, wherein the component conversion unit performs first conversion for converting the high-frequency components of the at least one frequency band and the low-frequency component so that first elements having absolute values not less than a predetermined threshold value in the high-frequency components of the at least one frequency band obtained by the decomposition unit, and the low-frequency components change at substantially the same ratio upon change from the objective image to the processed image, and second conversion, different from the first conversion, for second elements having absolute values less than the predetermined threshold value in the high-frequency components of the at least one frequency band.

According to the 18th aspect of the present invention, there is provided an image processing method comprising the step of generating, from an objective image, low-frequency components of the objective image, and high-frequency components of at least one frequency band thereof, the step of converting at least the high-frequency components of the at least one frequency band of the low-frequency components and the high-frequency components of the at least one frequency band obtained in the generation step, and the step of generating a processed image using the high-frequency components of the at least one frequency band converted in the conversion step, and the objective image or the low-frequency components, and wherein the conversion step includes the step of performing first conversion for converting the high-frequency components of the at least one frequency band and the low-frequency component so that first elements having absolute values not less than a predetermined threshold value in the high-frequency components of the at least one frequency band obtained in the generation step, and the low-frequency components change at substantially the same ratio upon change from the objective image to the processed image, and second conversion, different from the first conversion, for second elements having absolute values less than the predetermined threshold value in the high-frequency components of the at least one frequency band.

According to the 19th aspect of the present invention, there is provided an image processing apparatus comprising a decomposition unit for generating, from an objective image, low-frequency components of the objective image, and high-frequency components of at least one frequency band, a component conversion unit for converting the low-frequency components and the high-frequency components of the at least one frequency band obtained by the decomposition unit, and an image generation unit for generating a processed image using the low-frequency components and the high-frequency components of the at least one frequency band converted by the component conversion unit, and wherein the component conversion unit converts the high-frequency components of the at least one frequency band and the low-frequency component so that first elements having absolute values not less than a predetermined threshold value in the high-frequency components of the at least one frequency band obtained by the decomposition unit, and the low-frequency components change at substantially the same ratio upon change from the objective image to the processed image.

According to the 20th aspect of the present invention, there is provided an image processing apparatus comprising the step of generating, from an objective image, low-frequency components of the objective image, and high-frequency components of at least one frequency band, the step of converting the low-frequency components and the high-frequency components of the at least one frequency band obtained in the generation step, and the step of generating a processed image using the low-frequency components and the high-frequency components of the at least one frequency band converted in the conversion step, and wherein the conversion step includes the step of converting the high-frequency components of the at least one frequency band and the low-frequency component so that first elements having absolute values not less than a predetermined threshold value in the high-frequency components of the at least one frequency band obtained in the generation step, and the low-frequency components change at substantially the same ratio upon change from the objective image to the processed image.

Other objects, features, and effects of the present invention will become apparent from the best mode of carrying out the invention to be described hereinafter with reference to the accompanying drawings.

BRIEF DESCRIPTION OF DRAWINGS

FIG. 10 shows an example of a curve used to change the dynamic range;

FIGS. 24A to 24C are explanatory views of Laplacian pyramid transformation and its inverse transformation;

FIG. 34 is a flow chart showing another image processing method of Embodiment 9;

FIG. 51 shows an example of a low-pass filter shown in FIGS. 37B and 38B.

BEST MODE OF CARRYING OUT THE INVENTION

Embodiment 1

Figure 1:
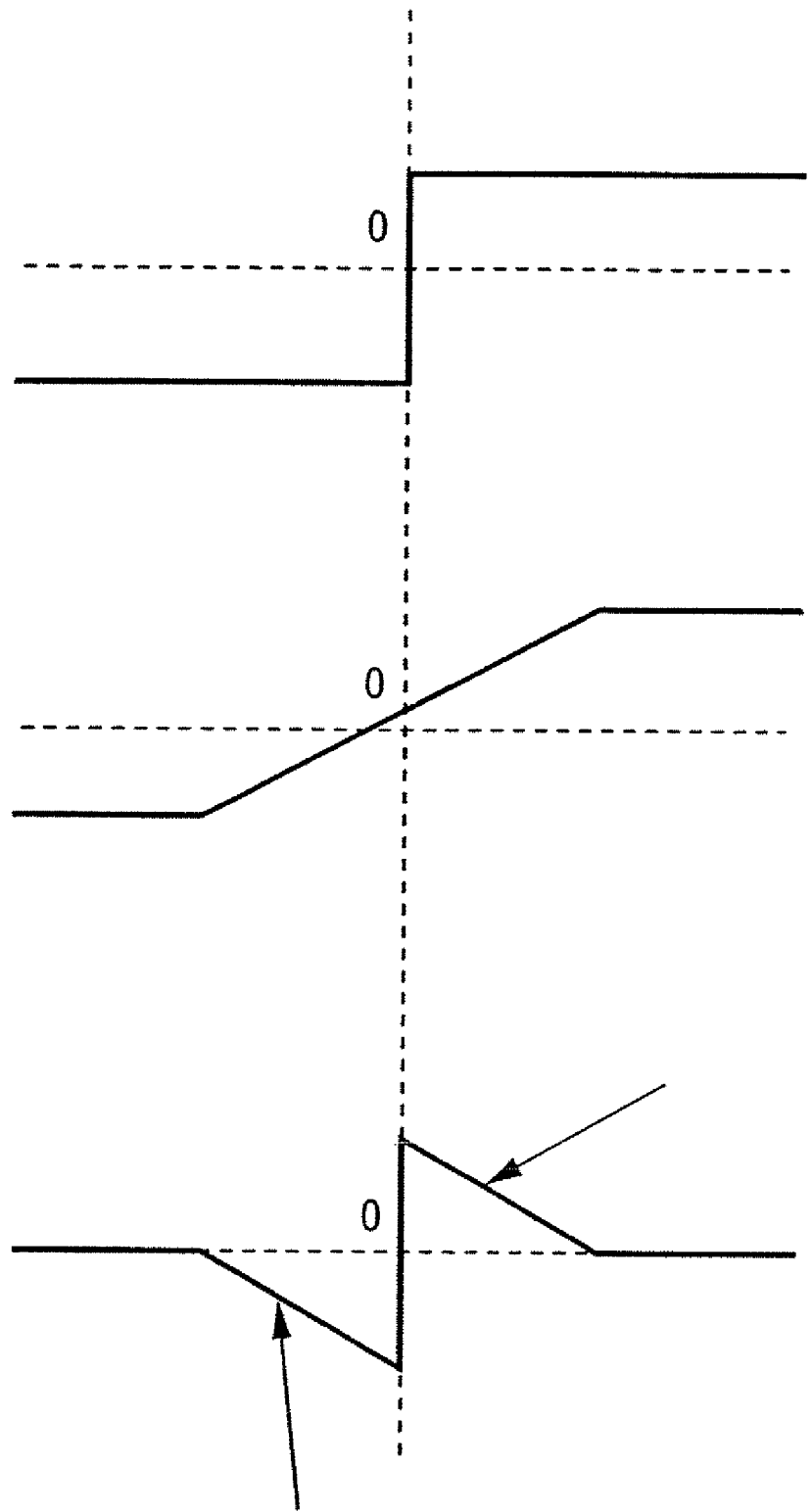
FIG. 1 is a chart for explaining generation of overshoot.
Figure 2:
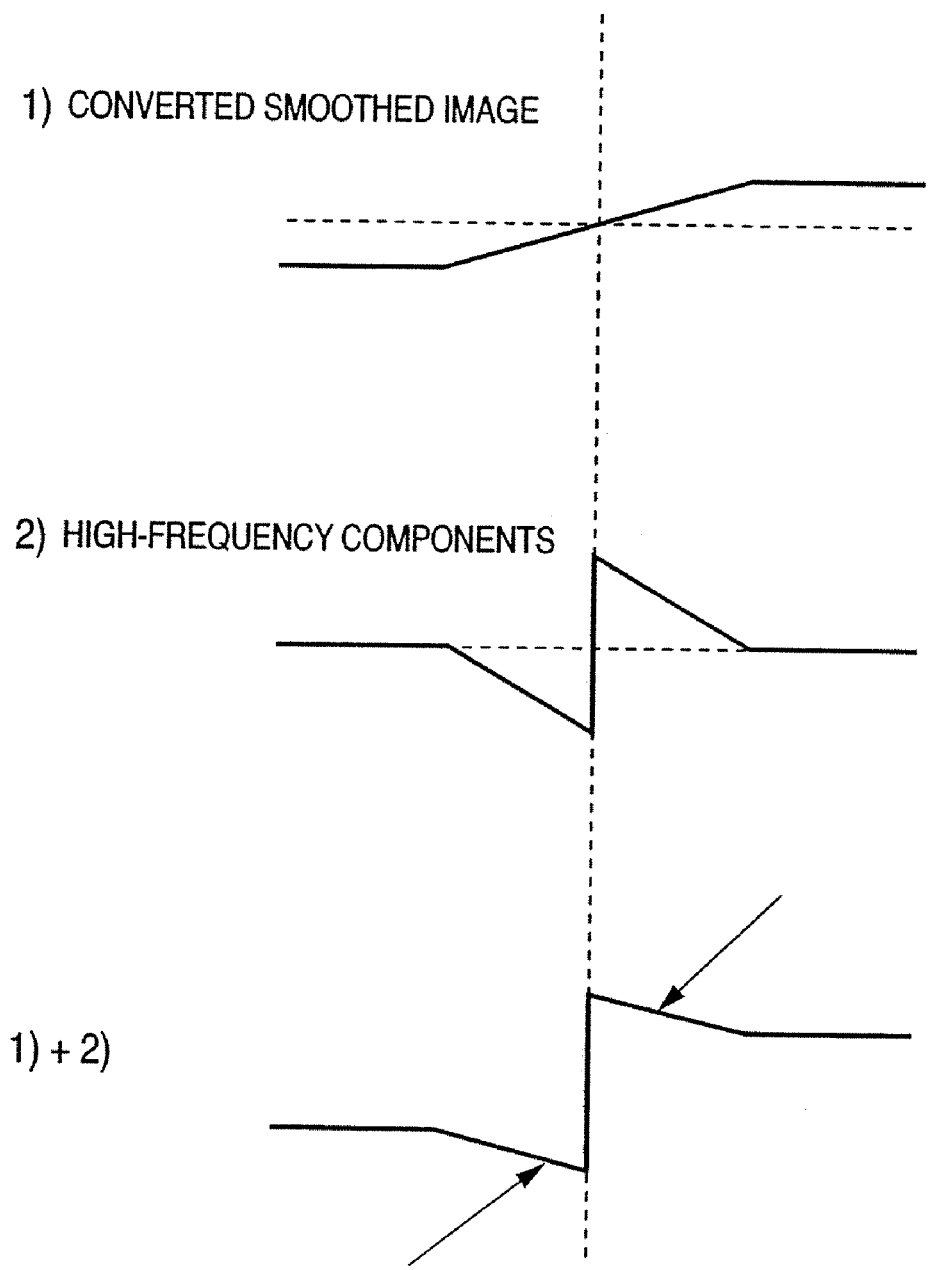
FIG. 2 is a chart for explaining generation of overshoot.
Figure 3:
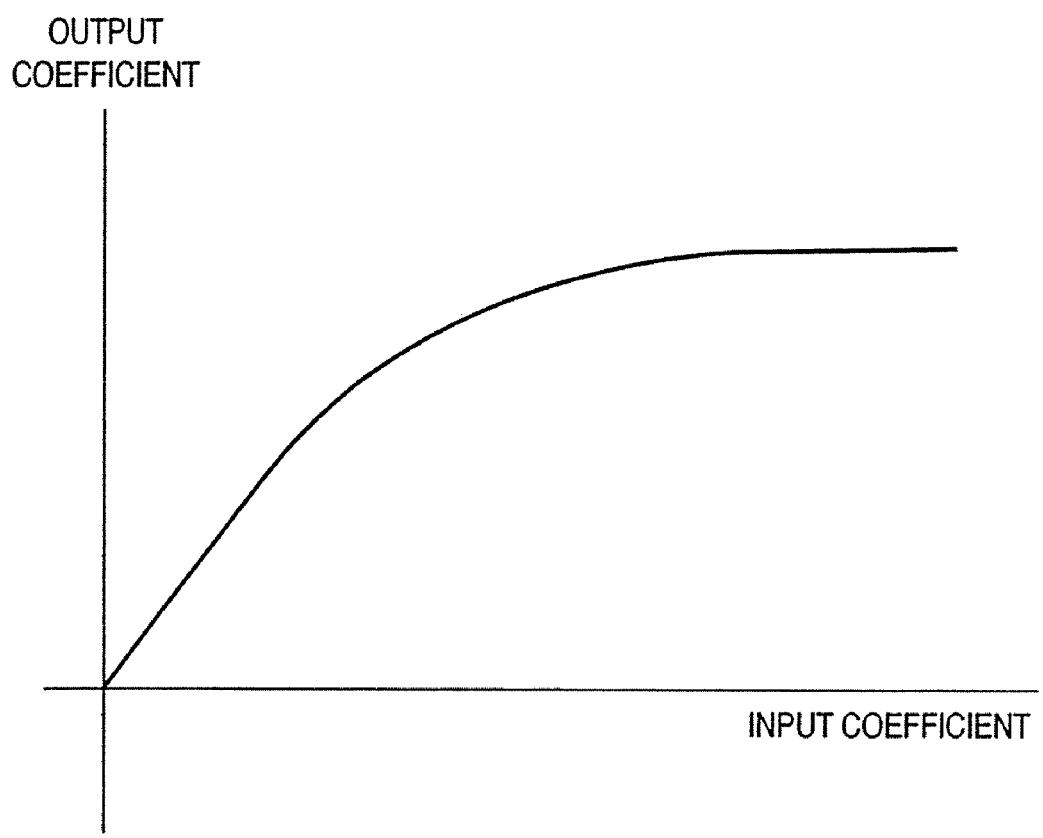
FIG. 3 shows a conventional curve used to convert frequency coefficients.
Figure 4:
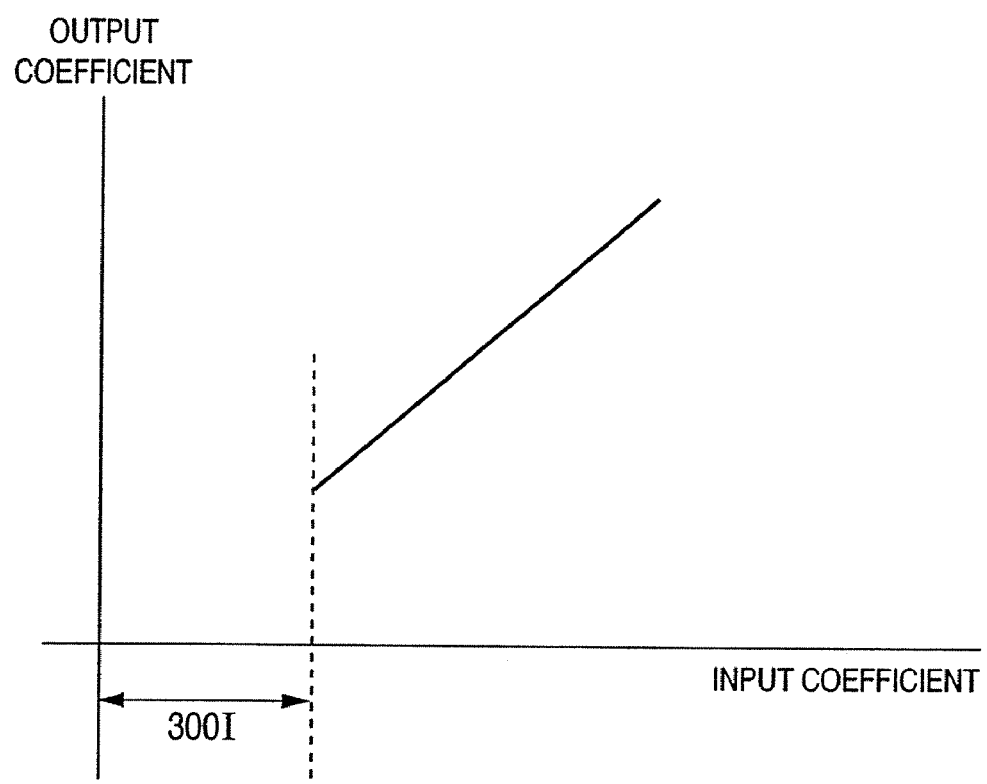
FIG. 4 shows a conventional curve used to convert frequency coefficients.
Figure 5A:
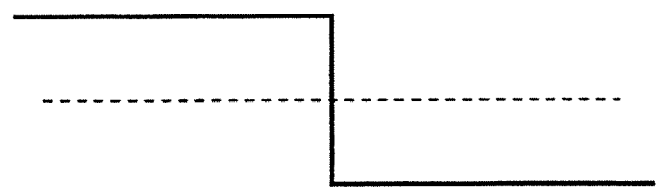
FIGS. 5A to 5C are charts for explaining a conventional sharpening process.
Figure 5B:
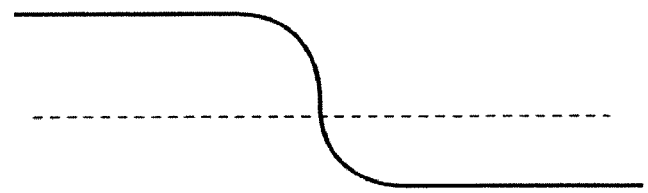
Figure 5C:
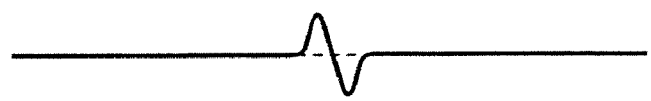
Figure 6:
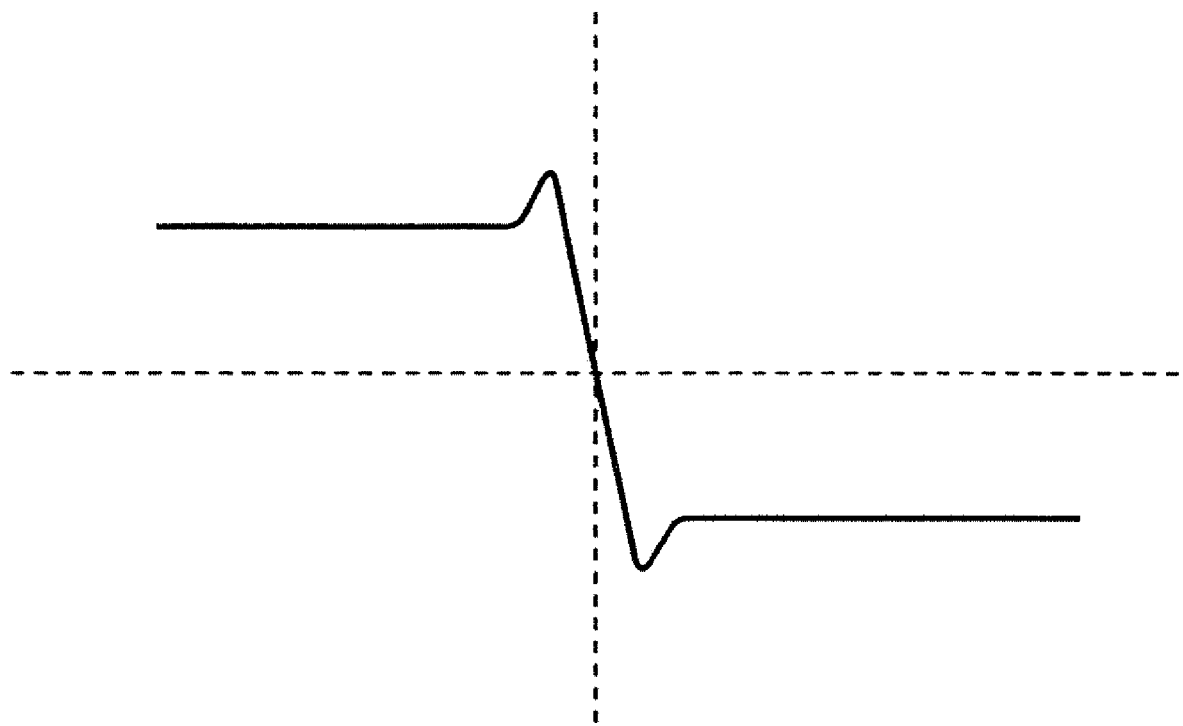
FIG. 6 is a chart showing the profile of a sharpened image.
Figure 7:
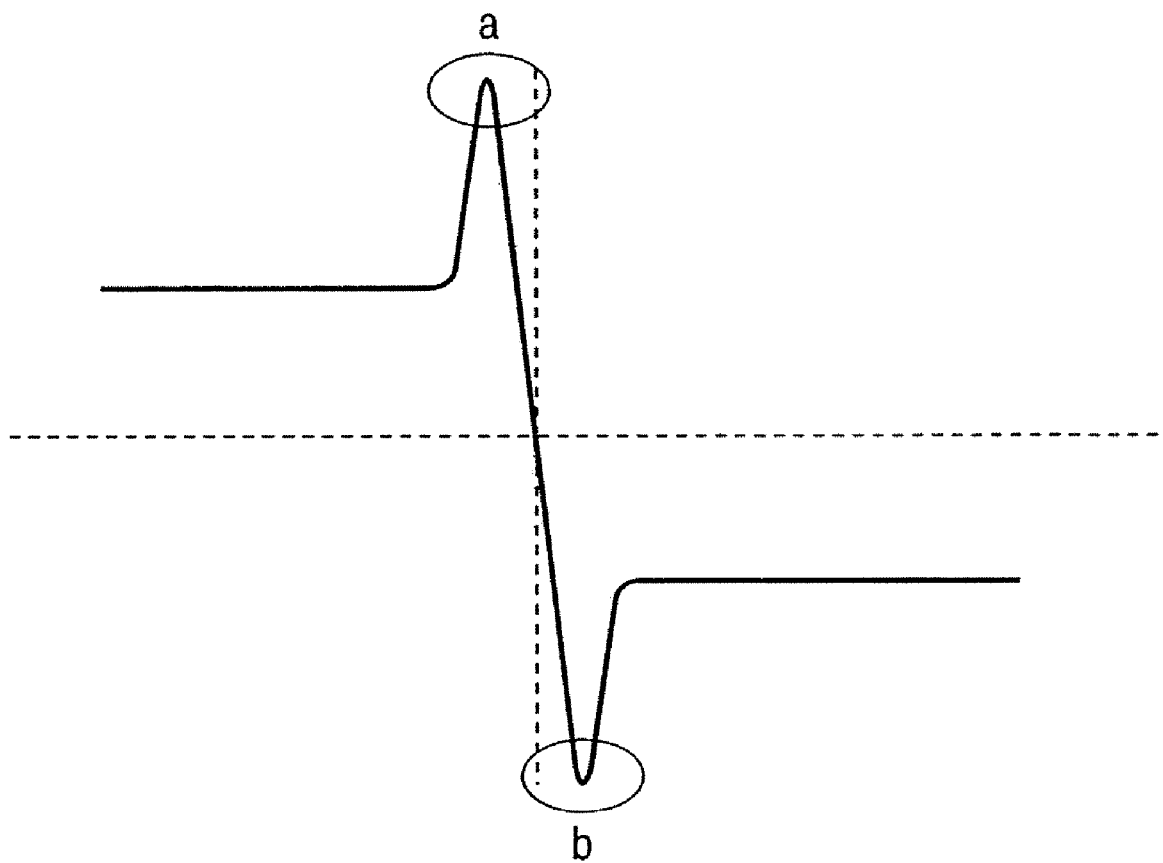
FIG. 7 is a chart showing the profile of a sharpened image which suffers overshoot.
Figure 8:
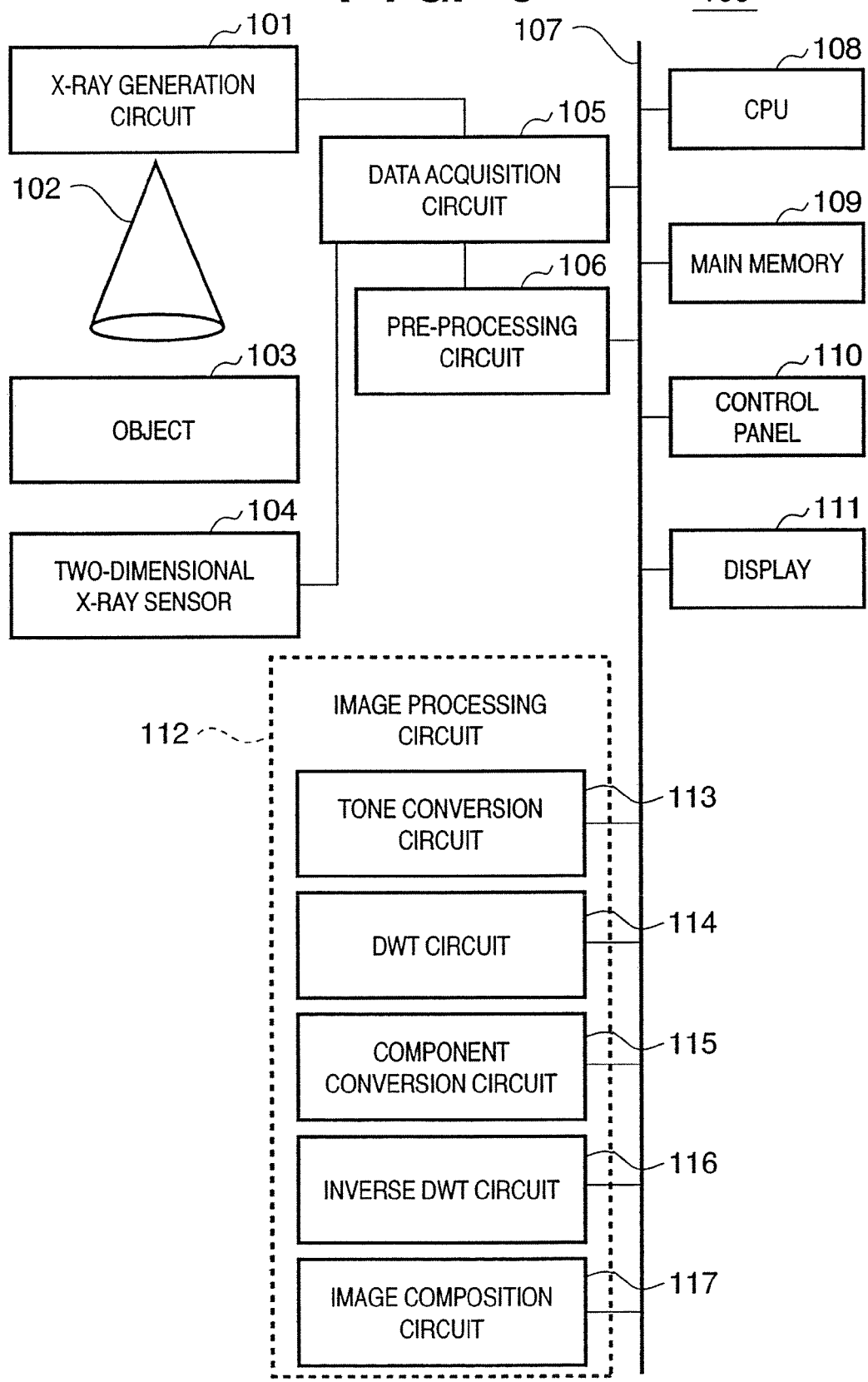
FIG. 8 is a block diagram of an image processing apparatus of Embodiment 1.

FIG. 8 shows an X-ray photographing apparatus 100 according to Embodiment 1. The X-ray photographing apparatus 100 has a function of executing processes for respective frequency bands of a taken image, and comprises a pre-processing circuit 106, CPU 108, main memory 109, control panel 110, image display 111, and image processing circuit 112, which exchange data via a CPU bus 107.

The X-ray photographing apparatus 100 also comprises a data acquisition circuit 105 connected to the pre-processing circuit 106, and a two-dimensional X-ray sensor 104 and X-ray generation circuit 101, which are connected to the data acquisition circuit 105, and these circuits are also connected to the CPU bus 107.

In the aforementioned X-ray photographing apparatus 100, the main memory 109 stores various data and the like required for the processing by the CPU 108, and serves as a work memory for the CPU 108.

The CPU 108 executes operation control and the like of the overall apparatus in accordance with operations at the control panel 110. As a result, the X-ray photographing apparatus 100 operates as follows.

The X-ray generation circuit 101 emits an X-ray beam 102 toward an object 103 to be examined. The X-ray beam 102 emitted by the X-ray generation circuit 101 is transmitted through the object 103 to be examined while being attenuated, and reaches the two-dimensional X-ray sensor 104. The two-dimensional X-ray sensor 104 detects an X-ray image. Assume that the X-ray image is, for example, a human body image or the like in this embodiment.

The data acquisition circuit 105 converts X-ray image information (electrical signal) output from the two-dimensional X-ray sensor 104 into a predetermined electrical signal, and supplies that signal to the pre-processing circuit 106. The pre-processing circuit 106 executes pre-processes such as offset correaction, gain correaction, and the like for the signal (X-ray image signal) from the data acquisition circuit 105. The X-ray image signal that has undergone the pre-processes by the pre-processing circuit is transferred as an original image to the main memory 109 and image processing circuit 112 via the CPU bus 107 under the control of the CPU 108.

Reference numeral 112 denotes a block diagram showing the arrangement of the image processing circuit. In the image processing circuit 112, reference numeral 113 denotes a tone conversion circuit for performing tone conversion of the original image; 114, a DWT circuit for computing the discrete wavelet transforms (to be referred to as DWTs hereinafter) of the original image that has undergone the tone conversion by the tone conversion circuit 113 to obtain image components (wavelet transform coefficients) of respective frequency bands; 115, a component conversion circuit for converting the image components of the respective frequency bands obtained by the discrete wavelet transformation circuit 114; and 116, an inverse DWT circuit for computing the inverse discrete wavelet transforms (to be referred to as inverse DWTs hereinafter) on the basis of the image components converted by the component conversion circuit 115.

Figure 9:
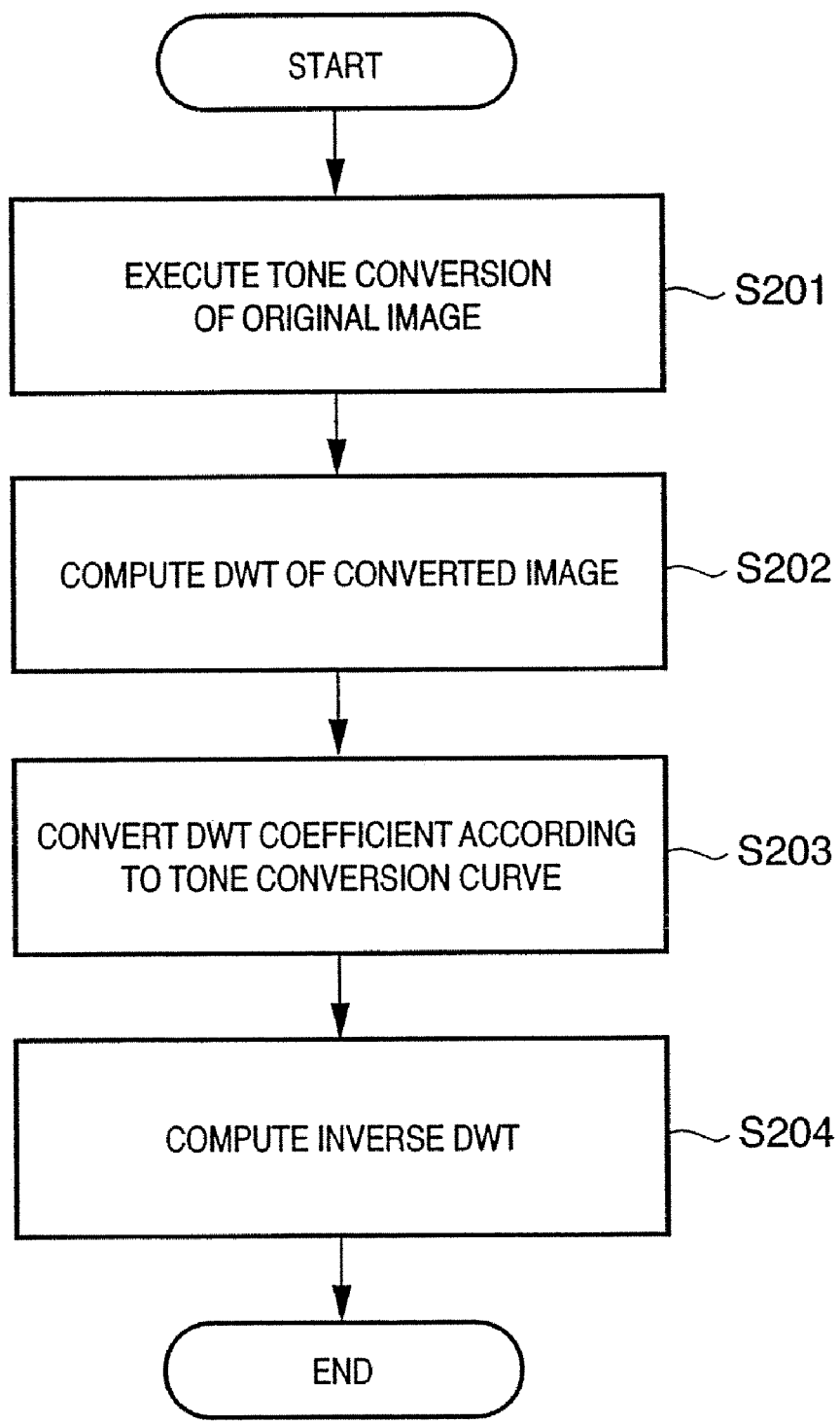
FIG. 9 is a flow chart showing the processing sequence of the image processing apparatus of Embodiment 1.
Figure 11A:
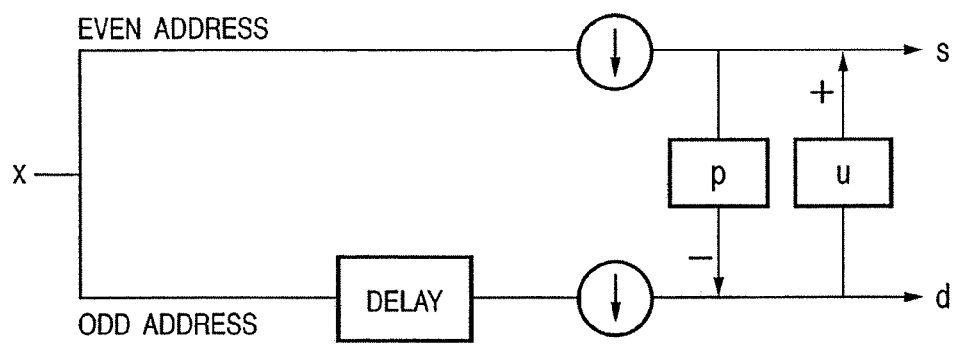
FIGS. 11A to 11C are explanatory views of discrete wavelet transformation and its inverse transformation.
Figure 11B:
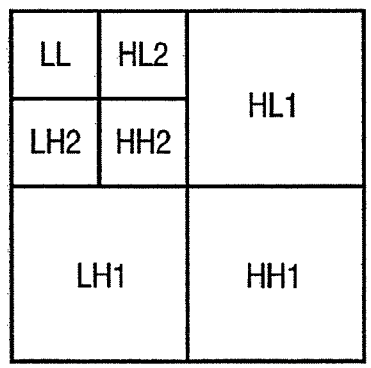
Figure 11C:
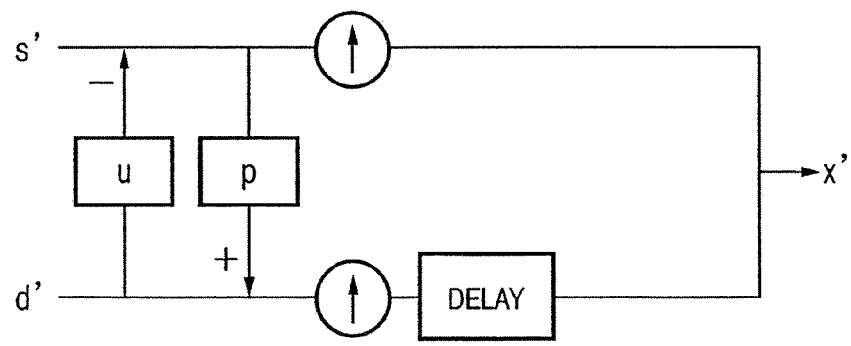
Figure 12:
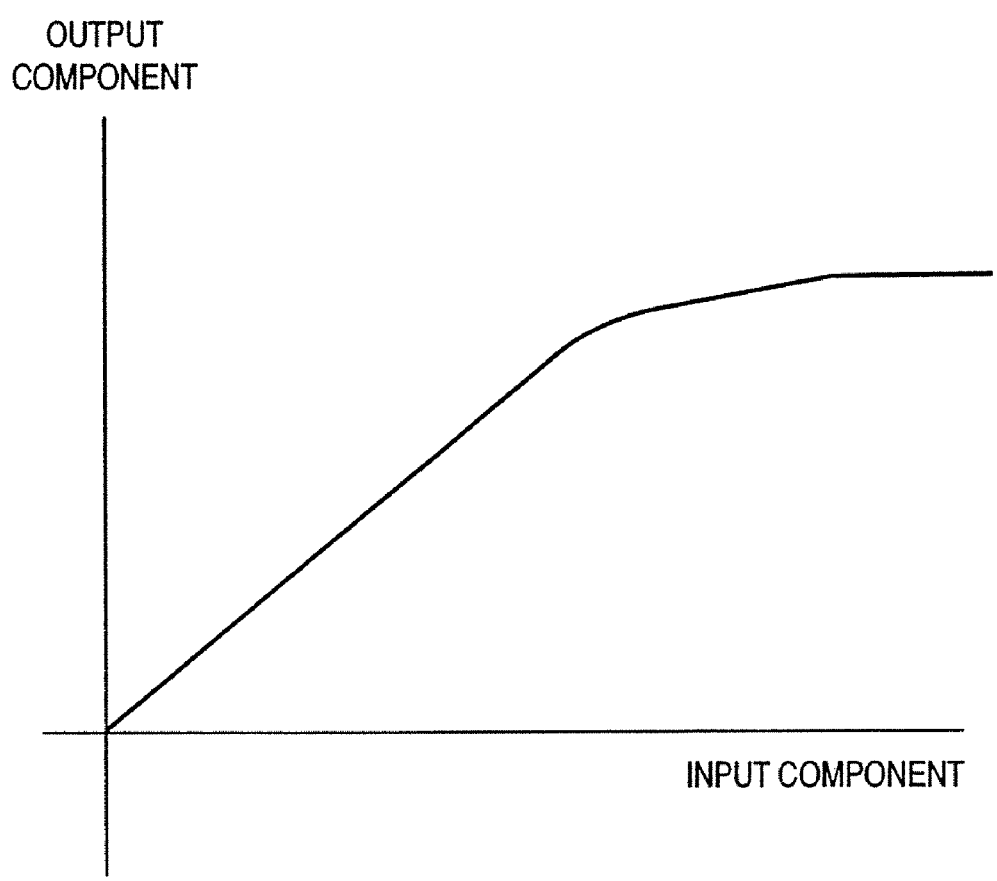
FIG. 12 shows a coefficient conversion curve.
Figure 13:
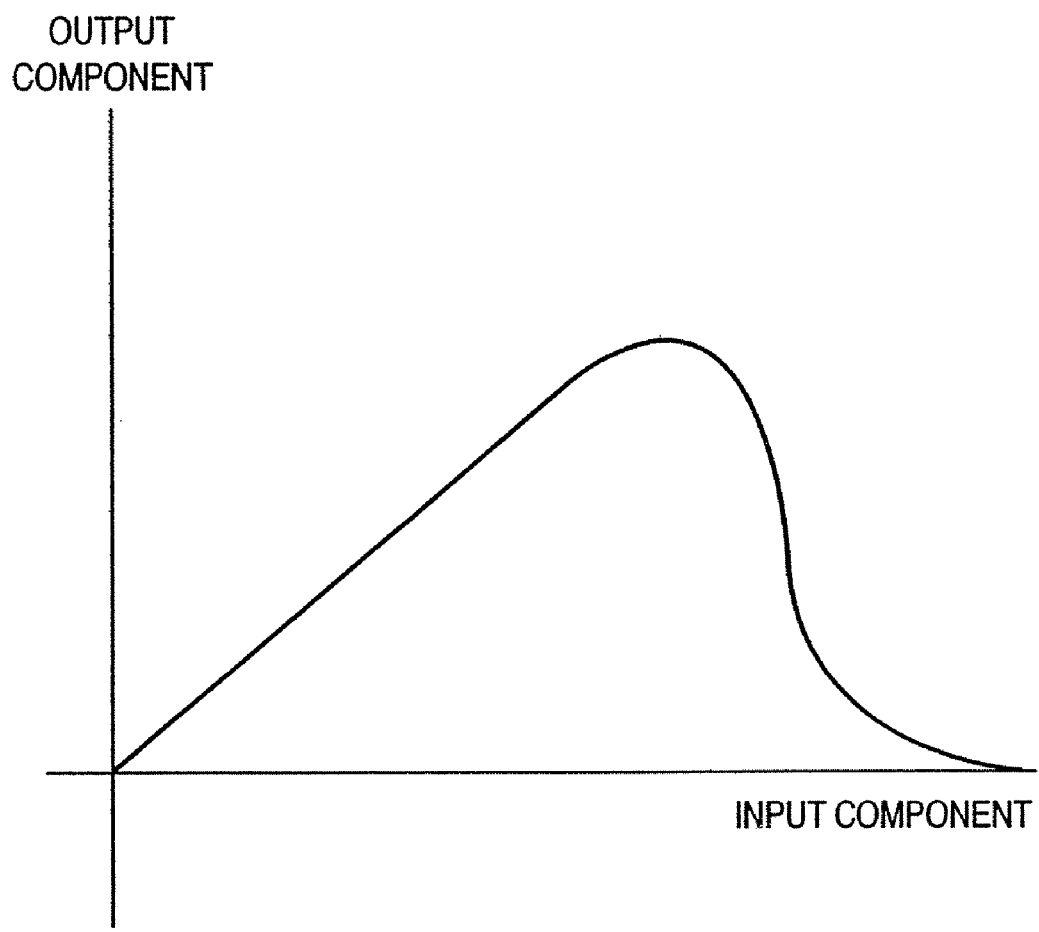
FIG. 13 shows a coefficient conversion curve.

FIG. 9 is a flow chart showing the flow of processes in the image processing circuit 112, FIG. 10 shows an example of a tone conversion curve used to change the dynamic range of image data by the tone conversion circuit 113, FIG. 11A is a circuit diagram showing the arrangement of the DWT circuit 114, FIG. 11B shows an example of the format of transform coefficient groups of two levels obtained by a two-dimensional transformation process, and FIG. 11C is a circuit diagram showing the arrangement of the inverse DWT circuit 116. FIGS. 12 and 13 show examples of function forms used to change image components (transform coefficients obtained by the DWT circuit 114).

The processing in Embodiment 1 will be explained below along with the flow of processes shown in FIG. 9.

An original image that has undergone the pre-processes in the pre-processing circuit 106 is transferred to the image processing circuit 112 via the CPU bus 107.

In the image processing circuit 112, the tone conversion circuit converts an original image $Org(x, y)$ into $f(Org(x, y))$ using a tone conversion curve $f(\ )$ (s201). Note that x and y are the coordinates on the original image. As the tone conversion curve $f(\ )$, for example, a curve form shown in FIG. 10 is used. For example, solid line 1 is a function with slope=1. That is, input and output values are not changed (input and output values are equal to each other), and no dynamic range compression effect is expected. Broken line 2 indicates a function form for compressing the dynamic range on the low pixel value side, and broken line 3 indicates a function form for expanding the dynamic range on the low pixel value side. Likewise, broken line 4 expands the dynamic range on the high pixel value side, and broken line 5 indicates a function form for compressing the dynamic range on the high pixel value side.

In practice, these curve forms are preferably formed to be differential continuous (differentiable and continuous functions). This is because a false edge may be generated at a differential discontinuous point (a point on an image after tone conversion corresponding to a point where a curve is not differentiable or continuous).

The DWT circuit (discrete wavelet transformation circuit) 114 executes a two-dimensional discrete wavelet transformation process of the image $f(Org(x, y))$ after tone conversion, and calculates and outputs image components (transform coefficients). The image data stored in the main memory 109 is sequentially read out and undergoes the transformation process by the DWT circuit 114, and is written in the main memory 109 again. In the DWT circuit 114 of this embodiment, an input image signal is separated into odd and even address signals by a combination of a delay element and down samplers, and undergoes filter processes of two filters p and u. In FIG. 11A, s and d represent low- and high-pass coefficients upon decomposing a linear image signal to one level, and are respectively computed by:

$$d(n)=x(2\times n+1)-\text{floor}((x(2\times n)+x(2\times n+2))/2) \quad (11)$$

$$s(n)=x(2\times n)+\text{floor}((d(n-1)+d(n))/4) \quad (12)$$

where $x(n)$ is an image signal to be transformed.

With the above process, a linear discrete wavelet transformation process is done for an image signal. Since two-dimensional discrete wavelet transformation is implemented by sequentially executing linear discrete wavelet transformation in the horizontal and vertical directions of an image and its details are known to those who are skilled in the art, a description thereof will be omitted. FIG. 11B shows an example of the format of transform coefficient groups of two levels obtained by the two-dimensional discrete wavelet transformation process. An image signal is decomposed into image components HH1, HL1, LH1, . . . , LL in different frequency bands (s202). In FIG. 11B, each of HH1, HL1, LH1, . . . , LL (to be referred to as subbands hereinafter) indicates an image component for each frequency band.

The component conversion circuit converts image component $hn(x, y)$ of each subband by:

$$h2n(x,y)=(1/f'(Org(x,y)))\times hn(x,y) \quad (13)$$

where $h2n(x, y)$ is the converted image component, and n is the subband category.

With this process, image components after the tone conversion process, which become $f'(\ )$ times ($f'(\ )$ is the slope of the tone conversion curve $f(\ )$ in $Org(x, y)$ corresponding to $hn(x, y)$) of those of the original image $Org(x, y)$ by the tone conversion process, can be converted into values nearly equal to those of the original image $Org(x, y)$. Note that the image components of the LL subband as the low-frequency component of the lowermost layer are not changed. Hence, the dynamic range of the overall image is changed, but image components corresponding to high-frequency components can maintain values nearly equal to those of the original image. Note that the right-hand side of equation (13) may be multiplied by a predetermined constant. In this case, the high-frequency components of an image can be adjusted (emphasized or suppressed) while changing the dynamic range.

According to equation (13), high-frequency components are emphasized in a region where the pixel value range of the original image is compressed, and high-frequency components are suppressed in a region where the pixel value range of the original image is expanded. However, as described above, an adjustment means for multiplying the right-hand side of equation (13) by an arbitrary constant may be further provided.

The image, the dynamic range of which has been changed by the tone conversion process, does not suffer any artifacts such as overshoot and the like. However, the process given by equation (13) can amplify high-frequency components by changing them, but artifacts such as overshoot and the like may be generated.

To prevent generation of such artifacts, in place of equation (13), it is effective to change high-frequency components by:

$$h2n(x,y)=hn(x,y)+(1/f'(x,y)-1)\times fn(hn(x,y)) \quad (14)$$

Note that the function $fn(\ )$ has a curve form shown in FIG. 12 or 13. These curves are differential continuous (differentiable and continuous functions), and can prevent generation of any false edges. Image components generated at an edge portion have values larger than normal components (components other than the edge portion), and these curve forms suppress image components corresponding to edge components or set them 0 (zero). As a result, in equation (14), when an image component is larger than a predetermined threshold value, fn(hn(x, y)) becomes a suppressed value or 0, and h2n(x, y) becomes a suppressed value or nearly equal to hn(x, y). On the other hand, when an image component has a normal value, h2n(x, y) becomes the same value as equation (13).

In this way, the dynamic range is changed, and effective image components (those equal to or lower than the predetermined value) of the high-frequency components become equal to those of the image before tone conversion. Since image components (those higher than the predetermined value) that cause overshoot of the high-frequency components are not changed or are changed while being suppressed, overshoot or the like can be suppressed. By setting the slope of the function form fn( ) to be equal to or larger than 1 (or larger than 1) within the range where the input value is equal to or smaller than the predetermined value, high-frequency components can be emphasized while suppressing overshoot. Hence, the dynamic range and high-frequency components can be changed while suppressing overshoot and the like.

The inverse DWT circuit 116 computes the inverse discrete wavelet transforms of image components (transform coefficients) converted by the component conversion circuit 115 as follows (s204). The converted image components stored in the main memory 109 are sequentially read out and undergo the transformation process by the inverse discrete wavelet transformation circuit 116, and are written in the main memory 109 again. Assume that the arrangement of the inverse discrete wavelet transformation of the inverse DWT circuit 116 in this embodiment is as shown in FIG. 11C. Input image components undergo filter processes using two filters u and p, and are added to each other after being up-sampled, thus outputting an image signal x'. These processes are described by:

$$x'(2\times n)=s'(n)-\text{floor}((d'(n-1)+d'(n))/4) \quad (15)$$

$$x'(2\times n+1)=d'(n)+\text{floor}((x'(2\times n)+x'(2\times n+2))/2) \quad (16)$$

With the above process, linear inverse discrete wavelet transformation of transform coefficients is done. Since two-dimensional inverse discrete wavelet transformation is implemented by sequentially executing linear inverse transformation in the horizontal and vertical directions of an image and its details are known to those who are skilled in the art, a description thereof will be omitted.

As described above, in Embodiment 1, a high-quality output image, the dynamic range of which has been changed, and high-frequency components of which have been adjusted while suppressing artifacts such as overshoot and the like can be obtained. Furthermore, a dynamic range change process and an emphasis or suppression process for each frequency band by changing image components for each frequency band can be made organically.

Embodiment 2

Figure 14:
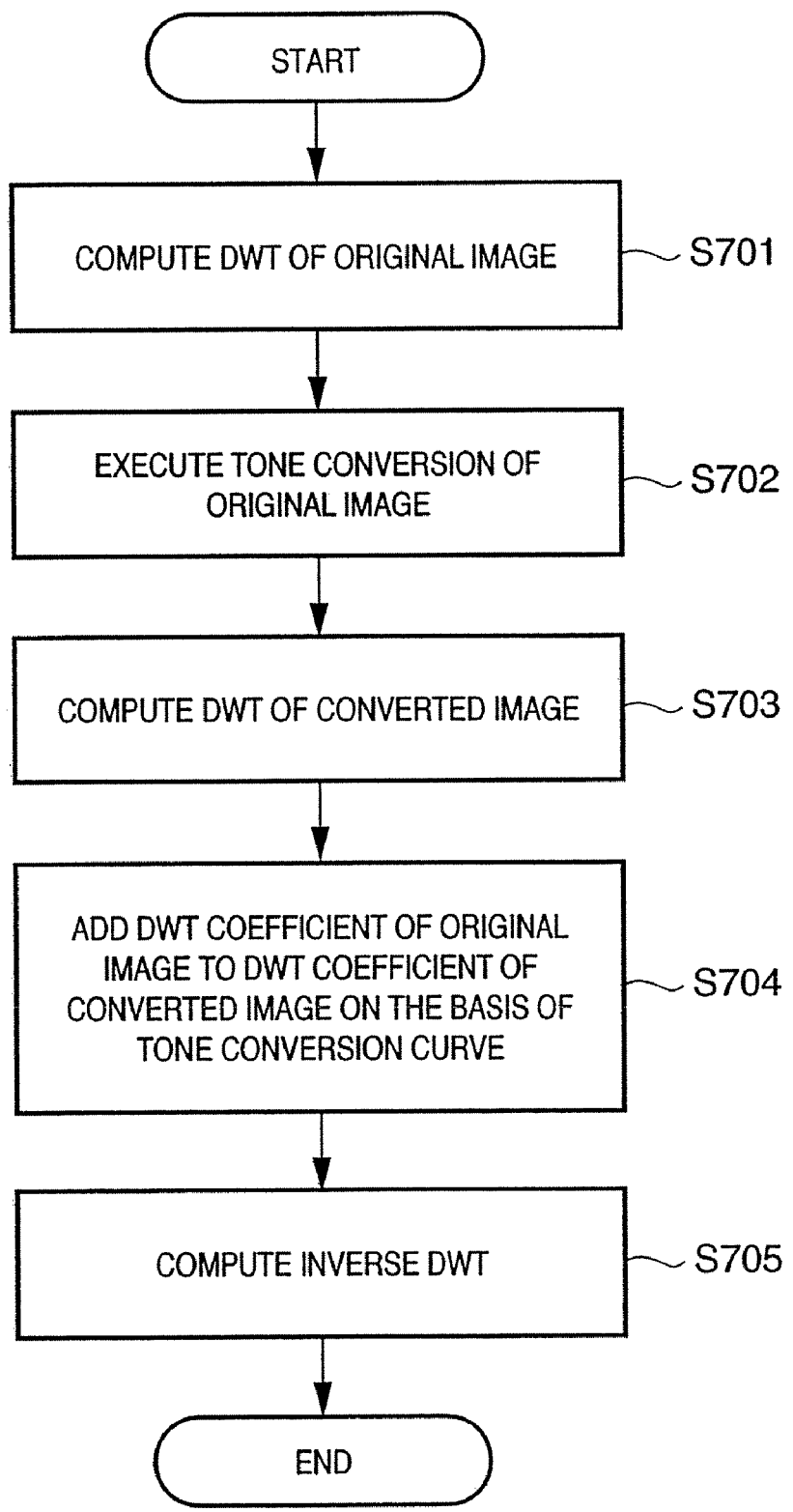
FIG. 14 is a flow chart showing the processing sequence of the image processing apparatus of Embodiment 2.

Embodiment 2 will be described below along with the flow of processes shown in FIG. 14. A description of the same processes as those in Embodiment 1 will be omitted.

The DWT circuit 114 executes a DWT process of an original image Org(x, y). Let horgn(x, y) be each image component obtained by that process (s701). The tone conversion circuit 113 executes a tone conversion process of the original image Org(x, y) using a tone conversion curve f( ) (s702). The DWT circuit 114 executes a DWT process of the image f(Org (x, y)) that has undergone the tone conversion process to obtain image components hn(x, y) (s703). Note that n indicates the subband category and x and y are the coordinates as in Embodiment 1.

The component conversion circuit 115 converts the image component horgn(x, y) by:

$$h2n(x,y)=hn(x,y)+(1-f'(\text{Org}(x,y)))\times horgn(x,y) \quad (17)$$

and adds the converted component to the image component hn(x, y), thus obtaining a new image component h2n(x, y) (s704).

Note that the image components of the LL subband as the low-frequency component of the lowermost layer are not changed. In this manner, the magnitudes of high-frequency components of the image, the dynamic range of which has been changed can be maintained to be nearly equal to those of high-frequency components of the original image. In this case, since the high-frequency components are added using those of the original image, the magnitudes of the high-frequency components after the processing can accurately come closer to those of the high-frequency components of the original image. Note that the second term of the right-hand side of equation (17) may be multiplied by a predetermined constant. In this case, the high-frequency components of the image can be adjusted (emphasized or suppressed) while changing the dynamic range.

Note that equation (18) may be used in place of equation (17) to obtain the same effect:

$$h2n(x,y)=horgn(x,y) \quad (18)$$

The image, the dynamic range of which has been changed by the tone conversion process, does not suffer any artifacts such as overshoot and the like. However, the process given by equation (17) can amplify high-frequency components by converting and adding those of the original image, but simultaneously adds components of the original image which may cause artifacts such as overshoot and the like. Hence, overshoot may occur.

To prevent this, in place of equation (17), it is effective to change high-frequency components by:

$$h2n(x,y)=hn(x,y)+(1-f'(\text{Org}(x,y)))\times fn(horgn(x,y)) \quad (19)$$

Note that the function fn( ) has a curve form shown in FIG. 12 or 13. Image components generated at an edge portion have values larger than normal components, and these curve forms suppress image components corresponding to edge components or set them 0 (zero). As a result, in equation (19), when an image component is large, fn(horgn(x, y)) becomes a suppressed value or 0, and h2n(x, y) becomes a suppressed value or nearly equal to hn(x, y). On the other hand, when an image component has a normal value, h2n(x, y) becomes the same value as equation (17).

In this way, the dynamic range is changed, and effective image components (those equal to or lower than the predetermined value) of the high-frequency components become nearly equal to those of the image before tone conversion. Since image components (those higher than the predetermined value) that cause overshoot of the high-frequency components are not changed or are changed while being suppressed, overshoot or the like can be suppressed. By setting the slope of the function form fn( ) to be equal to or larger than 1 (or larger than 1) within the range where the input value is equal to or smaller than the predetermined value, high-frequency components can be emphasized while suppressing overshoot. Hence, the dynamic range and high-frequency components can be changed while suppressing overshoot and the like.

The inverse DWT circuit 116 executes an inverse DWT process based on the image components changed by the component change circuit 115 (S705).

In Embodiment 2, a high-quality output image, the dynamic range of which has been changed, and high-frequency components of which have been adjusted while suppressing artifacts such as overshoot and the like can be obtained. Furthermore, a dynamic range change process and an emphasis or suppression process for each frequency band by changing image components for each frequency band can be made organically. In addition, since the high-frequency components of the original image are used as those to be added, the high-frequency components of the processed image can accurately come closer to those of the original image.

Embodiment 3

Figure 15:
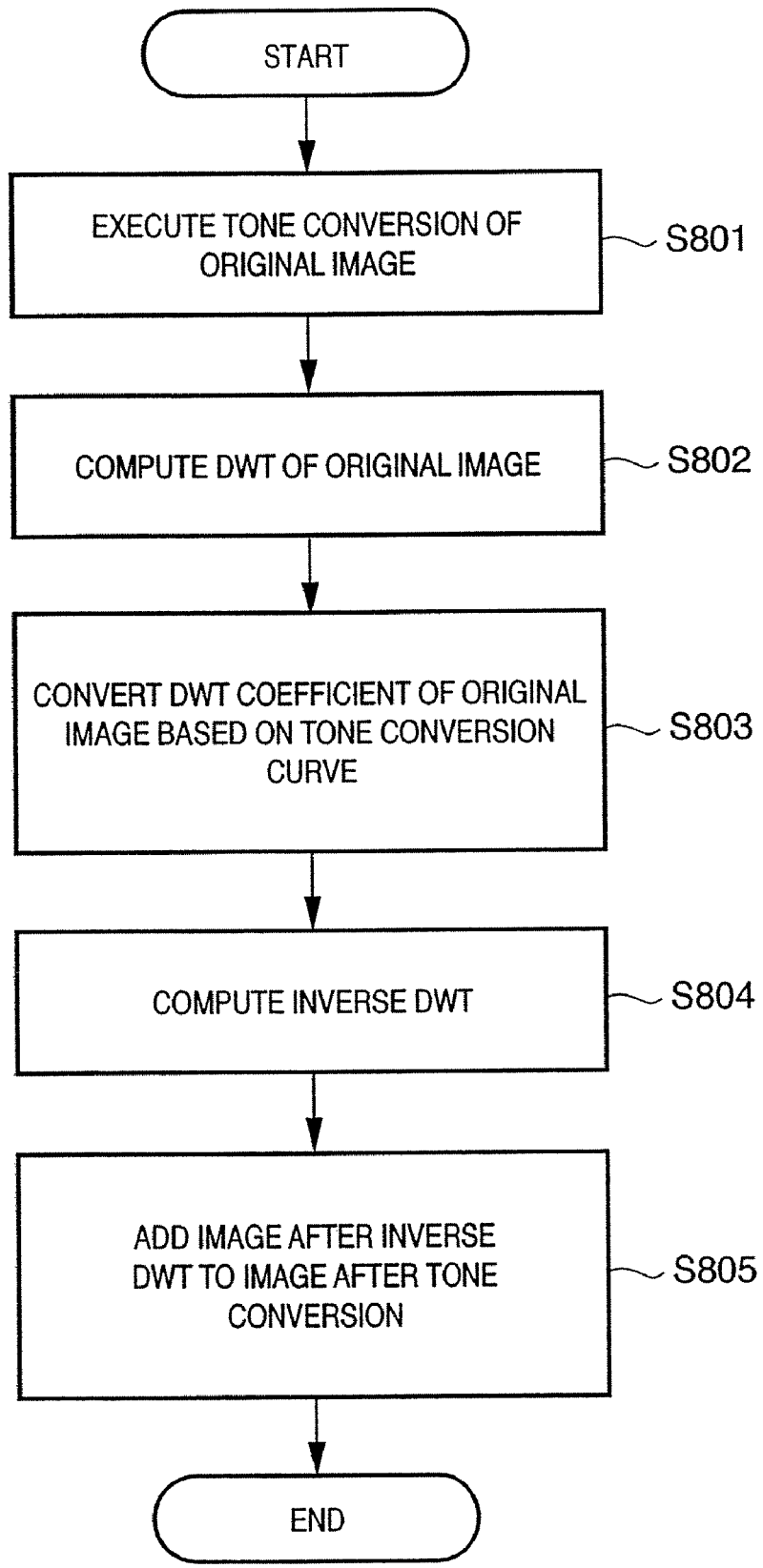
FIG. 15 is a flow chart showing the processing sequence of the image processing apparatus of Embodiment 3.

Embodiment 3 will be described along with the flow of processes shown in FIG. 15. A description of the same processes as those in Embodiment 1 will be omitted.

The tone conversion circuit 113 executes a tone conversion process of an original image Org(x, y) using a tone conversion curve f( ) to obtain a processed image f(Org(x, y)) (s801). The DWT circuit 114 then executes a DWT process of the original image to obtain image components hn(x, y) (s802). Note that n indicates the subband category and x and y are the coordinates as in Embodiment 1.

The component conversion circuit 115 converts each image component hn(x, y) by:

$$h2n(x,y)=(1-f'(Org(x,y)))\times hn(x,y) \quad (20)$$

to obtain a new image component h2n(x, y) (s803).

Note that the values of the lowest frequency component LL are set to be all 0s (zeros).

In this way, by computing the inverse DWTs of H2n(x, y), an image Hr(x, y) consisting of only high-frequency components depending on the slope of the tone conversion curve can be obtained. Note that the right-hand side of equation (20) may be multiplied by a predetermined constant. In this case, the high-frequency components of the image can be adjusted (emphasized or suppressed).

The inverse DWT circuit 116 computes the inverse DWTs based on the components converted by the component conversion circuit 115 to obtain a restored image (s804). The image f(Org(x, y)) obtained by the tone conversion circuit 113 is added to the image Hr(x, y) obtained by the inverse DWT circuit 116 by:

$$Prc(x,y)=f(Org(x,y))+Hr(x,y) \quad (21)$$

to obtain a processed image Prc(x, y) (s805). Note that this addition is made by an image composition circuit 117 shown in FIG. 8.

The image, the dynamic range of which has been changed by the tone conversion process, does not suffer any artifacts such as overshoot and the like. However, the high-frequency components obtained by equation (20) are likely to contain components of the original image which may cause artifacts such as overshoot and the like. Therefore, an image obtained by inversely transforming such image components contains components which may cause overshoot, and if that image is added, overshoot may occur.

To prevent this, in place of equation (20), it is effective to change high-frequency components by:

$$h2n(x,y)=(1-f'(Org(x,y)))\times fn(hn(x,y)) \quad (22)$$

Note that the function fn( ) has a curve form shown in FIG. 12 or 13. Image components generated at an edge portion have values larger than normal components, and these curve forms suppress image components corresponding to edge components or set them 0 (zero). As a result, in equation (22), when an image component is large, since fn(hn(x, y)) becomes a suppressed value or 0, h2n(x, y) becomes a suppressed value or nearly equal to hn(x, y). On the other hand, when an image component has a normal value, h2n(x, y) becomes the same value as equation (20).

By adding the image obtained by computing the inverse DWTs of the image components given by equation (20) to the image that has undergone the tone conversion, the dynamic range can be changed, and an image, the high-frequency components of which have magnitudes nearly equal to those of the original image, can be obtained.

Furthermore, since the image components are changed in correspondence with the magnitudes of image components as in equation (22), effective image components (those equal to or lower than the predetermined value) of the high-frequency components become nearly equal to those of the image before tone conversion. Since image components (those higher than the predetermined value) that cause overshoot of the high-frequency components are not changed or are changed while being suppressed, overshoot or the like can be suppressed. By setting the slope of the function form fn( ) to be equal to or larger than 1 (or larger than 1) within the range where the input value is equal to or smaller than the predetermined value, high-frequency components can be emphasized while suppressing overshoot. Hence, the dynamic range and high-frequency components can be changed while suppressing overshoot and the like.

In Embodiment 3, a high-quality output image, the dynamic range of which has been changed, and high-frequency components of which have been adjusted while suppressing artifacts such as overshoot and the like can be obtained. Furthermore, a dynamic range change process and an emphasis or suppression process for each frequency band by changing image components for each frequency band can be made organically. In addition, since the high-frequency components of the original image are used as those to be added, the high-frequency components of the processed image can accurately come closer to those of the original image. Moreover, since the DWT process is done only once, the computation time can be shortened.

Embodiment 4

Figure 16:
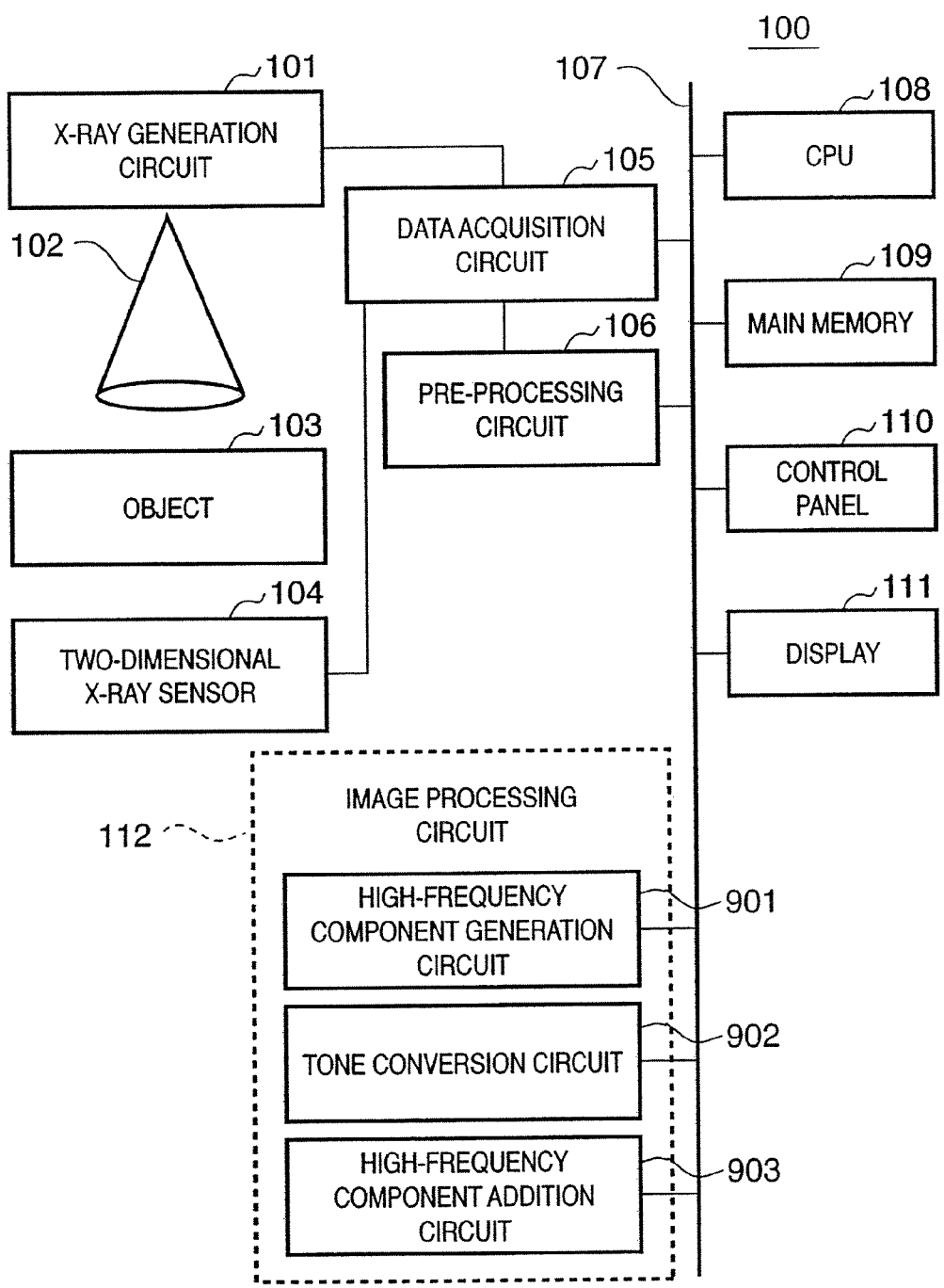
FIG. 16 is a block diagram of an image processing apparatus of Embodiments 4 and 5.

Embodiment 4 relates to an image process of the fourth aspect, which changes the dynamic range while preserving the edge structure. A description of the same process as in Embodiment 1 will be omitted. FIG. 16 is a block diagram showing the arrangement of an image processing circuit 112 of Embodiment 4. Reference numeral 901 denotes a high-frequency component generation circuit for generating high-frequency components by subtracting a smoothed image from an original image; 902, a tone conversion circuit for changing the dynamic range by executing tone conversion of the original image; and 903, a high-frequency component addition circuit for converting the high-frequency components generated by the high-frequency component generation circuit 901, and adding the converted high-frequency components to the image that has undergone the tone conversion in correspondence with the slope of a tone conversion curve used in the tone conversion circuit 902.

Figure 17:
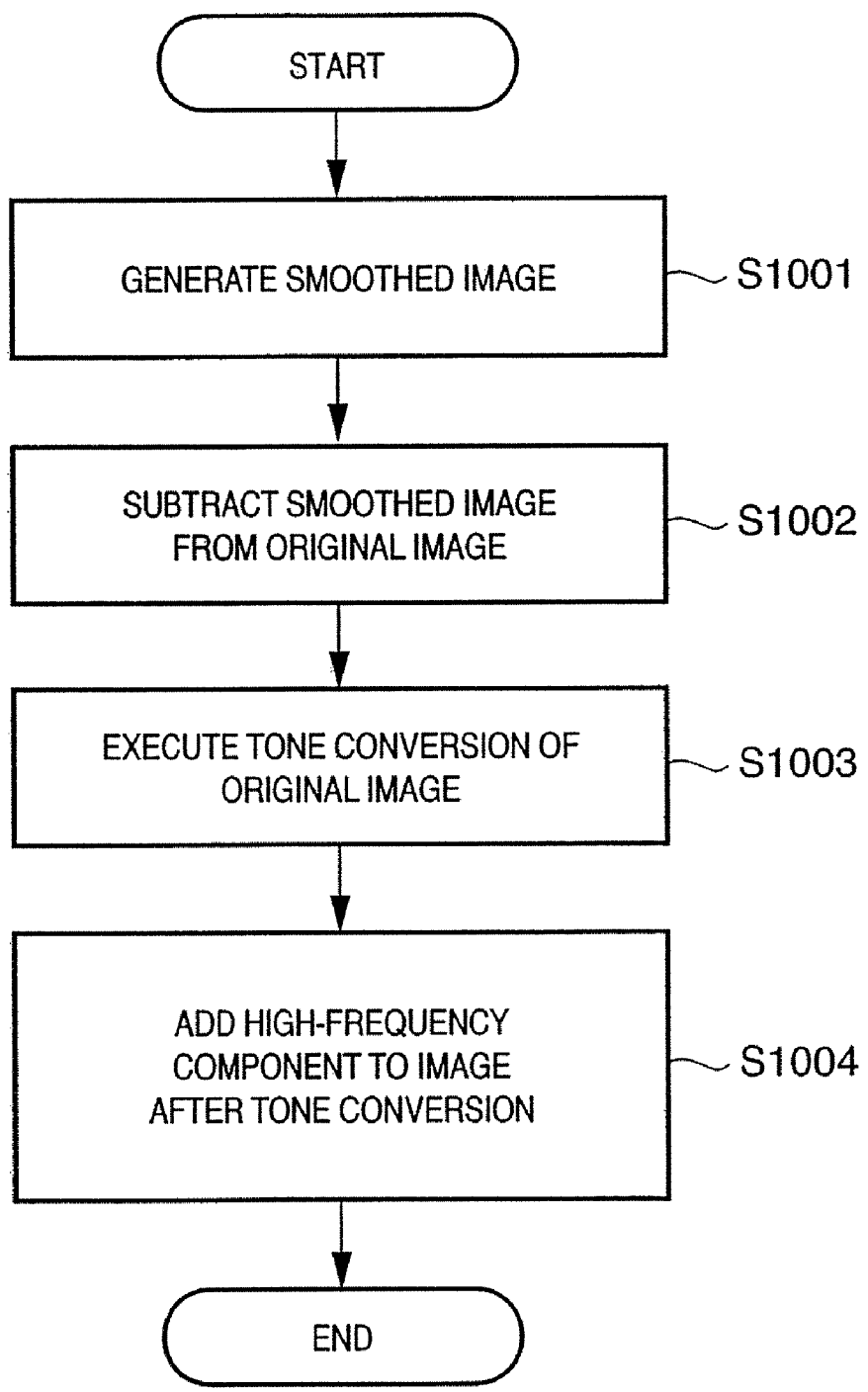
FIG. 17 is a flow chart showing the processing sequence of the image processing apparatus of Embodiment 4.

FIG. 17 is a flow chart showing the flow of processes of Embodiment 4, and the processing of the image processing circuit 112 will be explained below along with the flow of processes shown in FIG. 17.

In the image processing circuit 112 which receives an original image f(x, y) that has been processed by the pre-processing circuit 106 via the CPU bus 107 under the control of the CPU 108, the high-frequency component generation circuit 601 generates a smoothed image (s1001) by:

$$fus(x, y) = \frac{\int_{d2}^{d1}\int_{d4}^{d3} f(x, y)\,dx\,dy}{\int_{d2}^{d1}\int_{d4}^{d3} dx\,dy} \tag{23}$$

$$d1 = y + d \tag{24}$$

$$d2 = y - d \tag{25}$$

$$d3 = x + d \tag{26}$$

$$d4 = x - d \tag{27}$$

where fus(x, y) is the smoothed image, f(x, y) is the original image, and d1, d2, d3, and d4 are the mask sizes.

When such smoothed image generation method using the moving average is used, a short calculation time can be assured.

Note that the smoothed image fus(x, y) may be calculated using morphology arithmetic operations described by:

$$f2(x,y) = \min\{f(x+x1,y+y1) - D(x1,y1) | x1 \times x1 + y1 \times y1 \leq r1 \times r1\} \tag{28}$$

$$f3(x,y) = \max\{f2(x+x1,y+y1) + D(x1,y1) | x1 \times x1 + y1 \times y1 \leq r1 \times r1\} \tag{29}$$

$$f4(x,y) = \max\{f3(x+x1,y+y1) + D(x1,y1) | x1 \times x1 + y1 \times y1 \leq r1 \times r1\} \tag{30}$$

$$fus(x,y) = \min\{f4(x+x1,y+y1) - D(x1,y1) | x1 \times x1 + y1 \times y1 \leq r1 \times r1\} \tag{31}$$

where D(x, y) is a disk-shaped filter described by:

$$D(x, y) = 0, \text{ when } x \times x + y \times y \leq r1 \times r1 \tag{32}$$
$$= -\infty, \text{ otherwise}$$

and r1 is an arbitrary constant selected in correspondence with an input image.

The profile of fus(x, y) obtained by the above process preserves the edge structure, and that image hardly causes overshoot and undershoot as drawbacks of the conventional sharpening process.

Likewise, fus(x, y) may be generated using a median filter. Since the smoothed image in such case relatively preserves the edge structure, it hardly causes overshoot and undershoot as drawbacks of the conventional sharpening process as in the image obtained using the morphology arithmetic operations.

The high-frequency component generation circuit 901 generates high-frequency components fh(x, y) (s1002) by:

$$fh(x,y) = f(x,y) - fus(x,y) \tag{33}$$

The tone conversion circuit 602 changes the dynamic range of the original image by executing tone conversion of the original image using a tone conversion curve F1( ) by:

$$f0(x,y) = F1(f(x,y)) \tag{34}$$

and obtains an output image f0(x, y) after tone conversion (s1003).

With the tone conversion described by equation (34), the dynamic range according to a predetermined object can be obtained, and no artifacts such as overshoot and the like occur. However, since simple tone conversion is done, high-frequency components that form a fine structure are also compressed in a region where the dynamic range (pixel value range) is compressed, and the fine structure becomes hard to observe.

The high-frequency component addition circuit 903 generates high-frequency components fh2(x, y) after the high-frequency components fh(x, y) by:

$$fh2(x,y) = F(fh(x,y)) \tag{35}$$

Figure 18:
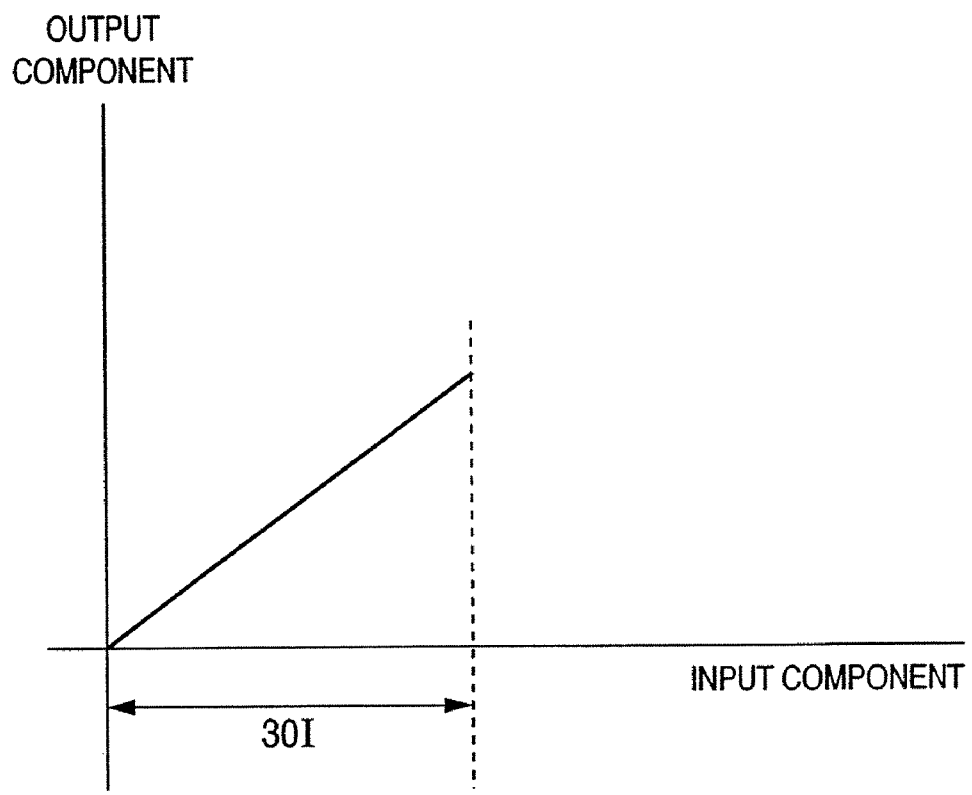
FIG. 18 shows an example of a curve used to change high-frequency components.

Note that the conversion curve F( ) is a function, as shown in, e.g., FIG. 18. According to the curve shape of this function, high-frequency components equal to or higher than a predetermined absolute value (threshold value) 301 shown in FIG. 18 can be set to be 0 (zero), and the magnitudes of high-frequency components less than the predetermined absolute value 301 remain unchanged (the slope of the curve is 1). Note that a curve shape that gradually decreases the high-frequency components equal to or higher than the predetermined absolute value to 0, or a curve shape that linearly or nonlinearly increases or decreases the magnitudes of the high-frequency components less than the predetermined absolute value may be adopted.

The high-frequency component addition circuit 903 then converts the high-frequency components fh(x, y) according to differential coefficients (slope) of the tone conversion curve, and adds the converted high-frequency components to the image f0(x, y) after tone conversion, as described by:

$$fdr(x, y) = f0(x, y) + F3(f(x, y)) \times c(f(x, y)) \times fh2(x, y) \tag{36}$$

$$c(\chi) = 1 - \frac{\partial F1(\chi)}{\partial \chi}, \chi = f(x, y) \tag{37}$$

to obtain a processed image fdr(x, y) (s1004).

Note that $\partial F1(\chi)/\partial \chi$ represents the slope of the tone conversion curve F1( ). F3( ) is a function which depends on the original image f(x, y) or smoothed image fus(x, y), and the addition amount of the high-frequency components can be adjusted by adjusting the function form of F3( ). For example, if F3( )>1, a sharpening effect can be simultaneously obtained. If F3( ) is set to be a function which monotonously increases with increasing pixel value, noise can be reduced by decreasing the addition amount of the high-frequency components in a low pixel value region where noise is relatively conspicuous.

As described above, with this process, since high-frequency components corresponding to effective information such as a fine structure or the like can be restored, and high-frequency components of an edge portion are set to be 0 and are not added to the image after tone conversion, the edge shape can be preserved, and overshoot or the like can be prevented.

In general, the absolute value of a high-frequency component that indicates overshoot is larger than a predetermined value (threshold value), and the absolute value of a high-frequency component corresponding to a fine structure is smaller than the predetermined value. Also, the high-frequency component with the large absolute value is generated in an edge portion of an image. Furthermore, overshoot is experienced in the processed image obtained by restoring high-frequency components when the value of the high-frequency component equal to or higher than the predetermined value is specifically outstanding.

For this reason, when the absolute value of a high-frequency component to be added is larger than the predetermined value, it is set to be 0, thus suppressing overshoot and preserving the edge structure.

Since high-frequency components are restored in correspondence with the degree of a change in dynamic range (pixel value range) according to equation (36), the fine structure can be accurately observed even after the dynamic range has been changed. Furthermore, since high-frequency components that cause overshoot are set to be 0 by the same effect as in Embodiment 1, the edge structure of the processed image is maintained.

As described above, according to Embodiment 4, since the dynamic range is changed by tone conversion, and high-frequency components are restored by cutting those which cause overshoot, a processed image in which the edge structure can be maintained, and the fine structure is restored to that before tone conversion can be obtained. Furthermore, by converting high-frequency components corresponding to the fine structure using a predetermined function, the fine structure before tone conversion can undergo a predetermined emphasis or suppression process. Hence, a high-quality processed image, the dynamic range or predetermined pixel value range of which has been changed, can be obtained.

When a smoothed image is generated by morphology arithmetic operations, overshoot hardly occurs. Furthermore, when the aforementioned conversion curve is used, since high-frequency components corresponding to overshoot can be suppressed, overshoot can be suppressed more effectively.

Likewise, when a smoothed image is generated by the median filter, overshoot hardly occurs. Furthermore, when the aforementioned conversion curve is used, since high-frequency components corresponding to overshoot can be suppressed, overshoot can be suppressed more effectively.

Embodiment 5

Embodiment 5 relates to an image process of the fifth aspect, which changes the dynamic range while preserving the edge structure. A description of the same process as in Embodiment 1 will be omitted. Also, the arrangement of the image processing circuit 112 of Embodiment 4 will be explained using FIG. 16. Reference numeral 902 denotes a tone conversion circuit for changing the dynamic range by executing tone conversion of an original image; 901, a high-frequency component generation circuit for generating high-frequency components by subtracting a smoothed image of the image that has undergone tone conversion by the tone conversion circuit 902 from that image; and 903, a high-frequency component addition circuit for converting the high-frequency components generated by the high-frequency component generation circuit 901 in correspondence with the slope of a tone conversion curve used in the tone conversion circuit 902, and adding the converted high-frequency components to the image that has undergone the tone conversion.

Figure 19:
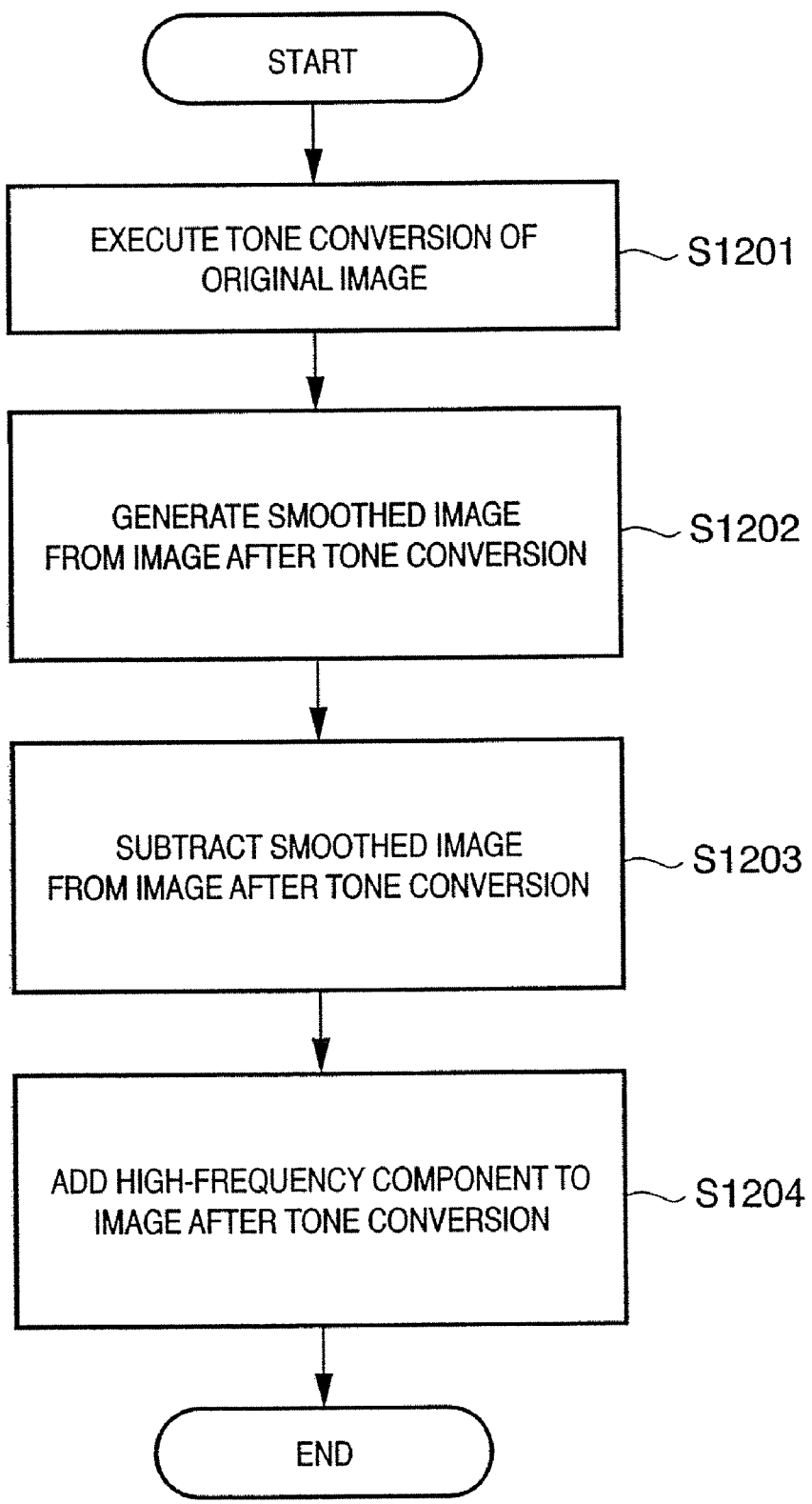
FIG. 19 is a flow chart showing the processing sequence of the image processing apparatus of Embodiment 5.

FIG. 19 is a flow chart showing the flow of processes of Embodiment 5, and the processing of the image processing circuit 112 will be explained below along with the flow of processes shown in FIG. 19.

In the image processing circuit 112 which receives an original image f(x, y) that has been processed by the pre-processing circuit 106 via the CPU bus 107 under the control of the CPU 108, the tone conversion circuit 902 changes the dynamic range of the original image by executing tone conversion of the original image using a tone conversion curve F1( ) by:

$$f0(x,y)=F1(f(x,y)) \quad (38)$$

to obtain an output image f0(x, y) after tone conversion (s1201).

The high-frequency component generation circuit 901 generates a smoothed image of the image that has undergone the tone conversion (s1202). Let fus(x, y) be the smoothed image. As described in Embodiment 4, generation of the smoothed image may use any method of the moving average, morphology arithmetic operation, median filter, and the like.

The high-frequency component generation circuit 901 then generates high-frequency components fh(x, y) (s1203) by:

$$fh(x,y)=f0(x,y)-fus(x,y) \quad (39)$$

The high-frequency component addition circuit 903 generates high-frequency components fh2(x, y) by converting the high-frequency components fh(x, y) using:

$$fh2(x,y)=F(fh(x,y)) \quad (40)$$

Note that the conversion curve F( ) has a function form shown in, e.g., FIG. 18.

The high-frequency component addition circuit 903 then converts the high-frequency components fh2(x, y) according to differential coefficients (slope) of the tone conversion curve and adds the converted high-frequency components to the image f0(x, y) after tone conversion, as described by:

$$fdr(x,y)=f0(x,y)+F3(f(x,y))\times c(f(x,y))\times fh2(x,y) \quad (41)$$

$$c(\chi) = 1 \Big/ \frac{\partial F1(\chi)}{\partial \chi} - 1, \chi = f(x,y) \quad (42)$$

to obtain a processed image fdr(x, y) (s1204).

Note that F3( ) is a function which depends on the original image or smoothed image, the addition amount of the high-frequency components can be adjusted by adjusting the function form of F3( ), and a sharpening effect can be simultaneously obtained if F3( )>1.

Since high-frequency components are restored in correspondence with the degree of a change in dynamic range (pixel value range) according to equations (41) and (42), the fine structure can be accurately observed even after the dynamic range has been changed. Furthermore, since the addition amount of high-frequency components that cause overshoot is set to be 0 by the same effect as in Embodiment 1, the edge structure of the processed image is maintained.

As described above, according to Embodiment 5, since the dynamic range is changed by tone conversion, and high-frequency components are restored by cutting those which cause overshoot, the fine structure can be maintained in practice or can be emphasized or suppressed while maintaining the edge structure in the processed image.

When a smoothed image is generated by morphology arithmetic operations, overshoot hardly occurs. Furthermore, when the aforementioned conversion curve is used, since high-frequency components corresponding to overshoot can be suppressed, overshoot can be suppressed more effectively.

Likewise, when a smoothed image is generated by the median filter, overshoot hardly occurs. Furthermore, when the aforementioned conversion curve is used, since high-frequency components corresponding to overshoot can be suppressed, overshoot can be suppressed more effectively.

Embodiment 6

Figure 20:
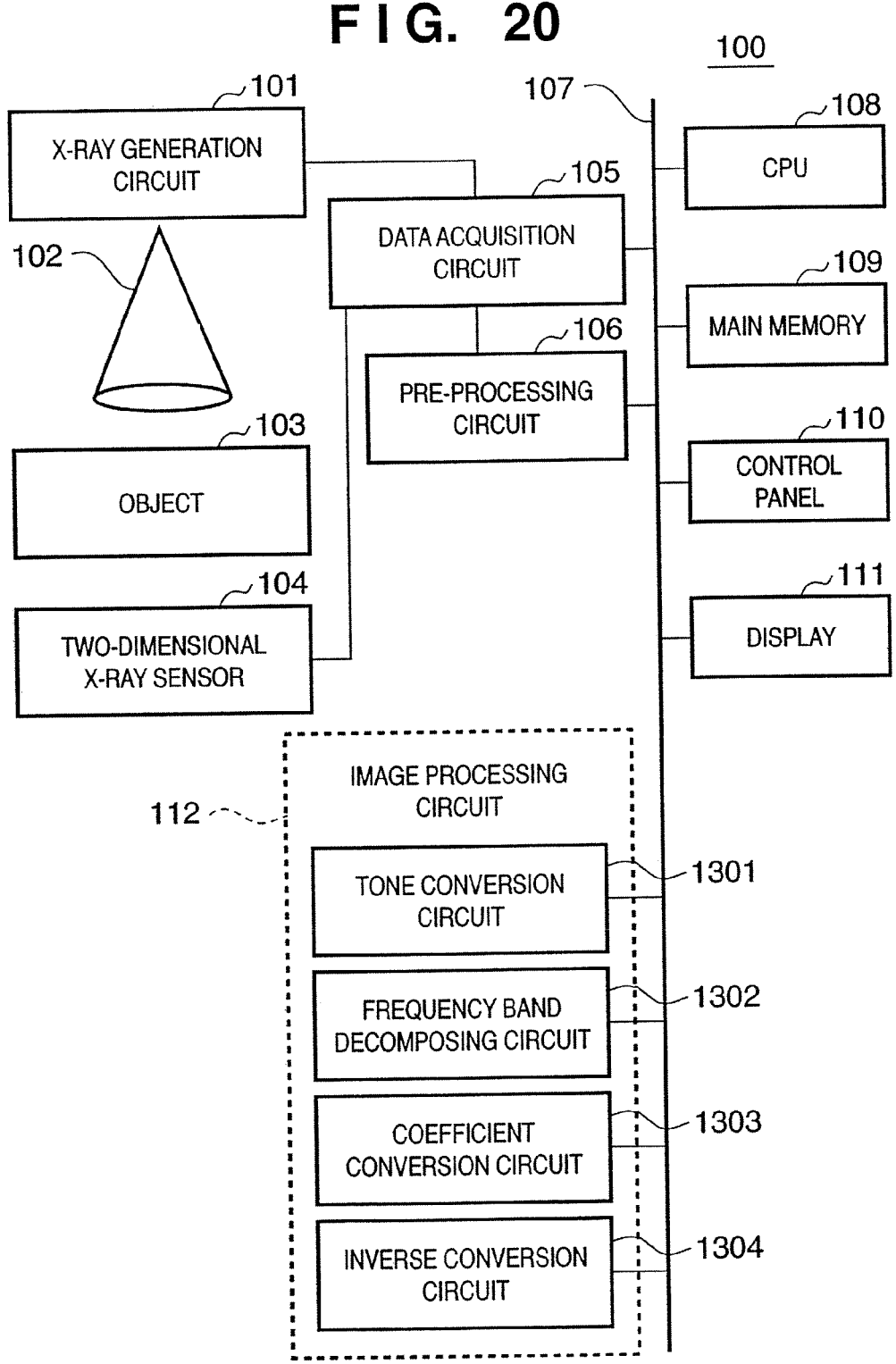
FIG. 20 is a block diagram of an image processing apparatus of Embodiment 6.

Embodiment 6 obtains the effects of the dynamic range change and frequency processes while preserving the edge structure by decomposing an image that has undergone tone conversion into frequency coefficients of a plurality of frequency bands, and converting the frequency coefficients. FIG. 20 is a block diagram showing the arrangement of Embodiment 6, and a description of the same processes as in Embodiment 1 will be omitted. Referring to FIG. 20, reference numeral 112 denotes an image processing circuit; 1301, a tone conversion circuit for making tone conversion that changes the dynamic range; 1302, a frequency band decomposing circuit for decomposing the image that has undergone tone conversion by the tone conversion circuit 1301 into a plurality of frequency bands by wavelet transformation, Laplacian pyramid transformation, or the like to obtain frequency coefficients; 1303, a coefficient conversion circuit for converting frequency coefficient values, depending on the slope of the tone conversion curve used in the tone conversion circuit 1301 and pixel values of an original image or its smoothed image; and 1304, an inverse conversion circuit for reconstructing an image by inversely converting the frequency coefficients using inverse wavelet transformation, inverse Laplacian pyramid transformation, or the like on the basis of the coefficients converted by the coefficient conversion circuit 1303.

Figure 21:
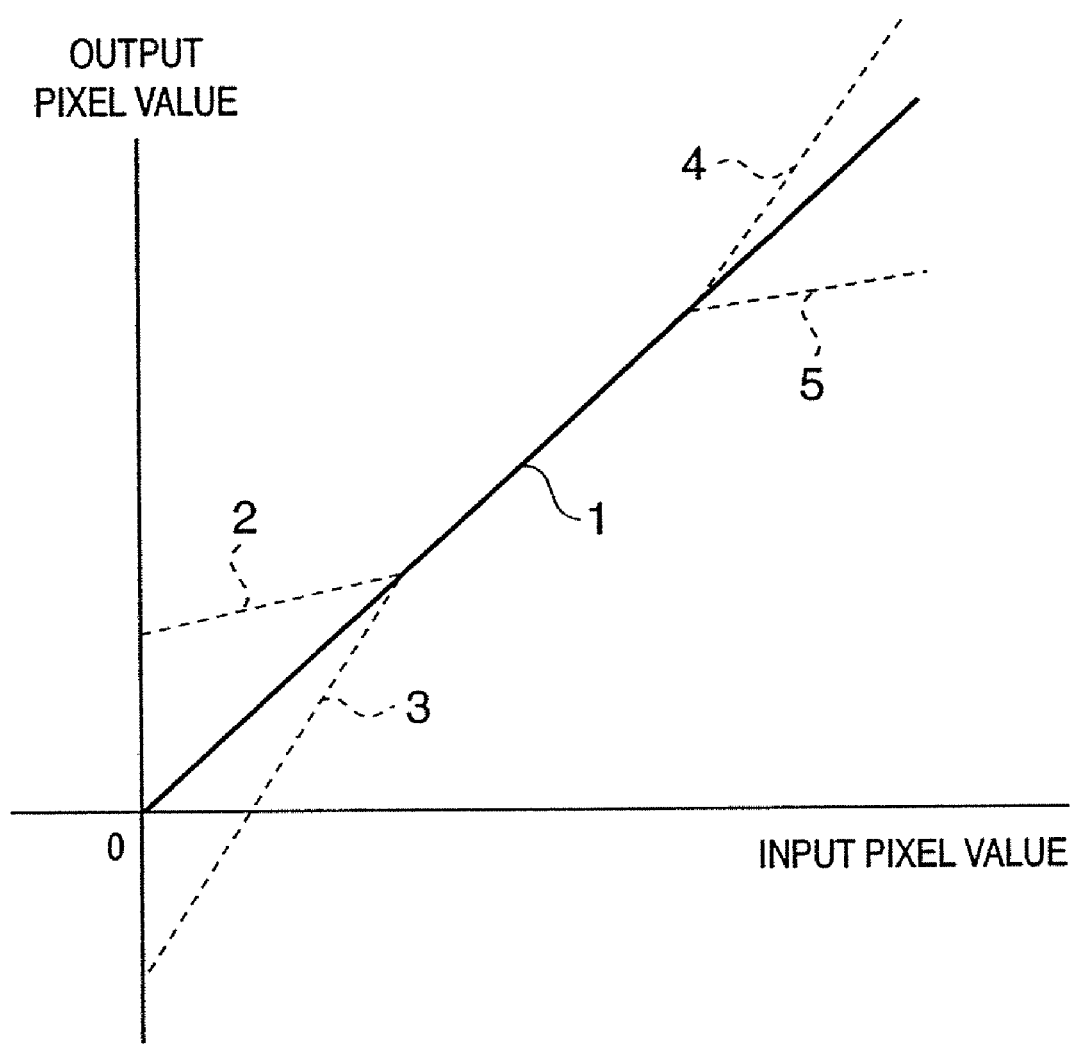
FIG. 21 shows a tone conversion curve used to change the dynamic range.
Figure 22:
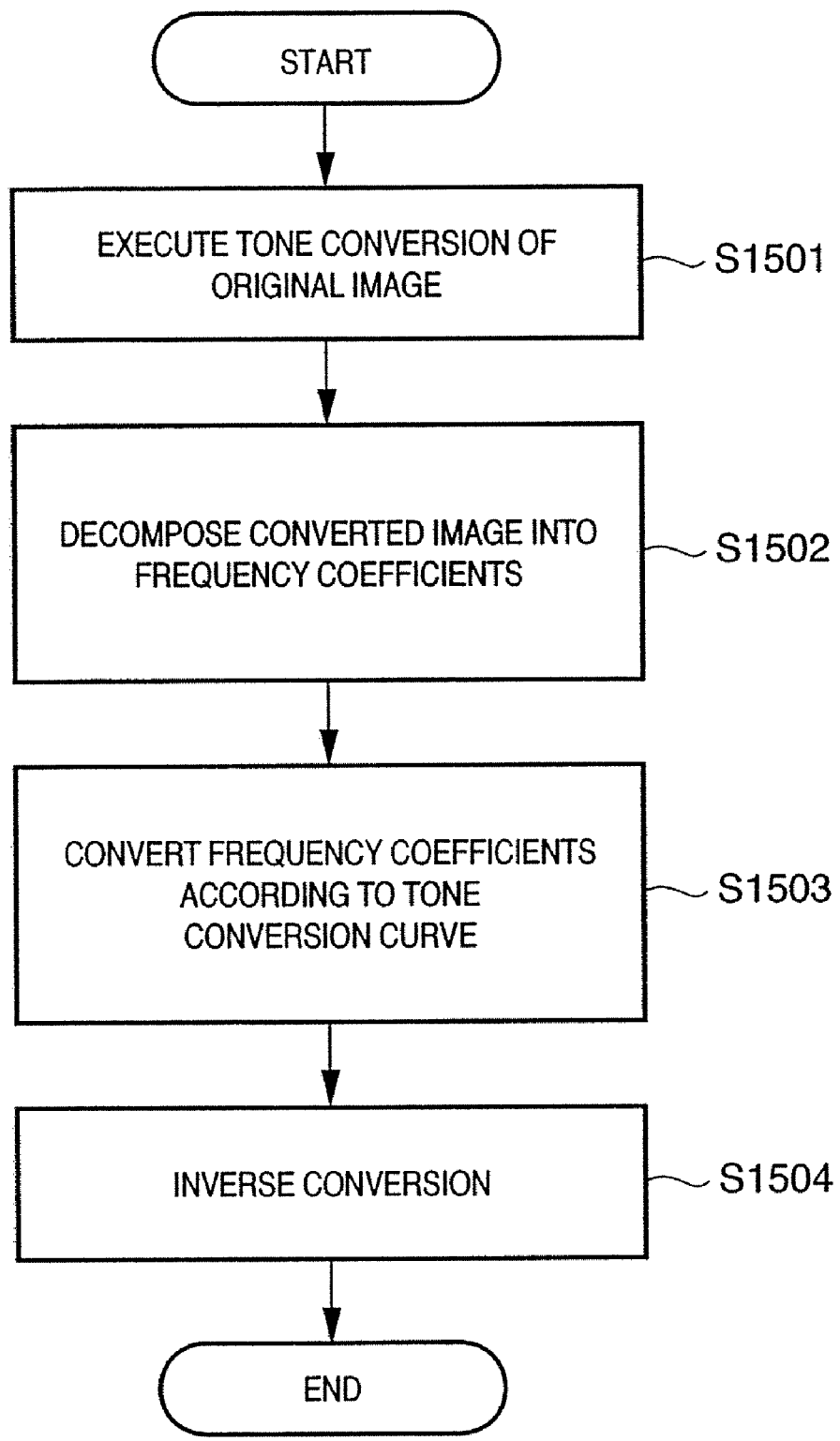
FIG. 22 is a flow chart showing the processing sequence of the image processing apparatus of Embodiment 6.
Figure 23:
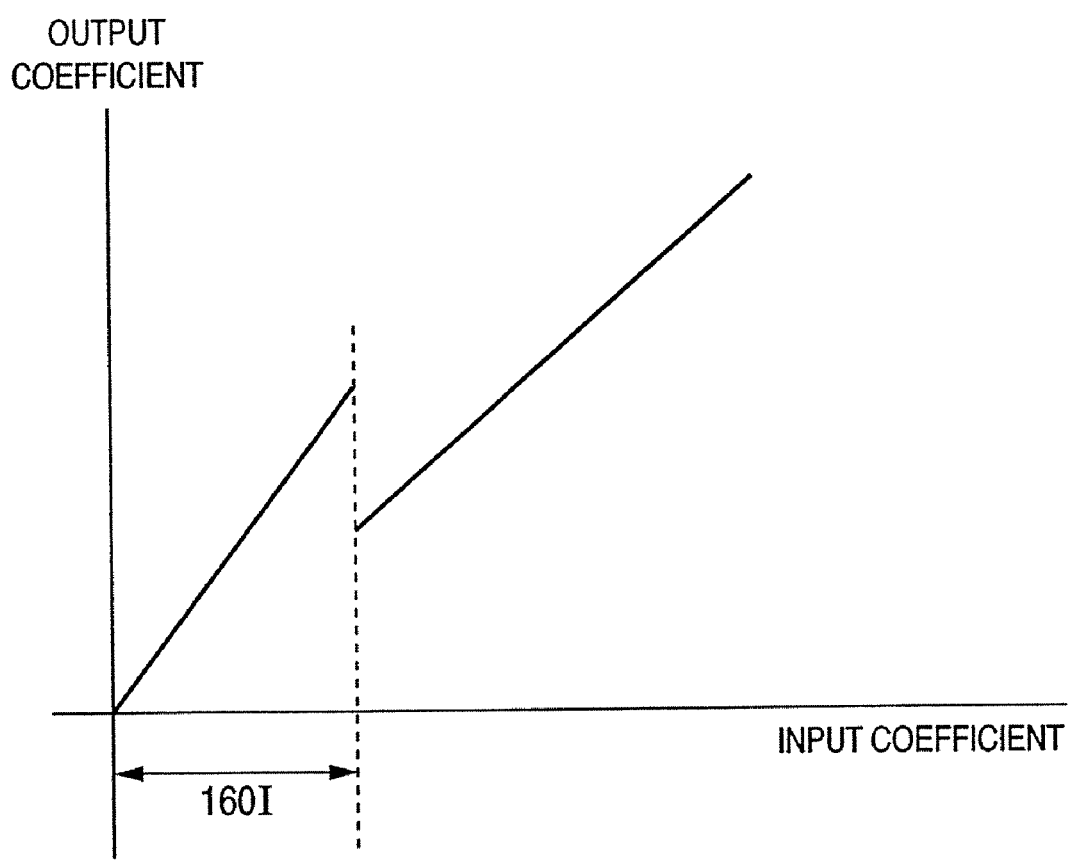
FIG. 23 shows a curve used to convert frequency coefficients.

FIG. 21 shows an example of the tone conversion curve used to convert the dynamic range in the tone conversion circuit 1301. Note that the abscissa plots the pixel values of an input image; and the ordinate plots those of an output image. FIG. 22 is a flow chart showing the flow of processes in the image processing circuit 112 according to Embodiment 6 of the present invention. FIG. 23 shows an example of a curve form used to convert frequency coefficients. The abscissa plots input coefficients, and the ordinate plots output coefficients.

Embodiment 6 will be described below along with the flow of processes shown in FIG. 22. The tone conversion circuit 1301 executes tone conversion of an original image f(x, y) in accordance with the tone conversion curve F( ) shown in FIG. 21 (s1501). In this case, for example, curve 2 compresses the range of a low-pixel value region, and curve 3 expands that range conversely. Likewise, curve 4 expands the range of a high-pixel value region, and curve 5 compresses that range. The curve F( ) is preferably formed to be differential continuous (differentiable and continuous function). Since the process in step S1501 is simple tone conversion, no overshoot occurs in the image after tone conversion.

The Frequency Coefficient Decomposing Circuit 1302 performs a two-dimensional discrete wavelet transformation process of an image F(f(x, y), the dynamic range of which has been changed by tone conversion in the tone conversion circuit 1301, and outputs frequency coefficients (s1502). The frequency transformation method may be, e.g., wavelet transformation described in Embodiment 1. In this case, the image is decomposed into frequency coefficients HH1, HL1, LH1, . . . , LL for respective frequency bands. Note that frequency decomposition may be done by a Laplacian pyramid transformation method to be described below.

In FIG. 24A, g and b respectively represent a low-resolution image and high-frequency component coefficient of an image upon decomposing to one level. The low-resolution approximate image g is obtained by filtering image signal x using a low-pass filter, and down-sampling the filtered signal. The high-frequency component coefficient b is obtained by calculating the difference between image signal x and an image obtained by up-sampling the low-resolution approximate image g and filtering the sampled image using a low-pass filter. As the low-pass filter, a filter shown in, e.g., FIG. 24B is used. In the Laplacian pyramid transformation method, this process is repeated for the low-resolution approximate image g to obtain frequency coefficients of respective frequency bands. Since details of this method are known to those who are skilled in the art, a description thereof will be omitted.

FIG. 24C shows inverse Laplacian pyramid transformation. By adding the high-frequency component coefficient b and an image obtained by up-sampling low-resolution approximate image g and filtering it using a low-pass filter, image signal x' is output. As the low-pass filter, a filter shown in, e.g., FIG. 24B is used. The Laplacian pyramid transformation method obtains a composite image by repeating this process for respective levels. Since details of this method are known to those who are skilled in the art, a description thereof will be omitted.

The coefficient conversion circuit 1303 converts the frequency coefficients using a conversion curve F2( ) shown in, e.g., FIG. 23 (s1503). In this case, only coefficients in a region 1601 equal to or lower than a predetermined absolute value (threshold value) are converted, and those higher than the predetermined absolute value remain unchanged. Note that hn(x, y) are frequency coefficients of n levels and those in the region 1601 equal to or lower than the predetermined absolute value, and h2n are coefficient values after coefficient conversion of hn(x, y) by:

$$h2n(x,y)=f4(f(x,y))\times(1/F'(x,y))\times hn(x,y) \quad (43)$$

Note that f4( ) has a curve form which depends on the original image f(x, y) or its smoothed image and, for example, a curve form that decreases a value of interest when that value is equal to or lower than a predetermined pixel value, and increases the value of interest when that value is larger than the predetermined pixel value. Frequency coefficients which are higher than the predetermined absolute value (threshold value) remain unchanged. This predetermined absolute value is determined by experiments depending on the magnitudes of coefficients with respect to the edge of an image. The edge structure can be preserved when coefficients higher than the predetermined absolute value remain unchanged, and artifacts such as overshoot and the like can be suppressed in a reconstructed image. Note that the conversion curve F2( ) in FIG. 23 illustrates the aforementioned process, and coefficients in the region 1601 are not always converted linearly but are converted on the basis of equation (43).

Since the magnitudes of frequency components (corresponding to effective components of a fine structure or the like) equal to or lower than the predetermined absolute value (threshold value) are converted on the basis of the tone conversion curve, the same contrast of the fine structure as in the original image can be maintained even in the processed image. Furthermore, since the frequency coefficients equal to or lower than the predetermined absolute value are increased/decreased on the basis of the values of the original image f(x, y) or the like, effective information (fine structure) corresponding to large pixel values of the original image can be sharpened on the reconstructed image. Also, noise emphasis can be suppressed since coefficients in the low pixel value region are not increased.

From the aforementioned fact, equation (43) can be rewritten as:

$$h2n(x, y) = f4(f(x, y)) \times (1/F'(x, y)) \times hn(x, y), \quad (43)'$$

when $hn(x, y) \leq$ predetermined absolute value(threshold value)

$= hn(x, y)$, when $hn(x, y) >$ predetermined absolute value(threshold value)

The inverse conversion circuit 1304 inversely converts the image components that have undergone coefficient conversion, thereby generating a reconstructed image (s1504).

According to Embodiment 6 described above, the dynamic range is changed, and the information of the fine structure before the dynamic range is changed can be substantially maintained while suppressing overshoot and the like. Furthermore, since the frequency coefficients are increased/decreased depending on the pixel values of the original image or its smoothed image, noise suppression and sharpening effects can also be obtained in the reconstructed image.

Embodiment 7

Figure 25:
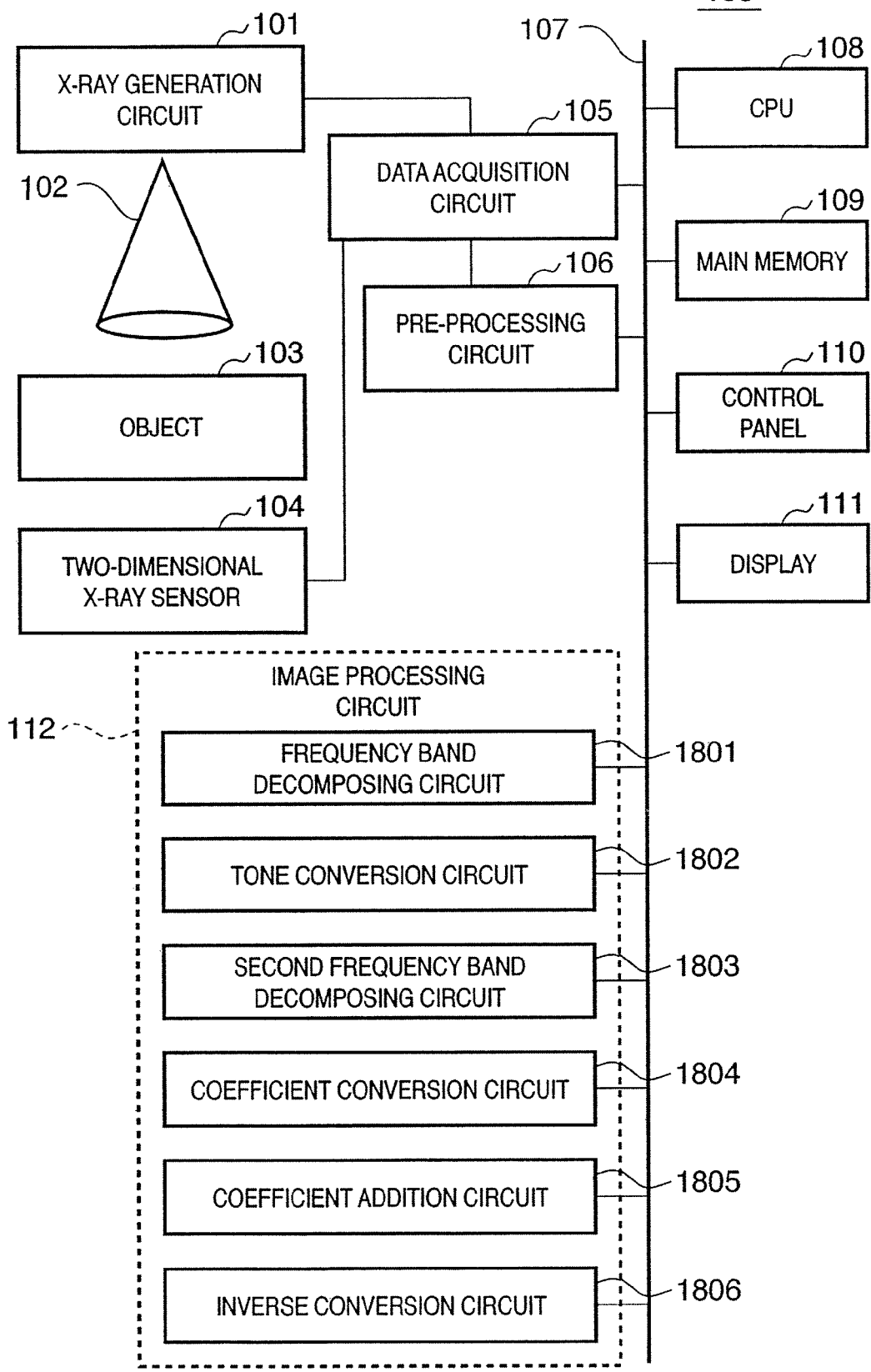
FIG. 25 is a block diagram of an image processing apparatus of Embodiment 7.

Embodiment 7 obtains the effects of the dynamic range change and frequency processes while preserving the edge structure. FIG. 25 is a block diagram showing the arrangement of Embodiment 7, and a description of the same processes as in Embodiment 1 will be omitted. Referring to FIG. 25, reference numeral 112 denotes an image processing circuit; 1801, a first frequency band decomposing circuit for decomposing an original image into a plurality of frequency bands by wavelet transformation, Laplacian pyramid transformation, or the like to obtain first frequency coefficients; 1802, a tone conversion circuit for making tone conversion that changes the dynamic range; 1803, a second frequency band decomposing circuit for decomposing the image that has undergone tone conversion by the tone conversion circuit 1802 into a plurality of frequency bands by wavelet transformation, Laplacian pyramid transformation, or the like to obtain second frequency coefficients; 1804, a coefficient conversion circuit for converting first frequency coefficient values, depending on the slope of the tone conversion curve used in the tone conversion circuit 1802 and pixel values of an original image or its smoothed image; 1805, a coefficient addition circuit for adding the coefficients converted by the coefficient conversion circuit 1804 to the second frequency coefficients; and 1806, an inverse conversion circuit for reconstructing an image by inversely converting the frequency coefficients obtained by the coefficient addition circuit 1805 using inverse wavelet transformation, inverse Laplacian pyramid transformation, or the like.

Figure 26:
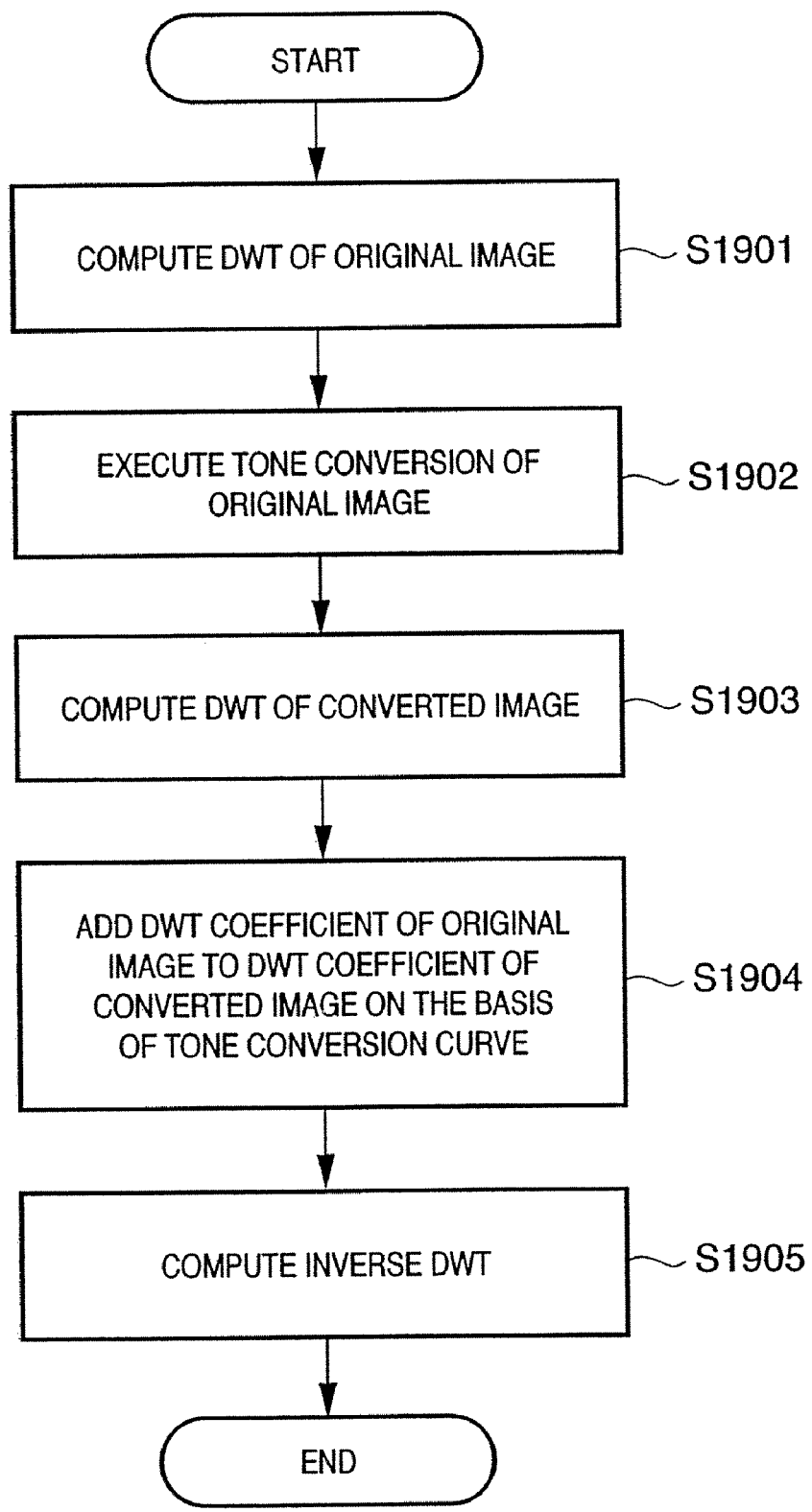
FIG. 26 is a flow chart showing the processing sequence of the image processing apparatus of Embodiment 7.
Figure 27:
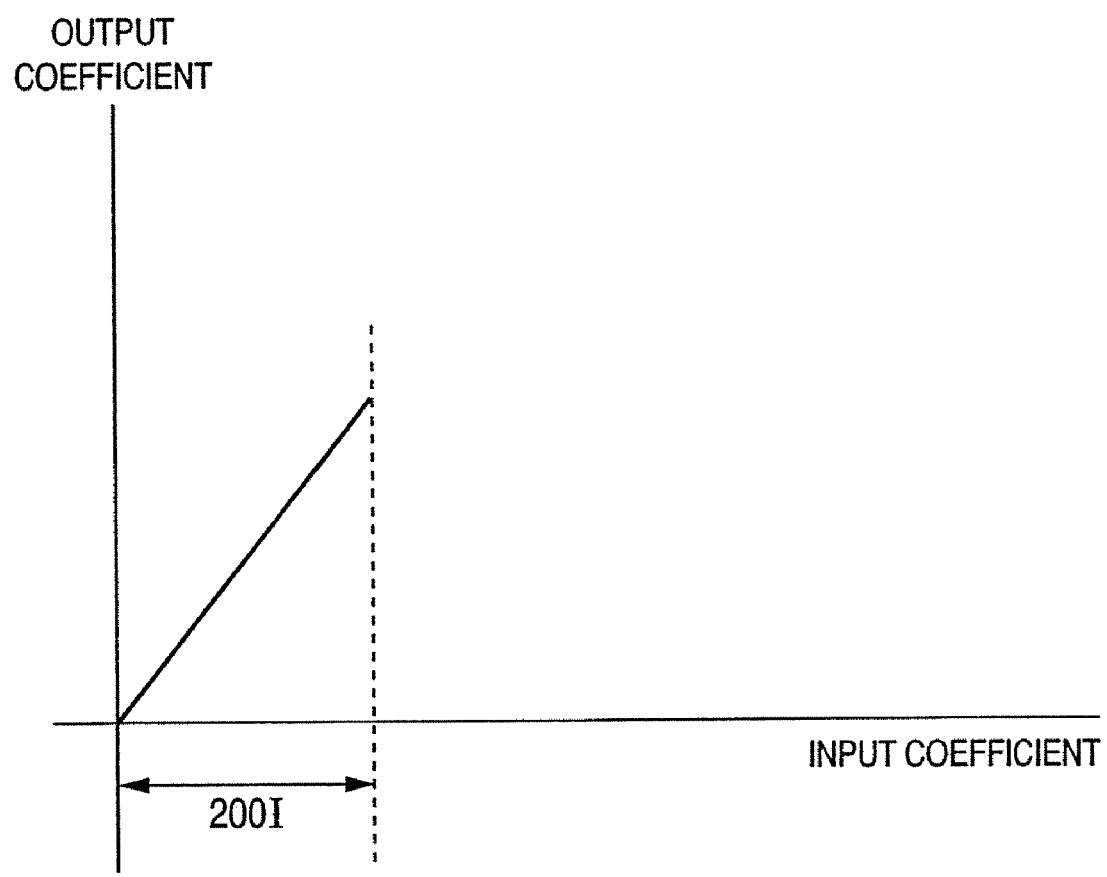
FIG. 27 shows a curve used to convert frequency coefficients.

FIG. 26 is a flow chart showing the flow of processes of the image processing circuit 112 according to Embodiment 7 of the present invention. FIG. 27 shows an example of the coefficient conversion curve used in the coefficient conversion circuit 1804. In FIG. 27, the abscissa plots input coefficients, and the ordinate plots output coefficients.

Embodiment 7 will be described below along with the flow of processes shown in FIG. 26. The first frequency band decomposing circuit 1801 executes a frequency band decomposing process of an original image to obtain image components horgn(x, y) (s1901). The frequency coefficient decomposing method may be any method of wavelet transformation, Laplacian pyramid transformation, and the like. In this embodiment, a method using two-dimensional discrete wavelet transformation (DWT) will be explained.

The tone conversion circuit 1802 executes tone conversion of an original image Org(x, y) using a tone conversion curve f( ) (s1902). An image f(Org(x,y)) that has undergone the tone conversion process undergoes a DWT process in the second frequency band decomposing circuit 1803 to obtain frequency coefficients hn(x, y) (s1903). Note that n indicates the subband category and x and y are the coordinates as in other embodiments.

The coefficient conversion circuit 1804 and coefficient addition circuit 1805 convert the frequency coefficients horgn (x, y) and add the converted frequency coefficients to the frequency coefficients hn(x, y), as described by:

$$h2n(x,y)=hn(x,y)+(1-f'(\mathrm{Org}(x,y)))\times horgn(x,y) \quad (44)$$

to obtain new frequency components h2n(x, y) (s1904).

Note that horgn(x, y) are converted in advance using the conversion curve shown in FIG. 27, and coefficients which are higher than a predetermined absolute value (threshold value) (corresponding to an edge portion) are set to be 0 in advance. Therefore, in equation (44), since only effective components corresponding to a fine structure are converted in accordance with the slope of the tone conversion curve, and the converted components are added to the frequency coefficients of the image after tone conversion, the magnitudes of effective high-frequency components of the original image can be preserved in practice. In this case, since the high-frequency components are added using those of the original image, the magnitudes of high-frequency components of the processed image can accurately become closer to those of the original image.

In place of equation (44), equation (45) may be used to obtain the same effect. That is, horgn(x, y) is converted in advance using the conversion curve shown in FIG. 27 in this case as well so as to prevent the edge structure from being not preserved and overshoot and the like from occurring. Only when the converted horgn(x, y) is not 0, (the converted) Horgn(x, Y) is selected as h2n(x, y); when the converted horgn(x, y) is 0, hn(x, y) is selected as h2n(x, y).

$$h2n(x, y) = horgn(x, y), \text{ when converted } horgn(x, y) \neq 0 \quad (45)$$

$= hn(x, y)$, when converted $horgn(x, y)$ $= 0$

The inverse conversion circuit 1806 executes an inverse conversion process based on the frequency coefficients obtained by the coefficient addition circuit 1805 (s1905).

As described above, according to Embodiment 7, since only effective coefficients corresponding to the fine structure of the original image are converted in accordance with the slope of the tone conversion curve, and the converted coefficients are added to frequency components of the image after tone conversion, the magnitudes of effective high-frequency components of the original image can be preserved in practice in the restored image. In this case, since the high-frequency components are added using those of the original image, the magnitudes of the high-frequency components after the processing can accurately come closer to those of the high-frequency components of the original image. Since the edge structure is preserved even in an image, the dynamic range of which has been changed, and which has undergone the frequency process, overshoot and the like can be suppressed.

Embodiment 8

Figure 28:
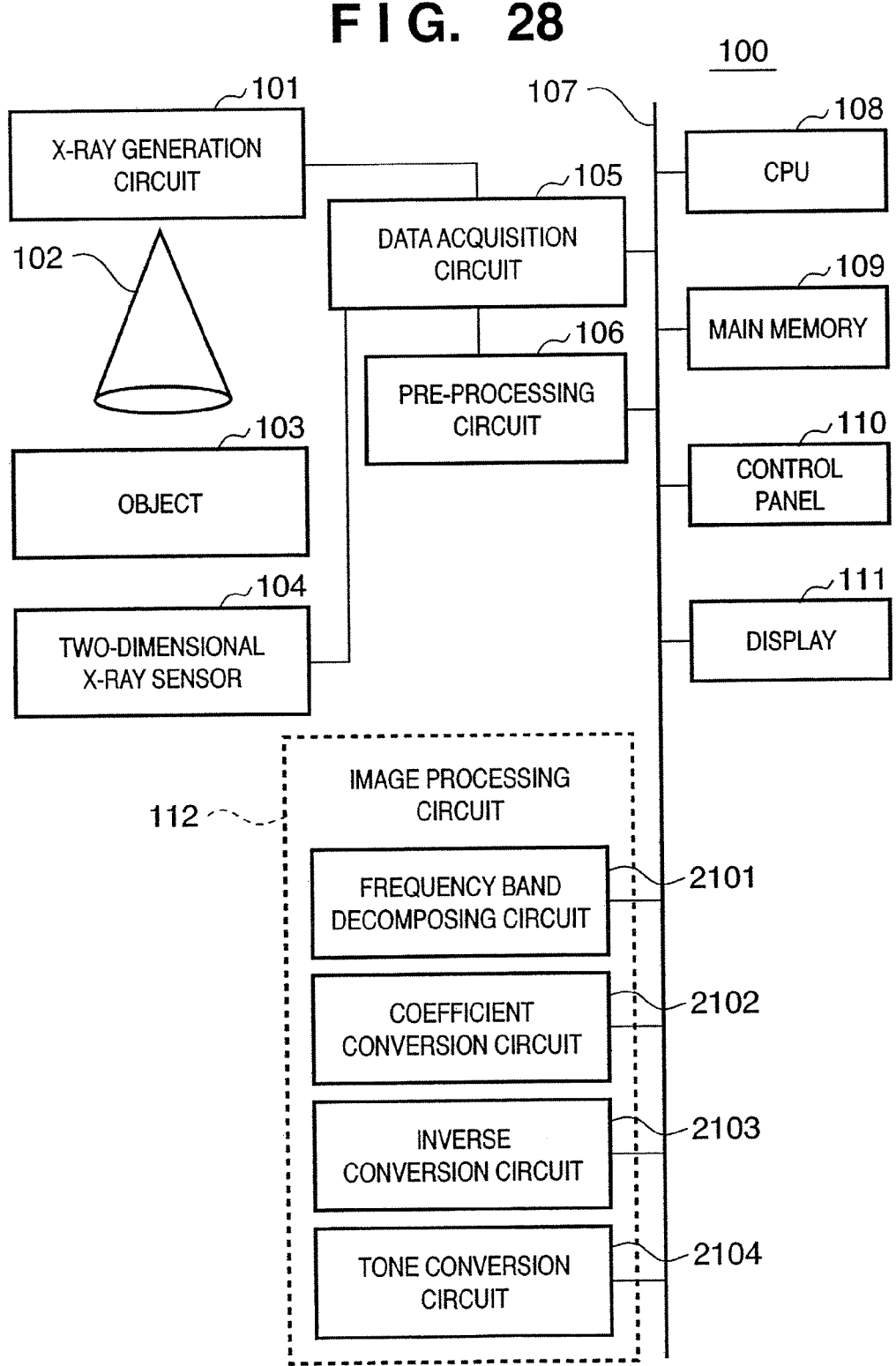
FIG. 28 is a block diagram of an image processing apparatus of Embodiment 8.

Embodiment 8 relates to an image process for obtaining the effects of the dynamic range change and frequency processes while preserving the edge structure. FIG. 28 is a block diagram showing the arrangement of Embodiment 8, and a description of the same processes as in Embodiment 1 will be omitted. Referring to FIG. 28, reference numeral 112 denotes an image processing circuit; 2101, a frequency band decomposing circuit for decomposing an original image into a plurality of frequency bands by wavelet transformation, Laplacian pyramid transformation, or the like to obtain frequency coefficients; 2102, a coefficient conversion circuit for converting the coefficients on the basis of the slope of a tone conversion curve used later to change the dynamic range; 2103, an inverse conversion circuit for inversely converting the coefficients obtained by conversion by the coefficient conversion circuit 2102; and 2104, a tone conversion circuit for changing the dynamic range of the image, obtained by inverse conversion by the inverse conversion circuit 2103.

Figure 29:
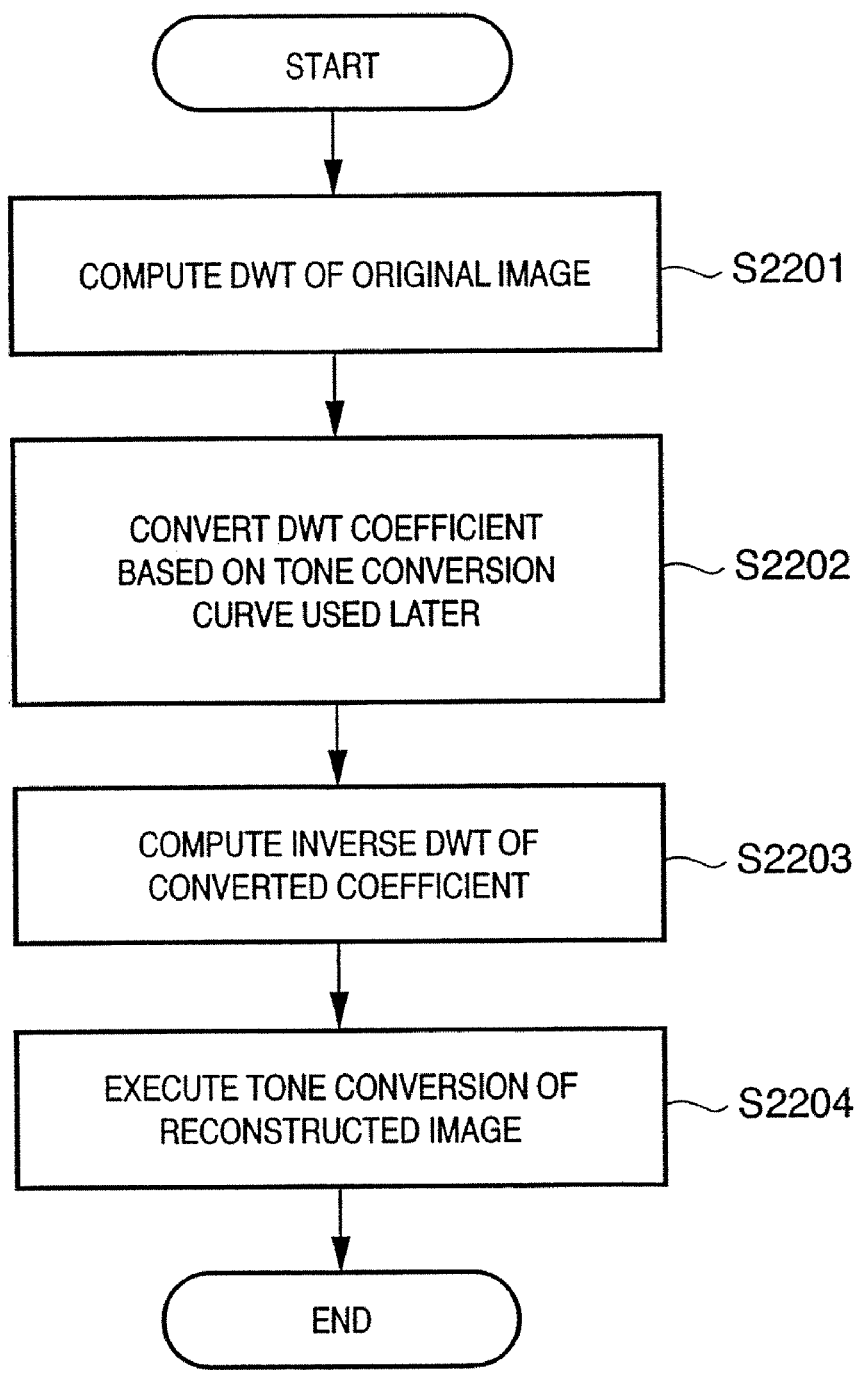
FIG. 29 is a flow chart showing the processing sequence of the image processing apparatus of Embodiment 8.
Figure 30:
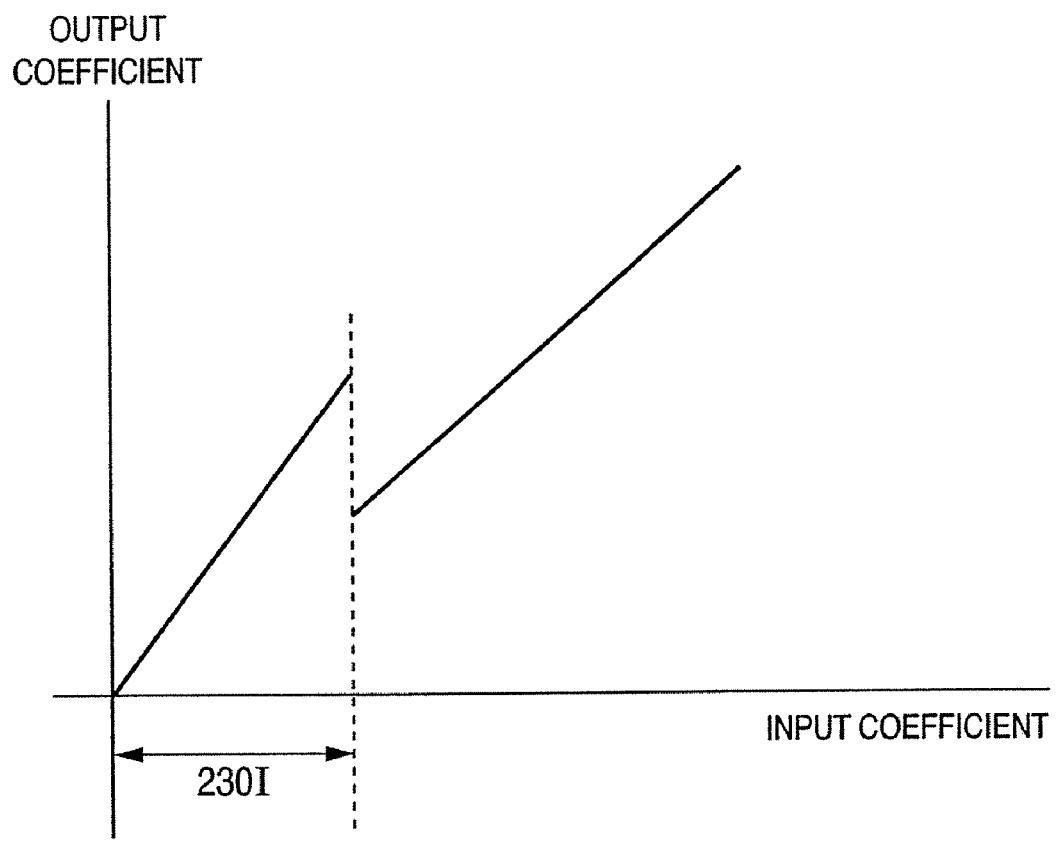
FIG. 30 shows a curve used to convert frequency coefficients.

FIG. 29 is a flow chart showing the flow of processes of the image processing circuit 112 according to Embodiment 8 of the present invention. FIG. 30 shows an example of the coefficient conversion curve used in the coefficient conversion circuit 2102. In FIG. 30, the abscissa plots input coefficients, and the ordinate plots output coefficients.

Embodiment 8 will be described below along with the flow of processes shown in FIG. 29. The frequency band decomposing circuit 2101 executes a two-dimensional discrete wavelet transformation process of an original image f(x, y), and outputs frequency coefficients (s2201). The frequency coefficient decomposing method may be any method of wavelet transformation, Laplacian pyramid transformation, and the like. In this embodiment, the image is decomposed into frequency coefficients HH1, HL1, LH1, . . . , LL for respective frequency bands using two-dimensional discrete wavelet transformation.

The coefficient conversion circuit 2102 converts the frequency coefficients in accordance with a tone conversion curve (e.g., a conversion curve shown in FIG. 21) F( ) used in the tone conversion circuit 2104 (s2202). In this case, only coefficients in a region 2301 equal to or lower than a predetermined absolute value (threshold value) are converted, and those higher than the predetermined absolute value remain unchanged, as shown in FIG. 30. This predetermined absolute value is determined by experiments depending on the magnitudes of coefficients with respect to the edge of an image. The edge structure can be preserved when coefficients higher than the predetermined absolute value remain unchanged, and artifacts such as overshoot and the like can be suppressed in a reconstructed image.

Note that hn(x, y) are frequency coefficients of n levels, and h2n(x, y) are coefficient values obtained by executing coefficient conversion of hn(x, y) based on whether or not hn(x, y) is a coefficient which belongs to the region 2301 equal to or lower than the predetermined absolute value (threshold value).

$$h2n(x, y) = f5(f(x, y)) \times (1/F'(x, y)) \times hn(x, y),\quad (46)$$

when $hn(x, y) \le$ predetermined threshold value $= fn(x, y)$, when $hn(x, y) >$ predetermined threshold value Note that f5( ) has a curve form that depends on the original image f(x, y) or its smoothed image and, for example, a curve form that decreases the value of interest when that value is equal to or lower than a predetermined pixel value, and increases the value of interest when that value is larger than the predetermined pixel value.

The inverse conversion circuit 2103 inversely converts h2n (x, y) (inverse DWT) (S2203). A restored image f2(x, y) is then obtained. The tone conversion circuit 2104 executes tone conversion of the restored image f2(x, y) by:

$$f3(x,y)=F(f2(x,y)) \quad (47)$$

to obtain an image f3(x, y), the dynamic range of which has been changed (s2204).

As described above, according to Embodiment 8, since the frequency coefficients are changed in advance on the basis of a curve form of tone conversion used to change the dynamic range, the magnitudes of high-frequency components in an image, the dynamic range of which has been changed, can be maintained nearly equal to those of high-frequency components of the original image. Since coefficient values within the predetermined absolute value range are not changed, the edge structure can be preserved, and overshoot and the like can be suppressed even in an image which has undergone the frequency process and dynamic range change process. Also, since the original image is decomposed into multiple-frequency coefficients, hybrid processes with noise suppression, a sharpening process, and the like can be easily implemented. For example, in noise suppression or the like, an analysis process based on coefficients of the original image is executed.

According to the embodiments mentioned above, a high-quality image, the dynamic range or partial pixel value range of which has been changed, while suppressing or avoiding collapse of the edge structure of the image or generation of overshoot, can be obtained.

Embodiment 9

An image processing apparatus 4100 as one aspect of the present invention will be described below with reference to the accompanying drawings. Note that the same reference numerals denote the same parts throughout the figures, and a repetitive description thereof will be omitted. The image processing apparatus 4100 of the present invention is realized as an X-ray photographing apparatus used in X-ray radiography or a part of the X-ray photographing apparatus (e.g., an image processing unit of the X-ray photographing apparatus).

Figure 31:
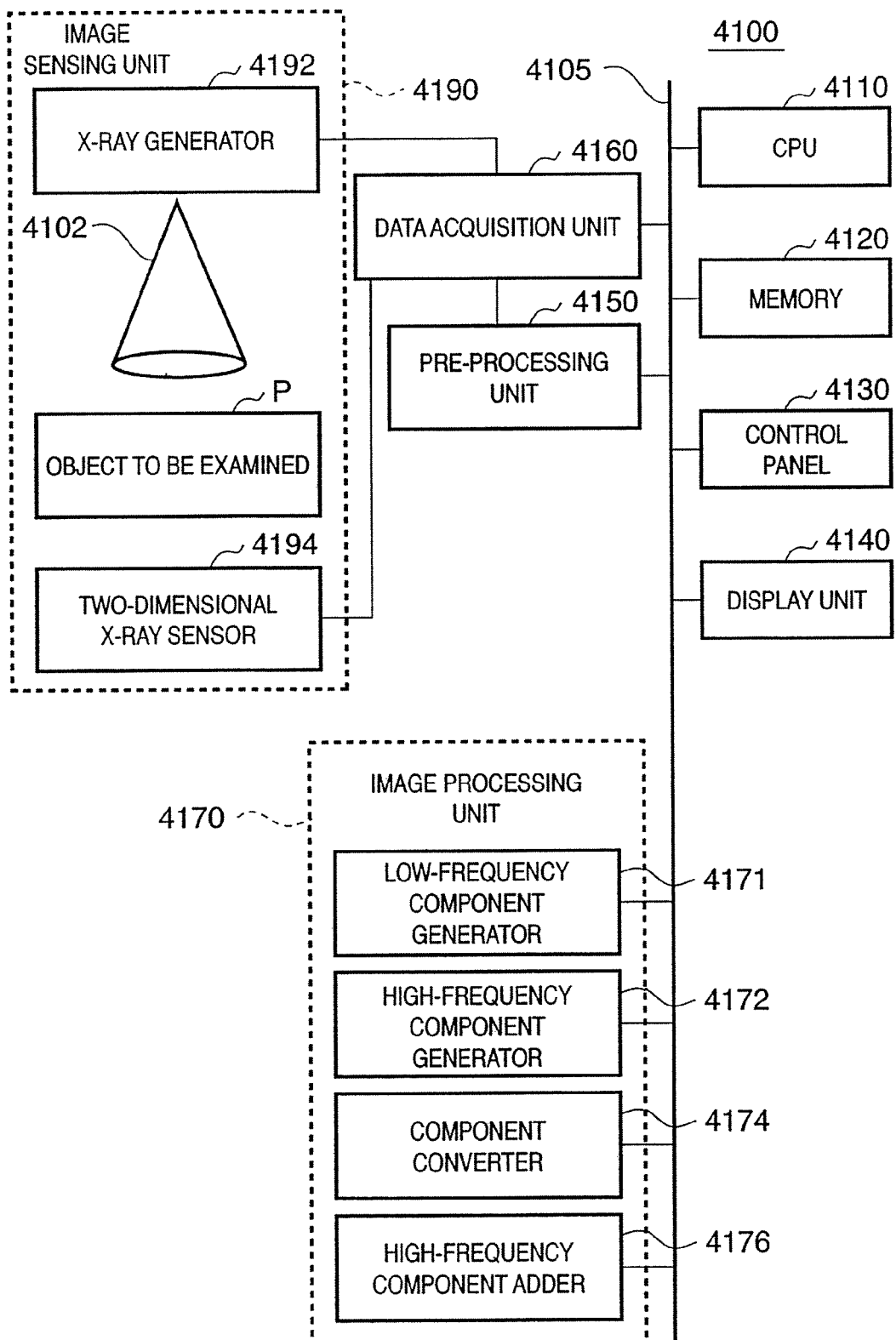
FIG. 31 is a block diagram showing an image processing apparatus of Embodiment 9.

Referring to FIG. 31, the image processing apparatus 4100 has a CPU 4110, memory 4120, control panel 4130, display unit 4140, pre-processing unit 4150, data acquisition unit 4160, and image processing unit 4170. The image processing apparatus 4100 has a CPU bus 4105, and respective components can exchange data or information via the CPU bus 4105. Note that FIG. 31 is a block diagram showing the image processing apparatus 4100 of this embodiment. As will be described in this embodiment, the image processing apparatus 4100 has an image sensing unit 4190 connected to the data acquisition unit 4160, and can achieve an image process of X-ray images sensed by the image sensing unit 4190 by a single apparatus. However, the image processing apparatus 4100 of this embodiment may be arbitrarily connectable to another image sensing device, and may have an arrangement that can implement only an image process (frequency process such as sharpening or the like) to be described later.

In this arrangement, the image processing apparatus 4100 generates an original image by executing pre-processes (e.g., offset correaction, gain correaction, Log correaction) of an image (raw image) obtained by the image sensing unit 4190 by the pre-processing unit 4150. The original image means an image which is obtained by executing the pre-processes for a raw image, e.g., an image which has undergone correactions depending on the characteristics of the image sensing unit 190 to adjust its format. However, since the original image is insufficient for a doctor to make diagnosis, an image most suitable for diagnosis or a desired image can be obtained by executing a sharpening process or the like by the image processing unit 4170. Note that this optimal image or desired image will also be referred to as a QA image (image quality-assured image).

The CPU 4110 can be any processors independently of their names such as an MPU and the like, and is connected to the CPU bus 4105. The CPU 4110 controls the operations of respective units via the CPU bus 4105. The CPU 4110 controls the operation of the overall image processing apparatus 4100 in accordance with operator's operations at the control panel 4110 using a program stored in the memory 4120.

The memory 4120 includes a nonvolatile memory such as a ROM or the like, which stores an operation program of the image processing apparatus 4100, various data required for processes, and the like, and a volatile memory such as a RAM or the like, which temporarily stores an image and a required control program.

The control panel 4130 comprises, e.g., a keyboard, switches, touch panel, and the like, and allows the operator to operate the image processing apparatus 4100. The display unit 4140 includes a display device such as a CRT, liquid crystal display, or the like, and/or printing device, and can output a QA image.

The pre-processing unit 4150 is a circuit which can execute pre-processes for a raw image, and is connected to the CPU bus 4105 and data acquisition unit 4160. Note that the pre-processes in this embodiment includes a process for correcting image errors generated by variations of the characteristics (dark current, detection sensitivity, and the like) of respective pixels (not shown) of a two-dimensional X-ray sensor 4194 (to be described later) of the image sensing unit 4190. More specifically, the pre-processes indicate offset correaction, gain correaction, logarithmic conversion (Log conversion), and the like, and every state-of-the-art techniques can be applied as such ones. The pre-processing unit 4150 executes correaction on the basis of data obtained by storing a raw image received by the data acquisition unit 4160 (or a raw image received by the data acquisition unit 4160 via the memory 4120) in the memory 4120 under the control of the CPU 4110. Note that the pre-processing unit 4150 is a part of a circuit for executing image processes, and may be formed as a part of the image processing unit 4170 to be described later. The pre-processing unit 4150 outputs the processed image (original image) to the image processing unit 4170 and/or the memory 4120.

The data acquisition unit 4160 is connected to the image sensing unit 4190, pre-processing unit 4150, and CPU bus 4105. The data acquisition unit 4160 converts a raw image output from the image sensing unit 4190 into a predetermined electrical signal, and supplies the electrical signal to the pre-processing unit 4150 and/or the memory 4120. The data acquisition unit 4160 has, e.g., a 14-bit A/D converter, and supplies a digital signal proportional to the output from the image sensing unit 4190 to the pre-processing unit 4150 and/or the memory 4120. In this way, the pre-processing unit 4150 can execute the aforementioned pre-processes, e.g., logarithmically convert the digital signal into one proportional to the log value of the X-ray dose.

The image processing unit 4170 has a low-frequency component generator 4171, high-frequency component generator 4172, component converter 4174, and high-frequency component adder 4176, and can exchange data via the CPU bus 4105. The low-frequency component generator 4171 generates a smoothed image (i.e., low-frequency components or a low-frequency image, which are or is used as synonymous terms in principle in this specification) from the original image. The high-frequency component generator 4172 generates high-frequency components (high-frequency image) by subtracting the smoothed image from the original image. The component converter 4174 converts the high-frequency components generated by the high-frequency generator 4172 using a predetermined function. Note that such predetermined function will be explained in detail later in the paragraphs of operations, and a description thereof will be omitted here. The high-frequency component adder 4176 adds the high-frequency components converted by the component converter 4174 to the original image or smoothed image. The image processing unit 4170 of this embodiment does not add high-frequency components having absolute values equal to or higher than a predetermined threshold value to the original image. Or the image processing unit 4170 adds, to the smoothed image converted at a predetermined magnification, high-frequency components obtained by converting high-frequency components having absolute values equal to or higher than the predetermined threshold value at an identical magnification (the predetermined magnification) and arbitrarily converting high-frequency components having absolute values less than the predetermined threshold value. In this way, the edge structure is preserved, overshoot and the like can be suppressed, and a desired frequency process such as sharpening or the like can be executed.

Figure 36:
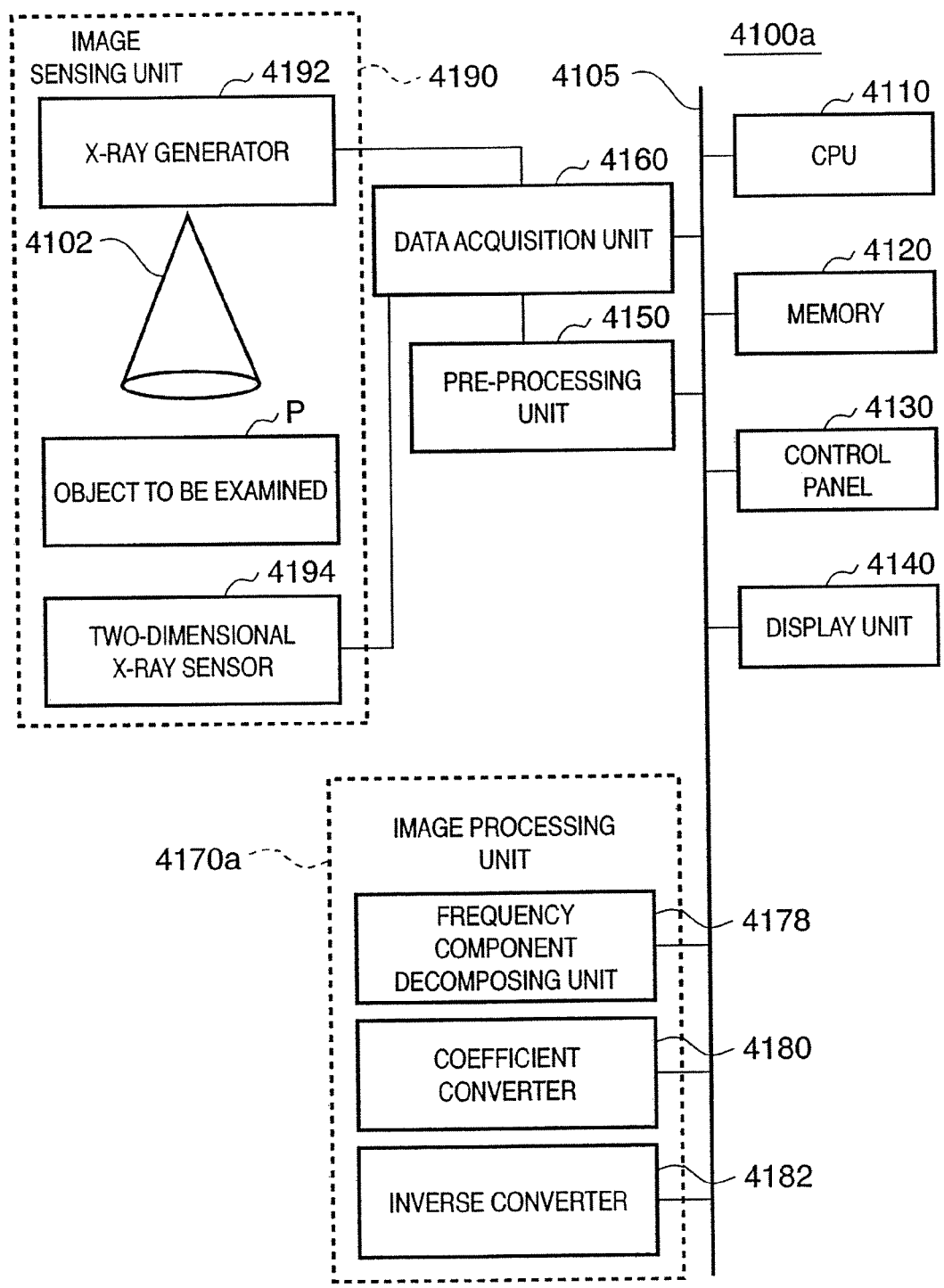
FIG. 36 is a block diagram showing an image processing apparatus of Embodiment 10.

As shown in FIG. 36, the image processing unit 4170 may be replaced by an image processing unit 4170a. Note that FIG. 36 is a block diagram showing an image processing apparatus 4100a according to another embodiment of the present invention. The image processing unit 4170a has a frequency coefficient decomposing unit 4178, coefficient converter 4180, and inverse converter 4182, and can exchange data via the CPU bus 4105.

Figure 37A:
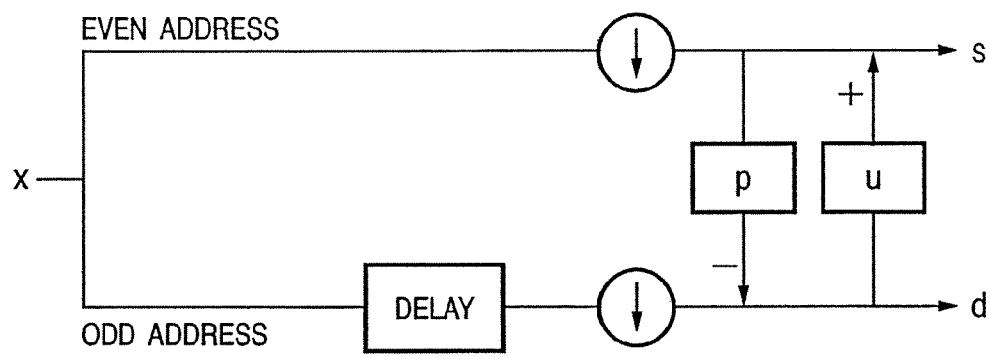
FIG. 37A is a circuit diagram showing an instantiated circuit arrangement of a discrete wavelet transformation process.
Figure 37B:
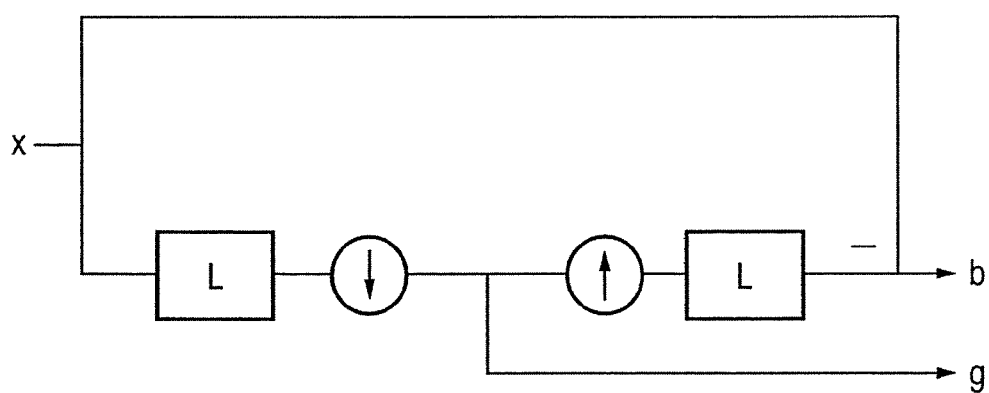
FIG. 37B is a circuit diagram showing an instantiated circuit arrangement of a Laplacian pyramid transformation process.

The frequency coefficient decomposing unit 4178 comprises a circuit for applying a frequency decomposing process based on discrete wavelet transformation (to be also referred to as DWT hereinafter) or Laplacian pyramid transformation to the original image. Such circuit has an arrangement, as shown in, e.g., FIGS. 37A and 37B, but does not limit application of any other state-of-the-art techniques. FIG. 37A is a circuit diagram of the circuit showing an instantiated circuit arrangement of the frequency decomposing process based on discrete wavelet transformation, and FIG. 37B is a circuit diagram of the circuit showing an instantiated circuit arrangement of the frequency decomposing process based on Laplacian pyramid transformation. With such arrangement, the frequency coefficient decomposing unit 4178 obtains frequency coefficients (wavelet transform coefficients or Laplacian pyramid transform coefficients) for respective frequency bands.

The coefficient converter 4180 is a coefficient conversion circuit for converting the frequency coefficients for respective frequency bands obtained by the frequency coefficient decomposing unit 4178, and converts the frequency coefficients on the basis of a predetermined function. Note that the predetermined function will be explained in detail later in the paragraphs of operations, and a description thereof will be omitted here.

Figure 38A:
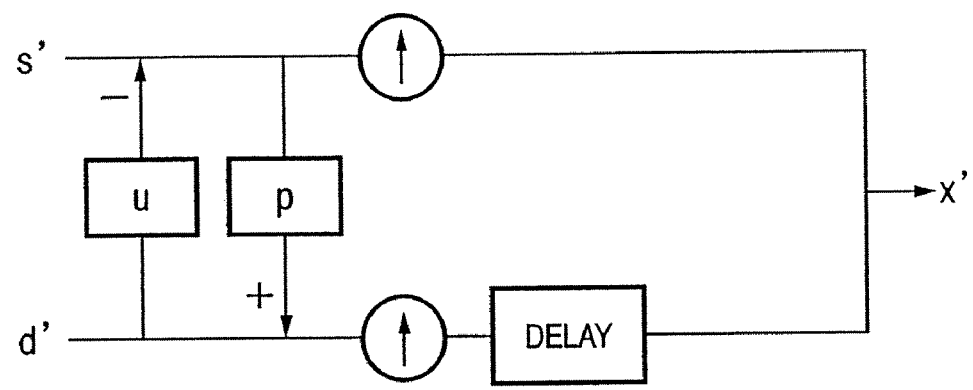
FIG. 38A is a circuit diagram showing an instantiated circuit arrangement of an inverse discrete wavelet transformation process.
Figure 38B:
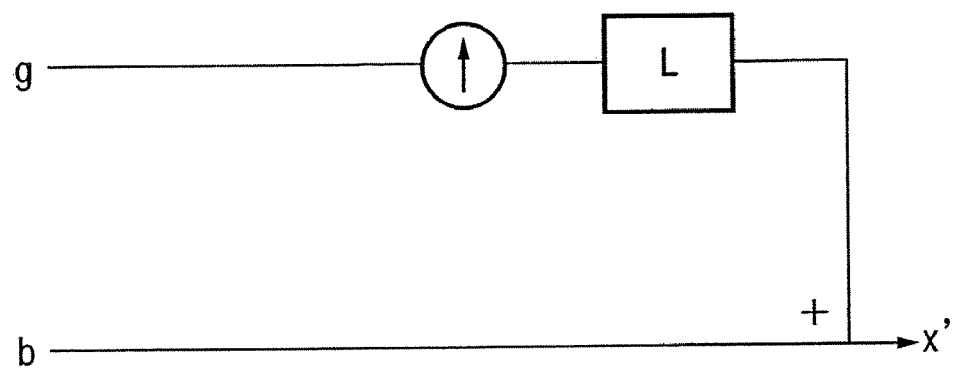
FIG. 38B is a circuit diagram showing an instantiated circuit arrangement of an inverse Laplacian pyramid transformation process.

The inverse converter 4182 comprises a circuit for making inverse discrete wavelet transformation (to be also referred to as inverse DWT hereinafter) or inverse transformation of the Laplacian pyramid method (inverse Laplacian pyramid transformation) on the basis of the frequency coefficients converted by the coefficient converter 4180. Such circuit has an arrangement, as shown in, e.g., FIGS. 38A and 38B, but does not limit application of any other state-of-the-art techniques. FIG. 38A is a circuit diagram of the circuit showing an instantiated circuit arrangement of inverse discrete wavelet transformation, and FIG. 38B is a circuit diagram of the circuit showing an instantiated circuit arrangement of inverse transformation of the Laplacian pyramid method (inverse Laplacian pyramid transformation). With such arrangement, the inverse converter 4182 can obtain a QA image by inversely converting the converted frequency coefficients.

Note that the image processing units 4170 and 4170a are different in terms of their image processing methods, which will be easily understood in the paragraphs of operations to be described later.

The image sensing unit 4190 comprises an X-ray generator 4192 and the two-dimensional X-ray sensor 4194, and is connected to the data acquisition unit 4160. As shown in FIG. 31, the X-ray generator 4192 and two-dimensional X-ray sensor 4194 are arranged at opposing positions via an object P to be examined. In such arrangement, the image sensing unit 4194 senses X-rays via interactions with the object P to be examined such as absorption, scattering, and the like, and supplies the X-ray image (raw image) to be data acquisition unit 4160. The X-ray generator 4192 can be operated by the operator (including control by the CPU 4110 in accordance with an operation program stored in the memory 4120 when the operator operates the control panel 4130), and comprises a circuit including an X-ray bulb. On the other hand, the two-dimensional sensor 4194 has a multilayered structure made up of a phosphor and amorphous silicon photosensor in turn from the entrance side of X-rays, and is connected to the data acquisition unit 4160. Note that the image sensing unit 4190 is not limited to the aforementioned specific arrangement, and other state-of-the-art techniques may be applied. The image sensing unit 4190 may be a building component independent from the image processing apparatus 4100, and the image processing apparatus 4100 of the present invention does not always require the image sensing unit 4190. For example, the image sensing unit 4190 may be connected to the image processing apparatus 100 as an independent device.

The operations of the aforementioned image processing apparatus 4100 will be described below. In the following description, the image processing apparatus 4100 is embodied as, for example, a medical X-ray photographing apparatus.

When the operator inputs a photographing instruction by operating the control panel 4130, the X-ray generator 4192 emits an X-ray beam toward the object P to be examined. The X-ray beam emitted by the X-ray generator 4192 is transmitted through the object P to be examined while being attenuated, and reaches the two-dimensional X-ray sensor 4194. The X-ray beam is detected by the two-dimensional X-ray sensor 4194, and is output as an X-ray image. Assume that the X-ray image output from the two-dimensional X-ray sensor 4194 is, for example, a human body image or the like.

The data acquisition unit 4160 converts the X-ray image output from the two-dimensional X-ray sensor 4194 into a digital signal, and supplies that signal to the pre-processing unit 4150. The pre-processing unit 4150 executes pre-processes such as offset correaction, gain correaction, and the like for the digital signal output from the data acquisition unit 4160. The signal that has undergone the pre-processes by the pre-processing unit 4150 is transferred as an original image to the memory 4120 and/or the image processing unit 4170 via the CPU bus 4105 under the control of the CPU 4110.

Figure 32:
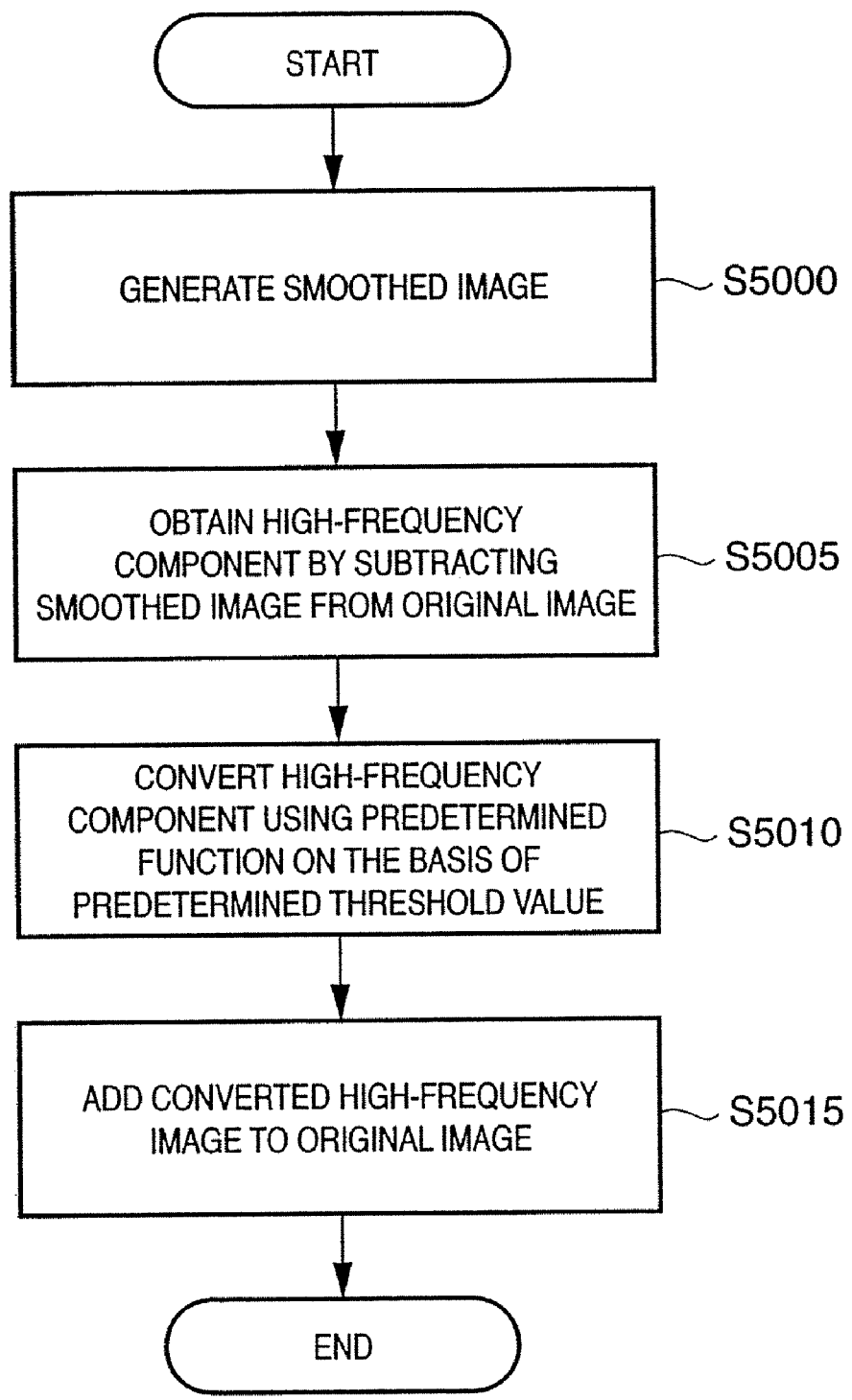
FIG. 32 is a flow chart showing an image processing method of Embodiment 9.
Figure 33:
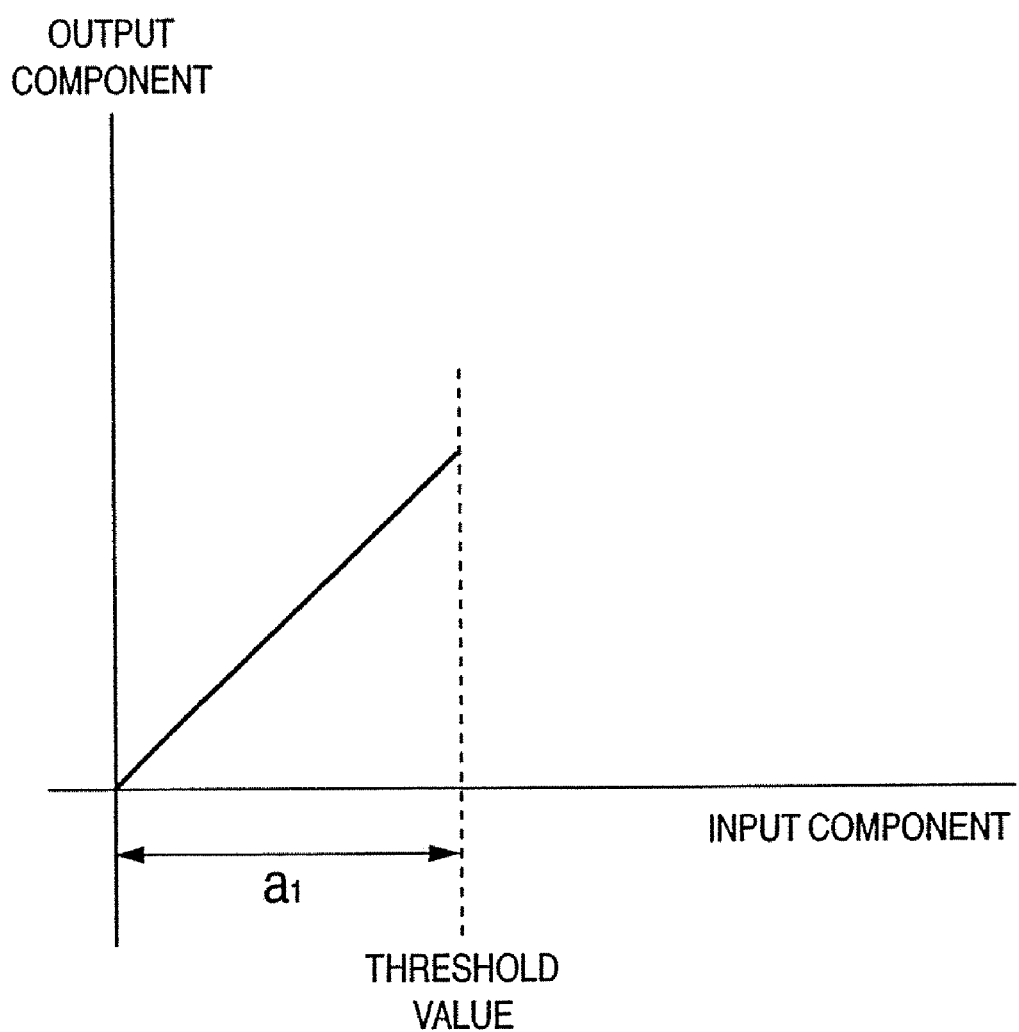
FIG. 33 shows a conversion curve used to convert high-frequency components in a high-frequency component addition unit.

The operation of the image processing unit 4170, i.e., the image processing method according to a preferred embodiment of the present invention, will be described below with reference to FIGS. 32 and 33. FIG. 32 is a flow chart showing the image processing method according to an embodiment of the present invention. FIG. 33 shows a conversion curve used to convert high-frequency components in the component converter 4174. In FIG. 33, the abscissa plots input high-frequency components, and the ordinate plots converted high-frequency components. FIG. 33 shows the conversion curve when input components are +, and the same conversion is made even when coefficients are −. That is, as can be easily understood for those who are skilled in the art, FIG. 33 shows only the first quadrant of an odd function.

The low-frequency component generator 4171 of the image processing unit 4170 receives the image (original image) output from the pre-processing unit 4150 via the CPU bus 4105. The low-frequency component generator 4171 generates, based on the original image, a smoothed image (step 5000) by:

$$fus(x, y) = \frac{\int_{d2}^{d1}\int_{d4}^{d3} f(x,y)\,dx\,dy}{\int_{d2}^{d1}\int_{d4}^{d3} dx\,dy} \quad (48)$$

where $f(x, y)$ is the original image, $fus(x, y)$ is the smoothed image, and $d1$, $d2$, $d3$, and $d4$ are the mask sizes.

Note that $d1=y+d$, $d2=y-d$, $d3=x+d$, and $d4=x-d$. When such smoothed image generation method using the moving average is used, a short calculation time can be assured.

Note that the smoothed image $fus(x, y)$ generated in step 5000 is not limited to that obtained by the function given by equation (48). For example, the smoothed image may be generated using morphological filter arithmetic operations described by:

$$f1(x,y)=\min\{f(x+1,y+1)-D(x1,y1)|x1\times x1+y1\times y1 \leq r1 \times r1\} \quad (49)$$

$$f2(x,y)=\max\{f1(x+1,y+1)+D(x1,y1)|x1\times x1+y1\times y1 \leq r1\times r1\} \quad (50)$$

$$f3(x,y)=\max\{f2(x+1,y+1)+D(x1,y1)|x1\times x1+y1\times y1 \leq r1\times r1\} \quad (51)$$

$$fus(x,y)=\min\{f3(x+1,y+1)-D(x1,y1)|x1\times x1+y1\times y1 \leq r1\times r1\} \quad (52)$$

where $D(x, y)$ is a disk-shaped filter and $r1$ is an arbitrary constant selected in correspondence with an input image. Note that $D(x, y)$ has relationships given by:

$$D(x,y)=0, \text{ when } x \times x + y \times y \leq r1 \times r1 \quad (53)$$

$$D(x,y)=-\infty, \text{ when } x \times x + y \times y > r1 \times r1 \quad (54)$$

The profile of fus(x, y) obtained by the above process approximately preserves the edge structure, and that image hardly causes overshoot as a drawback of the conventional sharpening process.

Likewise, fus(x, y) may be generated using a median filter. Since the smoothed image in such case relatively preserves the edge structure, it hardly causes overshoot as a drawback of the conventional sharpening process as in the image obtained using the morphology arithmetic operations.

The high-frequency component generator 4172 generates high-frequency components fh(x, y) by:

$$fh(x,y)=f(x,y)-fus(x,y) \quad (55)$$

That is, the generator 4172 calculates the difference between the smoothed image fus(x, y) obtained in step 5000 and the original image f(x, y), and extracts a differential image consisting of high-frequency components (5005).

The component converter 4174 generates high-frequency fh1(x, y) by converting the high-frequency components fh(x, y) using a conversion curve (function F1( )) (step 5010) by:

$$fh1(x,y)=F1(fh(x,y)) \quad (56)$$

Note that the conversion curve F1( ) is a function which is expressed by a curve shape shown in, e.g., FIG. 33. According to such curve shape, high-frequency components having absolute values equal to or higher than a predetermined value (threshold value) are decreased, and the magnitudes of high-frequency components having absolute values less than the predetermined value (range $a_1$ in FIG. 33) are arbitrarily changed. In FIG. 33, conversion is made so that high-frequency components equal to or higher than the predetermined value are set to be 0, and those less than the predetermined value remain unchanged (the slope of curve is 1). Note that the threshold value may be arbitrarily input by the operator, or may be automatically determined on the basis of the original image by analyzing the original image.

In general, the absolute values of high-frequency components that indicate overshoot are larger than a predetermined value, and the absolute values of high-frequency components corresponding to a fine structure are small. Also, the high-frequency components with the large absolute values are generated in an edge portion of an image. Furthermore, overshoot is experienced in the QA image when the pixel values of some pixels in the edge portion are specifically and excessively outstanding. For this reason, when the absolute value of a given high-frequency component is larger than the predetermined value (threshold value), the value of that high-frequency component is set to be 0 (as a result, that high-frequency component is not added to the original image), thus suppressing overshoot and preserving the edge structure.

The high-frequency component adder 4176 adds the converted high-frequency components fh1(x, y) to the original image (step 5015) by:

$$fprc(x,y)=f(x,y)+fh1(x,y) \quad (57)$$

Note that the ratio at which high-frequency components are added may be determined depending on the pixel values of the original image or its smoothed image by:

$$fprc(x,y)=f(x,y)+F0(f(x,y)) \times fh1(x,y) \quad (58)$$

Note that F0( ) is a function which depends on the pixel value and, for example, a function or the like which monotonously increases with increasing pixel value. In this way, by decreasing the amount of high-frequency components to be added in the low pixel value region where noise is relatively conspicuous, the effect of preventing noise emphasis can be obtained.

Also, by converting high-frequency components less than the predetermined threshold value by various linear or non-linear conversion functions, frequency processes according to various purposes can be done. For example, a process that especially emphasizes high-frequency components within a predetermined absolute value range in accordance with the distribution of the absolute values of high-frequency components of a fine structure to be emphasized, a process that weakly emphasizes, does not emphasize, or suppresses high-frequency components within a predetermined absolute value range in accordance with the distribution of the absolute values of relatively unnecessary high-frequency components, an emphasis/suppression process as a combination of these processes, and the like can be executed.

The image fprc(x, y) after such processes is supplied from the image processing unit 4170 to the memory 4120 and display unit 4140. The operator (e.g., a radiologist or doctor) can confirm the sensed image and make diagnosis on the basis of the image output to the display unit 4140.

As described above, with such image processing method, high-frequency components having absolute values equal to or higher than the predetermined threshold value are not added to the original image since they are set to be 0, thus preserving the edge shape and preventing overshoot. Since only high-frequency components less than the predetermined threshold value are added to the original image directly or after they are converted using a predetermined function, frequency processes according to various purposes, e.g., sharpening that emphasizes high-frequency components corresponding to effective information of a fine structure or the like, sharpening that emphasizes only effective or desired high-frequency components having absolute values within the predetermined range, and the like can be done. For example, an image, which is naturally emphasized without unnaturally influencing a metal segment implanted in a human body and the edge portion of a bone or the like, can be obtained.

When the smoothed image is generated by morphology arithmetic operations, overshoot hardly occurs. Furthermore, when the process using the aforementioned conversion curve is done, since high-frequency components corresponding to overshoot can be suppressed, overshoot can be suppressed more effectively.

Likewise, when a smoothed image is generated by the median filter, overshoot hardly occurs. Furthermore, when the process using the aforementioned conversion curve is done, since high-frequency components corresponding to overshoot can be suppressed, overshoot can be suppressed more effectively.

Figure 35:
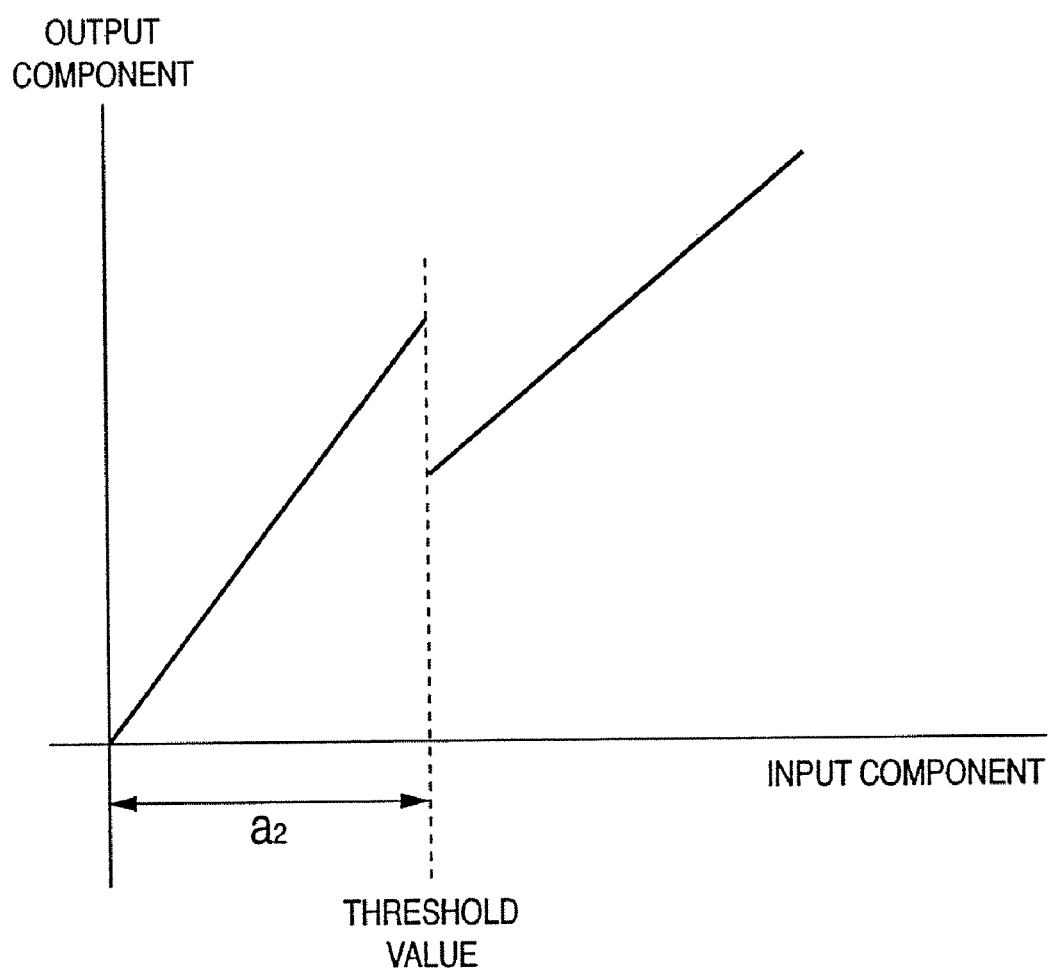
FIG. 35 shows a conversion curve used to convert high-frequency components in a high-frequency component addition unit.

An image processing method as a modification of the aforementioned image processing method, i.e., a modification of the operation executed by the image processing unit 4170, will be described below with reference to FIGS. 34 and 35. FIG. 34 is a flow chart showing another image processing method of the present invention. FIG. 35 shows a conversion curve used to convert high-frequency components in the component converter 4174. In FIG. 35, the abscissa plots input high-frequency components, and the ordinate plots converted high-frequency components. FIG. 35 shows the conversion curve when input components are +, and the same conversion is made even when coefficients are −. That is, FIG. 35 shows only the first quadrant of an odd function. Also, the overall operation of the image processing apparatus 4100 is as described above, and a repetitive explanation will be avoided here.

As in the aforementioned method, the low-frequency component generator 4171 of the image processing unit 4170 receives the image (original image) output from the pre-processing unit 4150 via the CPU bus 4105. The low-frequency component generator 4171 generates a smoothed image from the original image using equation (48) above (step 5100). Let f(x, y) be the original image, and fus(x, y) be the smoothed image. Note that generation of the smoothed image fus(x, y) may use any methods such as morphological filtering, and the like as in the above method.

The high-frequency component generator 4172 generates high-frequency components fh(x, y) according to equation (55). That is, the generator 4172 calculates the difference between the smoothed image fus(x, y) obtained in step 5100 and the original image f(x, y), and extracts a differential image consisting of high-frequency components (5105).

The component converter 4174 generates high-frequency fh2(x, y) by converting the high-frequency components fh(x, y) using a conversion curve (function F2( )) (step 5110) by:

$$fh2(x,y)=F2(fh(x,y)) \qquad (59)$$

Note that the conversion curve F2( ) is a function which is expressed by a curve shape shown in, e.g., FIG. 35. According to the curve shape shown in FIG. 35, high-frequency components having absolute values equal to or higher than a predetermined value (threshold value) are maintained (slope=1), i.e., their values are not converted. On the other hand, the magnitudes of high-frequency components having absolute values less than the predetermined value (range $a_2$ in FIG. 35) are increased (or may be decreased). Such threshold value may be arbitrarily input by the operator, or may be automatically determined on the basis of the original image by analyzing the original image. Note that the function form shown in FIG. 35 is an example, and it suffices to convert high-frequency components equal to or higher than the predetermined threshold value and those less than the predetermined threshold value at different magnifications in this embodiment. However, the slope of the function form with respect to an input value equal to or higher than the predetermined threshold value must depend on a predetermined magnification of the smoothed image (to be described later). For example, if low-frequency components are added after they are doubled or tripled, the slope (differential value) must be set to be 2 or 3 in correspondence with that magnification.

The converted high-frequency components fh2(x, y) are added to the smoothed image fus(x, y) (step S5115). Note that fprc(x, y) is the processed image.

$$fprc(x,y)=fus(x,y)+fh2(x,y) \qquad (60)$$

Note that the ratio at which only high-frequency components less than the predetermined threshold value are added to the smoothed image fus(x, y) may be determined depending on the pixel values of the original image or its smoothed image, as described by equation (58). The smoothed image fus(x, y) may be converted (emphasized or suppressed) at a predetermined magnification, and the converted image may be added to the high-frequency components fh2(x, y). However, when the smoothed image fus(x, y) is converted at the predetermined magnification, the edge structure of a QA image is not preserved normally. Therefore, in order to preserve the edge structure of the QA image, low-frequency components and high-frequency components equal to or higher than the predetermined threshold value must be converted at substantially the same ratio. More specifically, the slope (differential value) of the function used to convert high-frequency components equal to or higher than the predetermined threshold value must be equal to that predetermined magnification. This can be easily understood since high-frequency components which form an edge portion have large absolute values, and since the edge structure does not collapse if low- and high-frequency components which form the edge portion are uniformly converted at the same ratio, but the edge structure collapses if low- and high-frequency components which form the edge portion are converted at different ratios.

Therefore, when high-frequency components which form the edge structure (i.e., have absolute values equal to or higher than the predetermined threshold value) and all low-frequency components are changed at a predetermined ratio, and other high-frequency components remain unchanged, the dynamic range can be changed while preserving the edge structure, and a processed image that can maintain an effective fine structure unchanged can be obtained.

Also, by converting high-frequency components less than the predetermined threshold value by various linear or non-linear conversion functions, frequency processes according to various purposes can be done. For example, a process that especially emphasizes high-frequency components within a predetermined absolute value range in accordance with the distribution of the absolute values of high-frequency components of a fine structure to be emphasized, a process that weakly emphasizes, does not emphasize, or suppresses high-frequency components within a predetermined absolute value range in accordance with the distribution of the absolute values of relatively unnecessary high-frequency components, an emphasis/suppression process as a combination of these processes, and the like can be executed.

The image fprc(x, y) after such processes is supplied from the image processing unit 4170 to the memory 4120 and display unit 4140. The operator (e.g., a radiologist or doctor) can confirm the sensed image and make diagnosis on the basis of the image output to the display unit 4140.

In the aforementioned image processing method, high-frequency components converted using the function F1( ) are added to the original image, while in the modification, high-frequency components converted using the function F2( ) are added to the smoothed image. With such modification, the same effect as in the aforementioned image processing method can be obtained. As a result, the effect of sharpening that emphasizes high-frequency components corresponding to effective information of a fine structure or the like, noise reduction that suppresses high-frequency components corresponding to unnecessary information such as noise or the like, and the like can be obtained. In addition, since the magnitudes of high-frequency components of the edge portion remain unchanged relative to those of low-frequency components, the edge shape can be preserved, and overshoot can be prevented.

Embodiment 10

Figure 39:
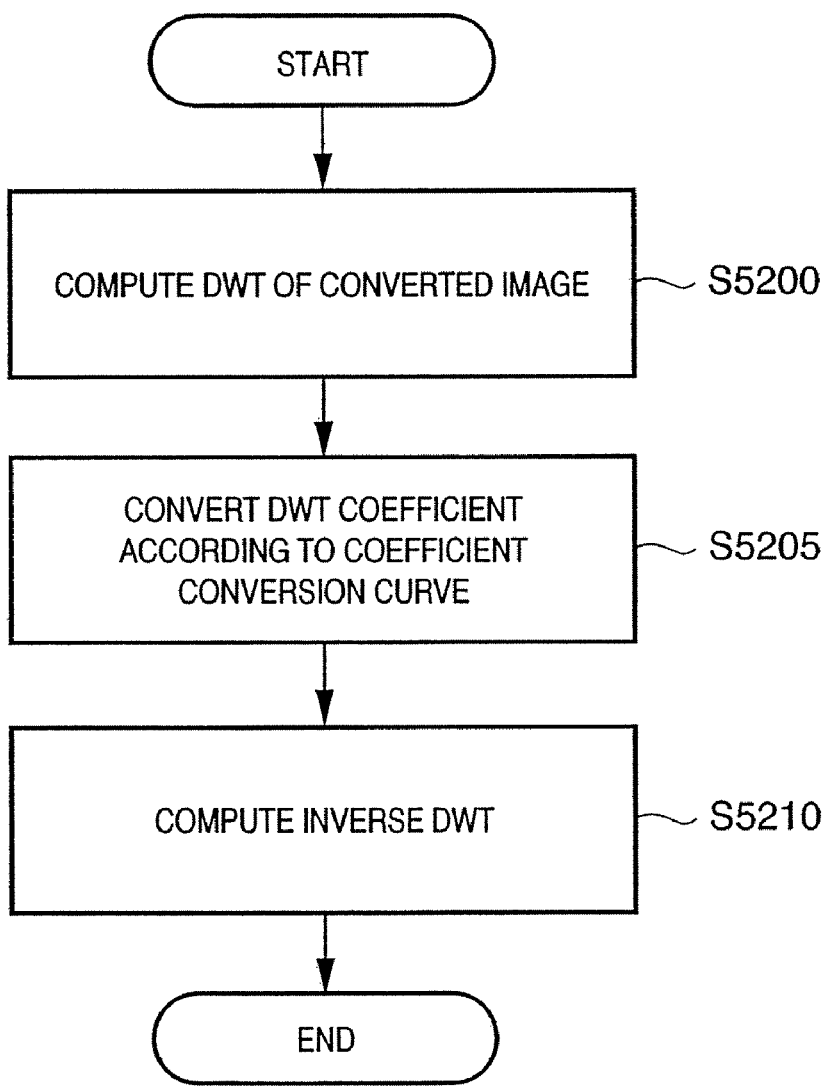
FIG. 39 is a flow chart showing the process of an image processing unit of Embodiment 10.
Figure 40:
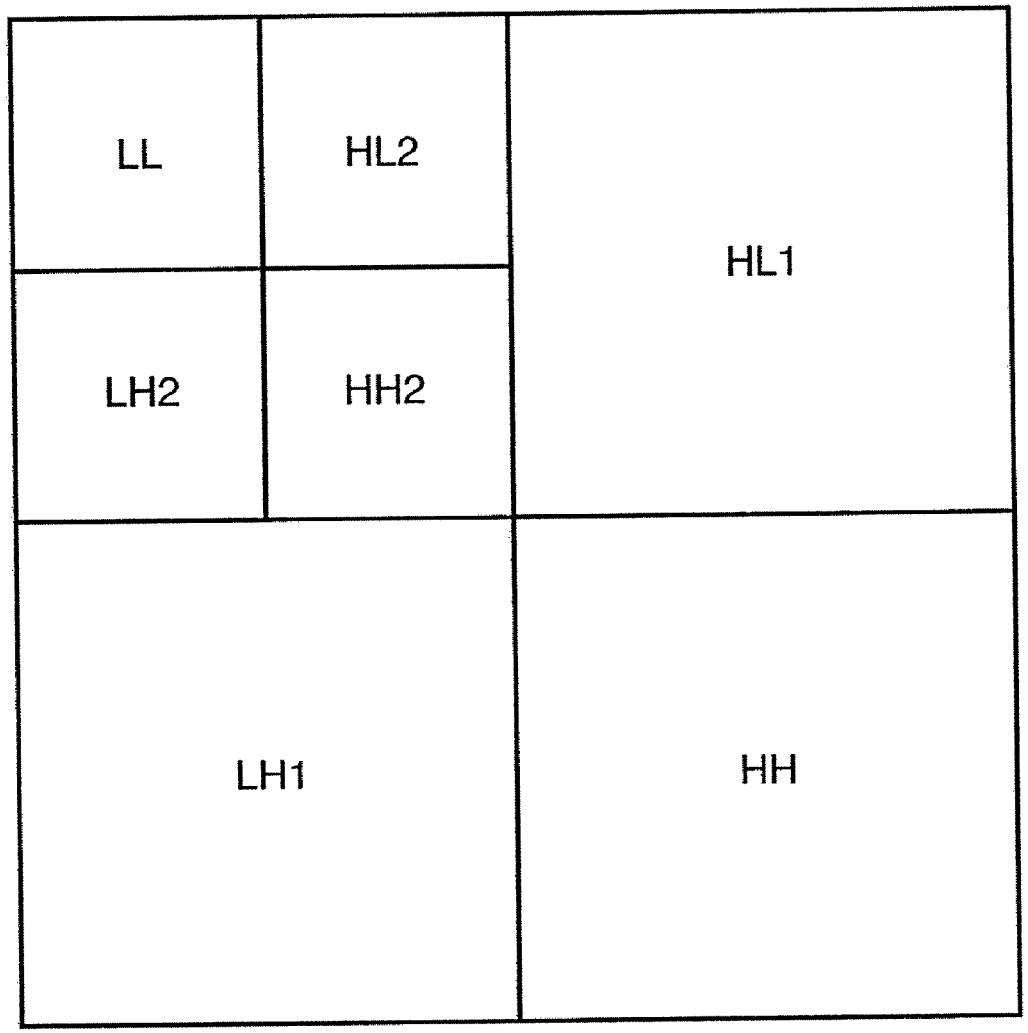
FIG. 40 shows an example of the format of transform coefficient groups of two levels obtained by a two-dimensional transformation process.
Figure 41:
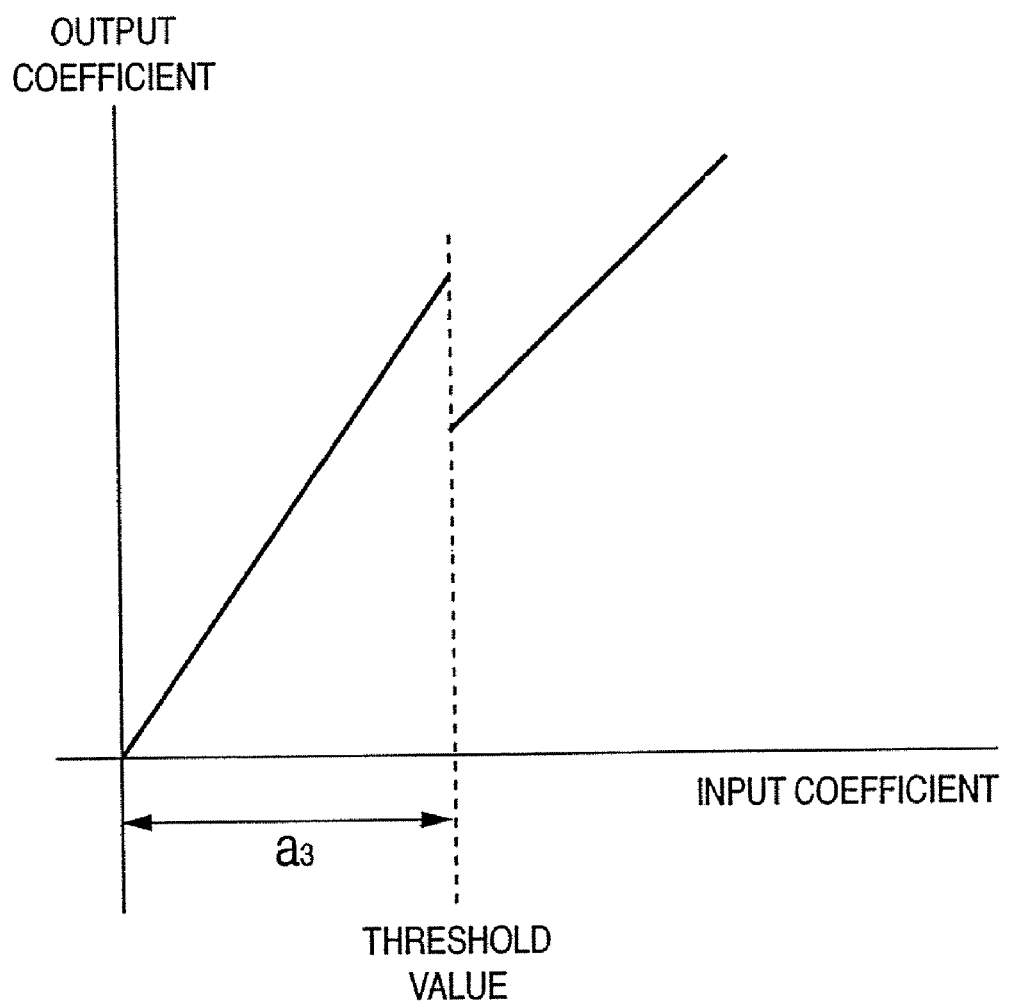
FIG. 41 is a graph showing a coefficient conversion function F3( )
Figure 42A:
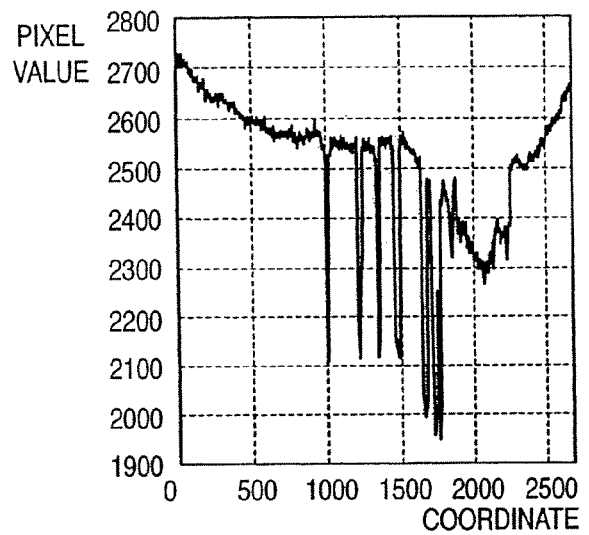
FIG. 42A shows the profile of an original image.
Figure 42B:
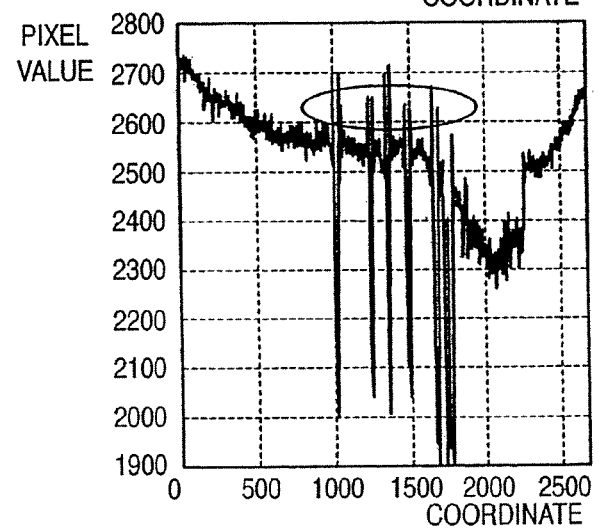
FIG. 42B shows the profile of an image after a sharpening process that does not preserve an edge structure.
Figure 42C:
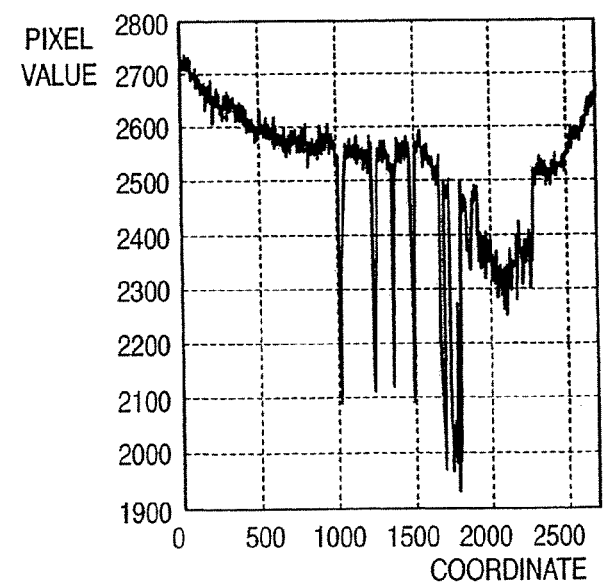
FIG. 42C shows the profile of an image after a sharpening process that preserves the edge structure.

An image processing method when the image processing unit 4170 of the image processing apparatus 4100 is replaced by the image processing unit 4170a, i.e., a modification of the operation done by the image processing unit 4170a, will be explained below with reference to FIGS. 36 to 42C. FIG. 39 is a flow chart showing the process of the image processing unit 4170a. FIG. 40 shows an example of the format of transform coefficient groups of two levels obtained by a two-dimensional discrete wavelet transformation process. FIG. 41 is a graph showing the shape of a conversion curve of a coefficient conversion function F3( ), and a line on the right side of the dotted line in FIG. 41 has a slope=1. FIG. 42A shows the profile of an original image, FIG. 42B shows the profile of an image after a sharpening process that does not preserve the edge structure, and FIG. 42C shows the profile of an image after a sharpening process that preserves the edge structure.

The frequency coefficient decomposing unit 4178 of the image processing unit 4170a executes a two-dimensional discrete wavelet transformation process (DWT process) for an original image f((x, y)) to compute and output frequency coefficients. More specifically, the frequency coefficient decomposing unit 4178 sequentially reads out original image data (shown in, e.g., FIG. 42A) stored in the memory 4120 and executes a transformation process. The frequency coefficients that has undergone the DWT process are written in the memory 4120 again. More specifically, an input image signal is separated into odd and even address signals by a combination of a delay element and down samplers, and undergoes filter processes of two filters p and u. As shown in FIG. 37A, s and d represent low- and high-pass coefficients upon decomposing a linear image signal to one level, and are respectively computed by:

$$d(n)=x(2 \times n+1)-\text{floor}((x(2 \times n)+x(2 \times n+2))/2) \quad (61)$$

$$s(n)=x(2 \times n)+\text{floor}((d(n-1)+d(n))/4) \quad (62)$$

where x(n) is an image signal to be transformed.

With the above process, a linear discrete wavelet transformation process is done for an image signal. Since two-dimensional discrete wavelet transformation is implemented by sequentially executing linear discrete wavelet transformation in the horizontal and vertical directions of an image and its details are known to those who are skilled in the art, a description thereof will be omitted. As shown in FIG. 40, an image signal is decomposed into frequency coefficients HH1, HL1, LH1, . . . , LL in different frequency bands (step 1200). In FIG. 40, each of HH1, HL1, LH1, . . . , LL (to be referred to as subbands hereinafter) indicates a wavelet transform coefficient (frequency coefficient) for each frequency band.

The coefficient converter 4180 then converts the frequency coefficients according to a conversion curve F3( ) shown in, e.g., FIG. 41 (step 5205). In FIG. 41, the abscissa plots input coefficients, and the ordinate plots output coefficients. FIG. 41 shows the conversion curve when input coefficients are +, and the same conversion is made even when input coefficients are −. That is, as can be easily understood for those who are skilled in the art, FIG. 41 shows only the first quadrant of an odd function.

According to this curve form (function f3( )), high-frequency coefficients equal to or higher than a predetermined absolute value (threshold value) are not converted (e.g., slope=1), and the magnitudes of frequency coefficients within a given threshold value range (a range indicated by $a_3$) are increased. Note that such function form suffices to convert frequency coefficients equal to or higher than the predetermined threshold value and those less than the predetermined threshold value at different magnifications, as will be described later, but the present invention is not limited to only the function form shown in FIG. 41. Using such curve, all frequency coefficients other than LL subband coefficients are converted. The converted frequency coefficients are stored in the memory 4120. Note that the predetermined threshold value is determined by experiments in advance. Alternatively, for example, this predetermined threshold value may be determined in such a manner that a cumulative histogram of the absolute values of subband coefficients may be generated, and the absolute value of a coefficient corresponding to the cumulative frequency of occurrence=80% may be selected as the value of the predetermined threshold value. Also, the predetermined threshold value is preferably set to be larger for coefficients corresponding to larger frequency decomposition level (those corresponding to lower frequencies). This is because frequency coefficients corresponding to edge components become larger among those corresponding to lower frequencies. Note that the predetermined threshold value for higher-level (e.g., level 1) subbands corresponding to the high spatial frequency may often be set to be 0.

Upon converting coefficients less than the predetermined threshold value, the ratio of changing coefficients may be changed depending on the pixel values of the original image or the values of LL components. For example, the rate of increase in coefficients corresponding to a low pixel value region in the original image may be decreased. As a result, noise which is conspicuous in the low pixel value region can be avoided from being emphasized.

Such coefficient domain is characterized in that frequency coefficients corresponding to effective information such as a fine structure or the like have large absolute values, and frequency coefficients corresponding to an edge portion have large absolute values. Therefore, when coefficients are converted using the curve form (function F3( )) shown in FIG. 41, frequency coefficients corresponding to an effective structure such as a fine structure or the like increases, and those corresponding to the edge structure remain unchanged.

Figure 43:
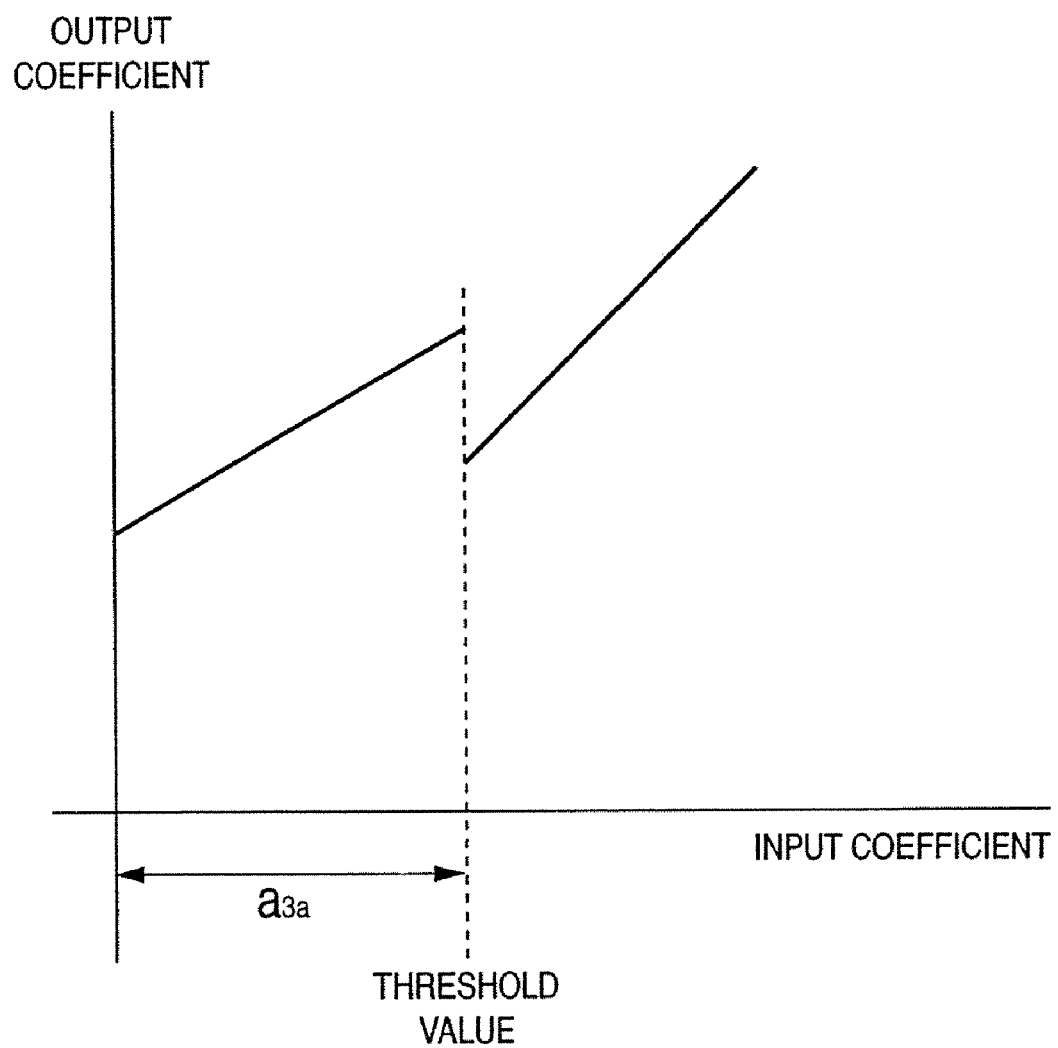
FIG. 43 is a graph showing an example of a curve (function) used to convert frequency coefficients.
Figure 44:
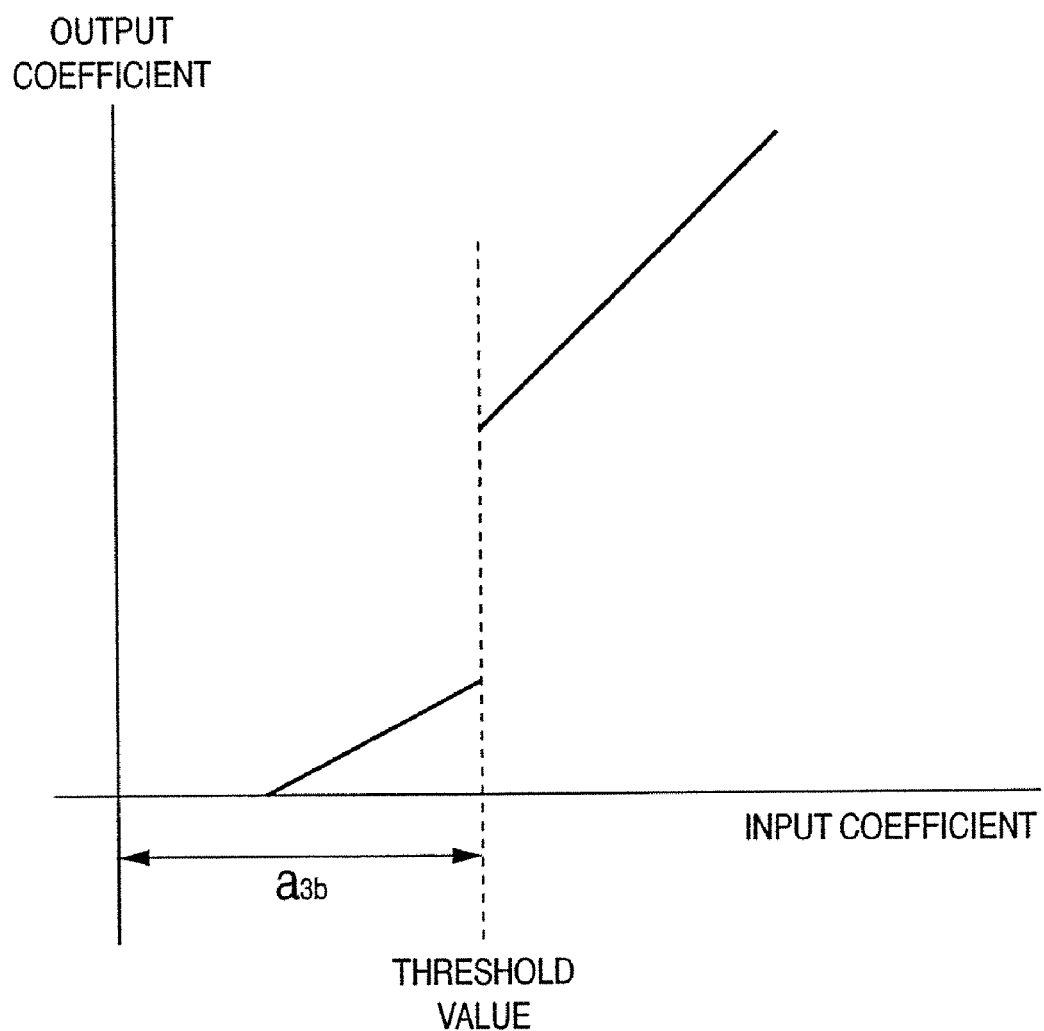
FIG. 44 is a graph showing an example of a curve (function) used to convert frequency coefficients.

FIGS. 43 to 50 similarly show examples in which frequency coefficients equal to or higher than the predetermined threshold value and those less than the predetermined threshold value are converted at different magnifications. Note that FIGS. 43 to 50 are graphs showing examples of curves (functions) used to convert frequency coefficients. The dotted line in each figure is a line segment which passes through the predetermined threshold value and is parallel to the ordinate, and different conversion characteristics (slopes and the like) are set to have the dotted line as a boundary. In FIG. 43, coefficients less than the predetermined absolute value (threshold value) ($a_{3a}$ in FIG. 43) are increased, and no zero coefficient is generated. In this case, coefficients with smaller absolute values are emphasized more, and the dynamic range of coefficients is compressed, compared to the case shown in FIG. 41. In FIG. 44, coefficients less than the predetermined absolute value (threshold value) ($a_{3b}$) are decreased, and coefficients are monotonously increased from 0. In such case, no sharpening effect is obtained, and a noise reduction effect or the like is obtained.

Figure 45:
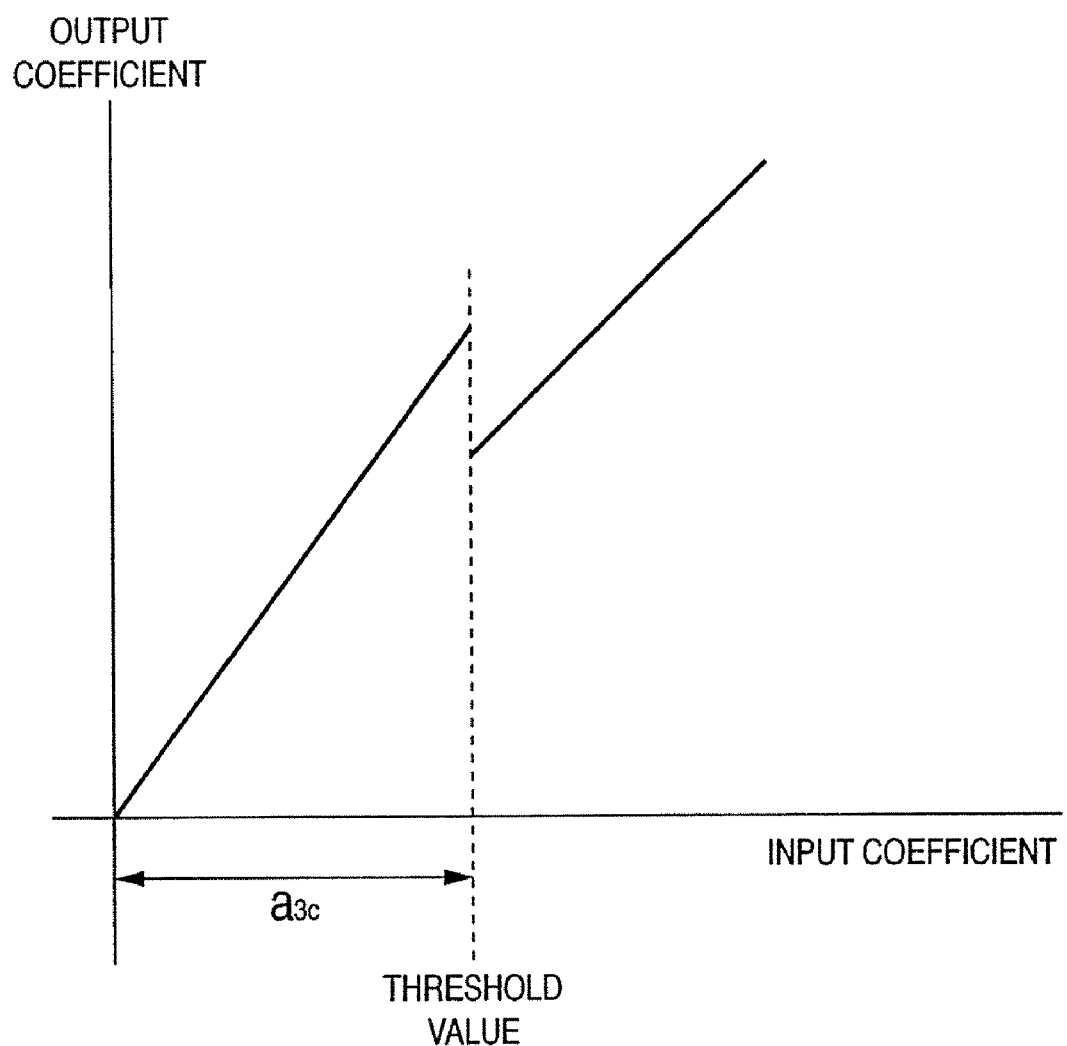
FIG. 45 is a graph showing an example of a curve (function) used to convert frequency coefficients.

In the example shown in FIG. 45, not only coefficients less than the predetermined absolute value (threshold value) ($a_{3c}$) but also coefficients equal to or higher than the predetermined absolute value are increased, and the rate of increase in coefficients within the range other than $a_{3c}$ is set to be smaller than that in the range $a_{3c}$. That is, the slope of the conversion curve other than the range $a_{3c}$ is larger than 1. In such case, although the edge structure cannot be perfectly preserved, effective components such as a fine structure or the like can be emphasized while suppressing overshoot at the edge portion. Setting the slope other than the range $a_3$, to be larger or smaller than 1 so as not to collapse the edge structure is substantially equivalent to maintaining the slope other than the range $a_3$, to be 1.

Figure 46:
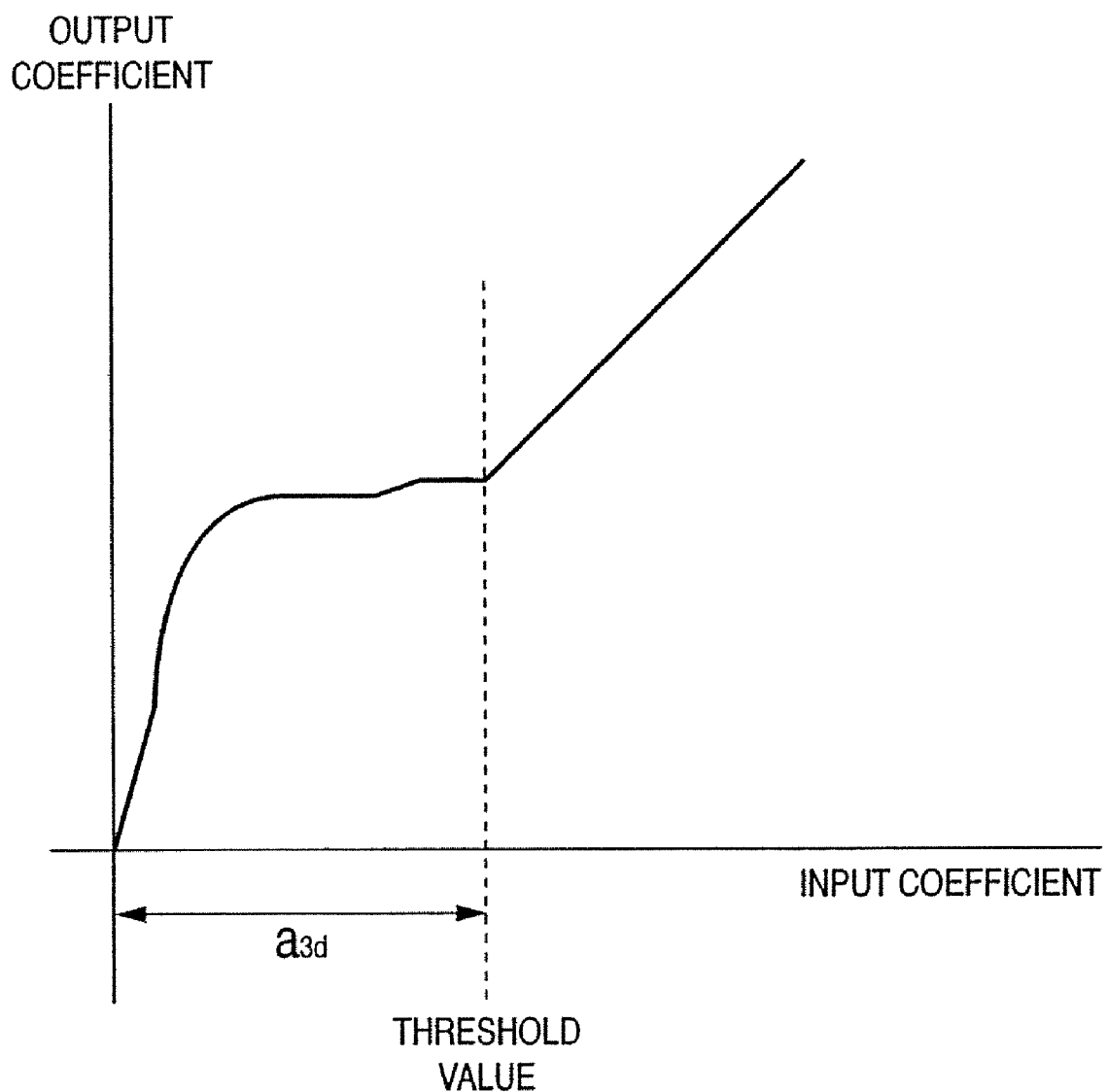
FIG. 46 is a graph showing an example of a curve (function) used to convert frequency coefficients.

In FIG. 46, the slope other than a range less than the predetermined absolute value 9threshold value ($a_{3d}$), i.e., the slope of the range equal to or higher than the predetermined absolute value is set to be 1, but the entire curve form is set to be differential continuous (differentiable and continuous function or at least the slope is continuous). As a result, the rate of change in coefficients changes continuously, and is often preferable to prevent artifacts such as false edges or the like from being generated in a processed image. However, since high-frequency subbands obtained by the DWT process are expressed in the coefficient domain unlike the aforementioned high-frequency image, even when the conversion function is differential discontinuous (undifferentiable or discontinuous), artifacts such as false edges or the like are not always generated in a processed image.

Figure 47:
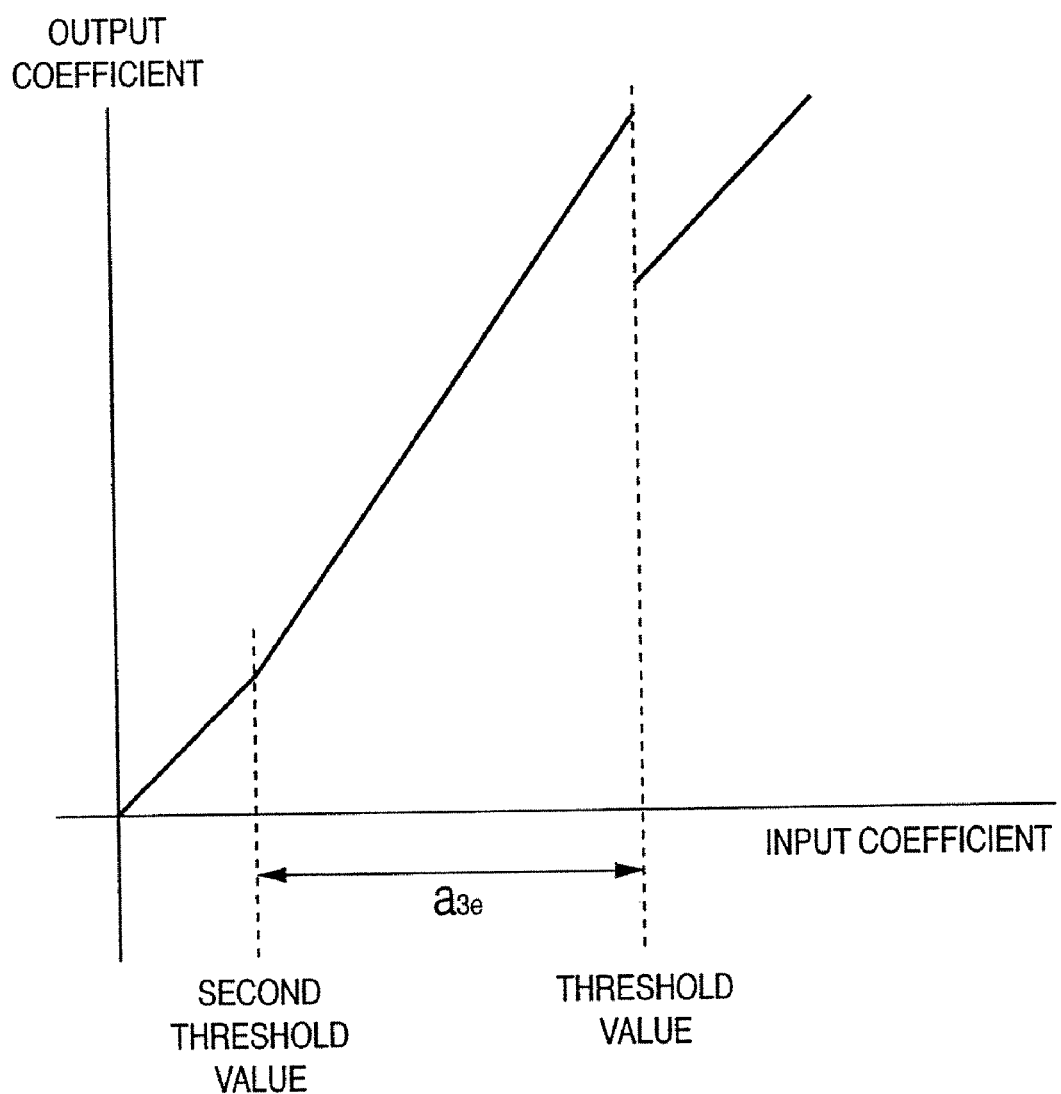
FIG. 47 is a graph showing an example of a curve (function) used to convert frequency coefficients.
Figure 48:
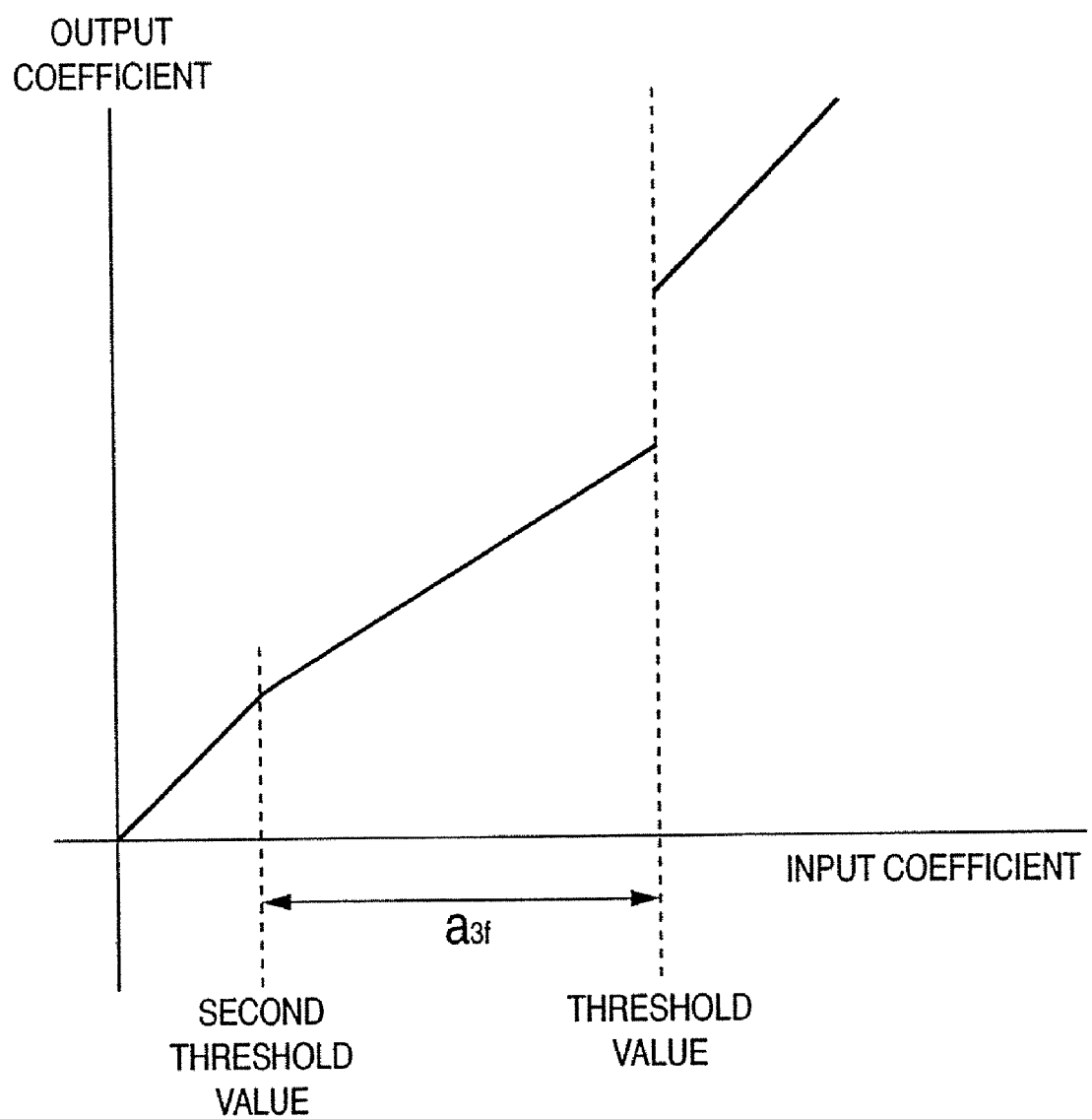
FIG. 48 is a graph showing an example of a curve (function) used to convert frequency coefficients.

In FIGS. 47 and 48, only coefficients within predetermined ranges ($a_{3e}$ in FIG. 47, $a_{3f}$ in FIG. 48) less than the predetermined absolute value (threshold value) are increased/decreased. Note that the slope of a curve less than a second threshold value in FIGS. 47 and 48 need not be 1. With such curve forms, different coefficients can be increased/decreased within the ranges $a_{3e}$ and $a_{3f}$ and the ranges with coefficients smaller than those ranges, and the edge structure can be preserved. In this way, only desired effective components can be emphasized while suppressing unnecessary components such as noise and the like.

Figure 49:
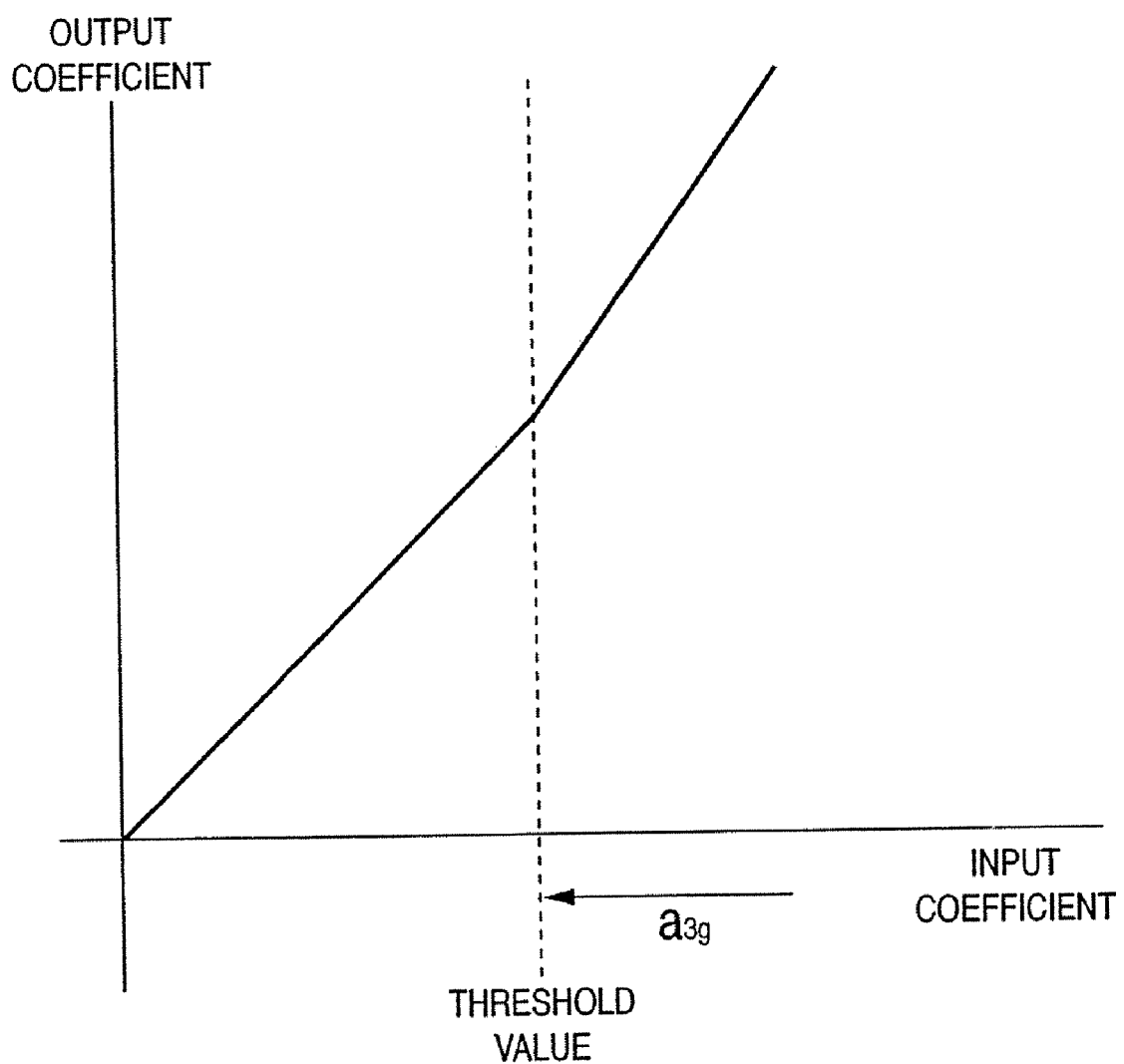
FIG. 49 a graph showing an example of a curve (function) used to convert frequency coefficients.
Figure 50:
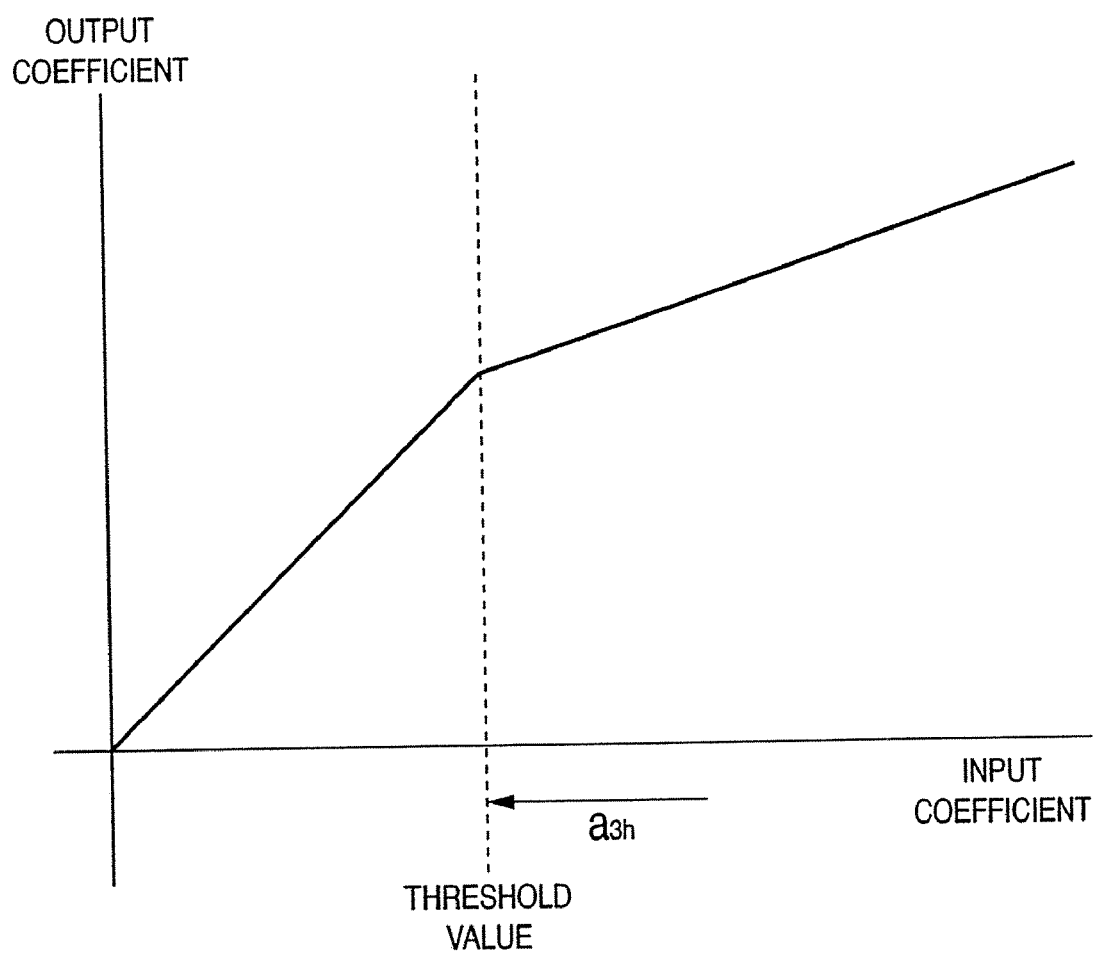
FIG. 50 is a graph showing an example of a curve (function) used to convert frequency coefficients.

With curve forms shown in FIGS. 49 and 50, coefficients ($a_{3g}$ and $a_{3h}$ in FIGS. 49 and 50) corresponding to the edge structure are increased/decreased (the slope is not 1). In this case, coefficients of all subbands corresponding to the edge structure (all coefficients for the LL subband as the lowest spatial frequency component) are preferably changed at the same ratio. As a result, the pixel values of an edge portion are simply increased/decreased, and the edge structure is preserved without causing any overshoot and blurred edge. For example, a restored image obtained when coefficients of all subbands are doubled corresponds to an image obtained by simply doubling the dynamic range of the original image, and no overshoot and blurred edge appear. For the same reason, if coefficients (all coefficients for LL) of all subbands which form the edge structure are changed at a predetermined ratio, and other coefficients are changed arbitrarily, a processed image, the dynamic range of which has been changed while preserving the edge structure, and the fine structure of which has been changed (emphasized or suppressed), can be obtained. On the other hand, if coefficients (all coefficients for LL) of all subbands which form the edge structure (i.e., those having absolute values equal to or higher than the predetermined threshold value) are changed at a predetermined ratio, and other coefficients remain unchanged, a processed image, the dynamic range of which has been changed while preserving the edge structure, and the fine structure of which remains unchanged, can be obtained. The function forms shown in FIGS. 43 to 50 above can also be applied to the previous embodiments (embodiments that add a high-frequency image to a smoothed image). However, as described above, when a high-frequency image is used, if a conversion function has a discontinuous point or differential discontinuous point (undifferentiable point), artifacts such as false edges or the like readily appear. Hence, a differential continuous (differentiable and continuous) conversion function is preferably used. In such case, the discontinuous point or break point can be converted into a smooth curve.

The inverse converter 4182 computes the inverse discrete wavelet transforms (inverse DWTs) of the frequency coefficients converted by the coefficient converter 4180 (step 5120). More specifically, the frequency coefficients which have been converted using the function F3( ) and are stored in the memory 4120 are sequentially read out by the inverse converter 4182 and undergo an inverse transformation process. The image signal that has undergone inverse DWT in the inverse converter 4182 is written in the memory 4120 again.

As shown in FIG. 38A, input image components (s' and d') undergo processes using two filters u and p. The filtered outputs are added to each other after being up-sampled, thus outputting an image signal x'. These processes are described by:

$$x'(2 \times n) = s'(n) - \text{floor}((d'(n-1) + d'(n))/4) \quad (63)$$

$$x'(2 \times n+1) = d'(n) + \text{floor}((x'(2 \times n) + x'(2 \times n+2))/2) \quad (64)$$

With the above process, linear inverse discrete wavelet transformation of transform coefficients is done. Since two-dimensional inverse discrete wavelet transformation is implemented by sequentially executing linear inverse transformation in the horizontal and vertical directions of an image and its details are known to those who are skilled in the art, a description thereof will be omitted.

The image after such processes is supplied from the image processing unit 4170a to the memory 4120 and display unit 4140. The operator (e.g., a radiologist or doctor) can confirm the sensed image and make diagnosis on the basis of the image output to the display unit 4140.

FIG. 42B shows an image obtained by doubling the entire coefficients of all subbands except for the LL subbands by the coefficient converter 4180. On the other hand, FIG. 42C shows a result image obtained when coefficients within the range $a_3$ in FIG. 41 are doubled and other coefficients remain unchanged (i.e., the slope of the function F3( ) is 1). When all the coefficients are converted, overshoot appears strongly, as indicated by the arrow in, e.g., FIG. 42B. However, in FIG. 42C in which coefficients equal to or higher than the predetermined absolute value remain unchanged, the fine structure is emphasized, but the edge structure is preserved and no overshoot appears.

In FIG. 41, the conversion function F3( ) has an undifferentiable and discontinuous point, but no artifacts such as false edges or the like appear in the inversely converted image. This is because no structure which is visually recognized as a continuous boundary such as a line or the like appears on the inversely converted image since coefficients having the predetermined absolute value (those corresponding to the undifferentiable and discontinuous point of the conversion curve) are randomly distributed in the coefficient domain. That is, the wavelet coefficients are frequency coefficients, and a predetermined image domain is restored by the inverse wavelet transformation process in correspondence with the magnitudes of frequency components. Note that frequency coefficients of the predetermined absolute value may often be arranged continuously in correspondence with the edge portion of an image in the coefficient domain. In such case, since a continuous structure in the coefficient domain, which appears after coefficient conversion using a discontinuous function like the conversion function F3( ), appears as a continuous structure along the edge portion even on the restored image, it is not recognized as a false edge.

In the above description, discrete wavelet transformation is used. However, any other methods may be used as long as an image can be decomposed into multiple frequency components, and for example, a Laplacian pyramid transformation method may be used. In the frequency coefficient decomposing unit 4178 shown in FIG. 37B, g and b respectively represent a low-resolution image and high-frequency component coefficient of an image upon decomposing to one level. The low-resolution approximate image g is obtained by filtering image signal x using a low-pass filter, and down-sampling the filtered signal. The high-frequency component coefficient b is obtained by calculating the difference between image signal x and an image obtained by up-sampling the low-resolution approximate image g and filtering the sampled image using a low-pass filter. As the low-pass filter, a filter shown in, e.g., FIG. 51 is used. FIG. 51 shows a filter form that can be applied to the frequency coefficient decomposing unit 4178 shown in FIG. 37B. In the Laplacian pyramid transformation method, this process is repeated for the low-resolution approximate image g to obtain frequency coefficients of respective frequency bands. Since details of this method are known to those who are skilled in the art, a description thereof will be omitted.

As shown in FIG. 38B, by adding the high-frequency component coefficient b and an image obtained by up-sampling low-resolution approximate image g and filtering it using a low-pass filter, image signal x' is output. As the low-pass filter, a filter shown in, e.g., FIG. 51 is used. The Laplacian pyramid transformation method (inverse Laplacian pyramid transformation) obtains a composite image by repeating this process for respective levels. Since details of this method are known to those who are skilled in the art, a description thereof will be omitted.

As described above, the image processing method of this embodiment obtains the effect of a frequency process such as sharpening or the like while preserving the edge structure by decomposing an image into frequency coefficients of a plurality of frequency bands, and converting the frequency coefficients. This method can provide the effect of flexibly adjusting the degree of emphasis or suppression for each frequency band while maintaining the edge structure. Also, this method can provide the effect of preventing artifacts such as false edges and the like from being generated on a processed image even when the frequency process is done while maintaining the edge structure. Furthermore, by increasing the predetermined absolute value (threshold value) as the decomposition level shifts toward lower frequencies, a frequency process that can preserve the edge structure more effectively can be done.

As described above, according to Embodiment 9 and the subsequent embodiment, an image processing apparatus and method which can obtain a high-quality image, desired spatial frequency components of which have been emphasized or suppressed while suppressing or avoiding collapse of the edge structure of an edge portion contained in an objective image, and a computer-readable medium and program, can be provided.

The image processing apparatus and method according to Embodiment 9 can convert high-frequency components having absolute values equal to or higher than the predetermined threshold value, and those having absolute values less than the predetermined threshold value at different magnifications. Hence, high-frequency components having absolute values equal to or higher than the predetermined threshold value can be prevented from being emphasized. Also, high-frequency components having absolute values equal to or higher than the predetermined threshold value can be converted at the same magnification as the conversion magnification for a smoothed image. As a result, overshoot can be suppressed, or the edge structure can be preserved. Hence, the processed image obtained by such image processing apparatus and method is free from any unnatural edge portion. Furthermore, since high-frequency components having absolute values less than the predetermined threshold value can be arbitrarily converted, high-frequency components can be appropriately emphasized (sharpened) or suppressed.

On the other hand, the image processing apparatus and method according to Embodiment 10 can convert high-frequency coefficients (those of the high-frequency bands) having absolute values equal to or higher than the predetermined threshold value, and those having absolute values less than the predetermined threshold value at different magnifications. As a result, high-frequency coefficients having absolute values equal to or higher than the predetermined threshold value can, for example, remain unchanged, or can be converted at the same magnification as the conversion magnification for low-frequency components (those of the low-frequency bands). Hence, overshoot can be suppressed, or the edge structure can be preserved. Furthermore, such image processing apparatus and method can flexibly adjust the degree of emphasis or suppression for each frequency band. Since the method of making conversion based on coefficient values for respective high-frequency bands is adopted, even when a frequency process for suppressing overshoot or preserving the edge structure is executed, other false edges (e.g., a blurry stripe pattern that can be visually recognized along the edge portion) are not formed on the processed image. Since high-frequency components having absolute values less than the predetermined threshold value are increased/decreased, the fine structure can be emphasized (sharpened) or noise reduction can be attained. Moreover, the image processing apparatus and method may execute conversion for strongly decreasing or setting, to be zero, high-frequency coefficients which have absolute values less than the predetermined threshold value and also less than a second threshold value smaller than the predetermined threshold value. This arrangement can appropriately convert (emphasize or suppress) effective components in an image while suppressing noise components in the image. By setting different threshold values (e.g., a larger threshold value is set as the frequencies of high-frequency bands become lower), overshoot can be suppressed or the edge structure can be preserved more effectively.

Another Embodiment

The scope of the present invention includes a case wherein the functions of the embodiments are implemented or the processing steps are executed by supplying a program code of software that implements the functions of the embodiments or executes the processing steps to a computer (or a CPU or MPU) in a system or apparatus connected to various devices, and making the computer in the system or apparatus operate the various devices in accordance with the stored program, so as to operate the various devices for the purpose of implementing the functions of the embodiments or executing the processing steps.

In this case, the program code itself read out from the storage medium implements the functions of the embodiments or executes the processing steps, and the program code itself, and means for supplying the program code to the computer (i.e., a storage medium which stores the program code) constitutes the present invention.

As the storage medium for storing such program code, for example, a floppy disk, hard disk, optical disk, magneto-optical disk, CD-ROM, magnetic tape, nonvolatile memory card, ROM, and the like may be used.

The program code also constitutes the present invention not only when the functions of the embodiments are implemented or the processing steps are executed by executing the supplied program code by the computer but also when the functions of the embodiments are implemented or the processing steps are executed by collaboration of the program code and an OS (operating system) or another application software running on the computer.

Furthermore, the program code constitutes the present invention when the functions of the embodiments are implemented or the processing steps are executed by some or all of actual processes executed by a CPU or the like arranged in a function extension board or a function extension unit, which is inserted in or connected to the computer, after the supplied program code is written in a memory of the extension board or unit.

Note that the aforementioned program can be a transaction object when it is stored in the aforementioned computer-readable storage medium, and can also be an independent transaction object when it is distributed on-line via a communication network such as the Internet and the like.

The embodiments have been explained in detail above, and various modifications and changes of the present invention can be made within the scope of the invention.

The invention claimed is:

1. An image processing apparatus comprising:
 a tone conversion circuit adapted to provide converted image data by executing tone conversion of an image;
 a high-frequency component calculation circuit adapted to calculate high-frequency components of the image in accordance with a Laplacian pyramid method;
 a component conversion circuit adapted to convert the high-frequency components obtained by said high-frequency component calculation circuit, based on values of the high-frequency components and tone conversion characteristics of said tone conversion circuit, such that high-frequency components having absolute values greater than a predetermined threshold value are converted with a greater degree of suppression than high-frequency components having absolute values not greater than the predetermined threshold value; and
 an addition circuit adapted to add the high-frequency components converted by said component conversion circuit and the converted image data that has undergone tone conversion by said tone conversion circuit.

2. An image processing method comprising:
 using an image processing apparatus to perform steps of:
 providing image data by tone converting an image;
 calculating high-frequency components of the image in accordance with a Laplacian pyramid method;
 converting the calculated high-frequency components based on values of the high-frequency components and tone conversion characteristics of the tone conversion, such that high-frequency components having absolute values greater than a predetermined threshold value are converted with a greater degree of suppression than high-frequency components having absolute values not greater than the predetermined threshold value; and
 adding the converted high-frequency components and the image data that has undergone the tone conversion.

3. A computer-readable medium storing program code for implementing an image processing method, wherein the method comprises:
 providing image data by tone converting an image;
 calculating high-frequency components of the image in accordance with a Laplacian pyramid method;
 converting the calculated high-frequency components based on values of the high-frequency components and tone conversion characteristics of the tone conversion, such that high-frequency components having absolute values greater than a predetermined threshold value are converted with a greater degree of suppression than high-frequency components having absolute values not greater than the predetermined threshold value; and
 adding the converted high-frequency components and the image data that has undergone the tone conversion.

* * * * *